United States Patent
Matsushima et al.

(10) Patent No.: US 8,489,873 B2
(45) Date of Patent: Jul. 16, 2013

(54) MIGRATION APPARATUS, METHOD AND SYSTEM FOR TRANSFERRING DATA PROTECTED WITHIN A FIRST TERMINAL DEVICE TO A SECOND TERMINAL DEVICE

(75) Inventors: Hideki Matsushima, Osaka (JP); Hisashi Takayama, Osaka (JP); Takayuki Ito, Osaka (JP); Tomoyuki Haga, Nara (JP); Yuichi Futa, Osaka (JP); Taichi Sato, Kyoto (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/865,894

(22) PCT Filed: Feb. 23, 2009

(86) PCT No.: PCT/JP2009/000761
§ 371 (c)(1),
(2), (4) Date: Aug. 3, 2010

(87) PCT Pub. No.: WO2009/107351
PCT Pub. Date: Sep. 3, 2009

(65) Prior Publication Data
US 2010/0332820 A1    Dec. 30, 2010

(30) Foreign Application Priority Data
Feb. 25, 2008    (JP) .................................. 2008-043008

(51) Int. Cl.
*H04L 29/06*    (2006.01)
(52) U.S. Cl.
USPC .......................................................... 713/150

(58) Field of Classification Search
USPC .......................................................... 713/150
See application file for complete search history.

(56) References Cited

U.S. PATENT DOCUMENTS

| 6,236,727 | B1 | 5/2001 | Ciacelli et al. |
| 6,757,832 | B1 * | 6/2004 | Silverbrook et al. ......... 713/194 |
| 6,886,095 | B1 * | 4/2005 | Hind et al. .................... 713/168 |

(Continued)

FOREIGN PATENT DOCUMENTS

| CN | 1205479 | 1/1999 |
| CN | 1846399 | 10/2006 |

(Continued)

OTHER PUBLICATIONS

Veil et al, Interoperability Specification for Backup and Migration Services, Jun. 2005, TCG.*

(Continued)

*Primary Examiner* — Brian P Whipple
(74) *Attorney, Agent, or Firm* — Wenderoth, Lind & Ponack, L.L.P.

(57) ABSTRACT

The present invention provides a migration apparatus that realizes safe migration of secret data between a first terminal device and a second terminal device. Before transmitting the secret data to the second terminal device, the migration apparatus (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level.

22 Claims, 29 Drawing Sheets

U.S. PATENT DOCUMENTS

| | | | |
|---|---|---|---|
| 7,093,139 B2 * | 8/2006 | Silverbrook et al. | 713/194 |
| 7,328,341 B1 | 2/2008 | Eun et al. | |
| 2003/0126455 A1 * | 7/2003 | Sako et al. | 713/193 |
| 2004/0190714 A1 * | 9/2004 | Masui et al. | 380/43 |
| 2005/0025091 A1 * | 2/2005 | Patel et al. | 370/328 |
| 2006/0059024 A1 * | 3/2006 | Bailey et al. | 705/5 |
| 2007/0003064 A1 * | 1/2007 | Wiseman et al. | 380/281 |
| 2007/0008568 A1 | 1/2007 | Senoh | |
| 2007/0300069 A1 * | 12/2007 | Rozas | 713/176 |
| 2008/0216177 A1 | 9/2008 | Yokosato et al. | |
| 2009/0046862 A1 * | 2/2009 | Ito et al. | 380/277 |

FOREIGN PATENT DOCUMENTS

| | | |
|---|---|---|
| EP | 2 172 868 | 4/2010 |
| JP | 11-88859 | 3/1999 |
| JP | 2003-532956 | 11/2003 |
| JP | 2005-102188 | 4/2005 |
| WO | 2006/092840 | 9/2006 |
| WO | 2009/001539 | 12/2008 |

OTHER PUBLICATIONS

Barker et al, Recommendation for Key Management—Part 1: General (Revised), Mar. 2007, NIST.*

Grawrock et al, TCG Specification Architecture Overview, Aug. 2, 2007, TCG.*

International Search Report issued Jun. 2, 2009 in International (PCT) Application No. PCT/JP2009/000761.

Hiroyoshi Haruki et al., "Process Migration on L-MSP with Process Uniqueness", Symposium Proceedings, IPSJ Symposium Series vol. 2005, No. 6, Information Processing Society of Japan, pp. 705-708, Jul. 6, 2005.

Interoperability Specification for Backup and Migration Services, Version 1.0 Final, Revision 1.0, TCG Published, 2005.

TPM Main Part 1 Design Principles, Mar. 2006.

TPM Main Part 2 TPM Structures, Mar. 2006.

TPM Main Part 3 Commands, Mar. 2006.

TCG Software Stack (TSS) Specification Version 1.2 Level 1 Part 1: Commands and Structures, Jan. 2006.

TCG Storage Architecture Core Specification, May 2007.

TCG Storage Workgroup Security Subsystem Class: Optical, Jan. 2008.

ISO/IEC 15408-3, Information technology—Security techniques—Evaluation criteria for IT security, Part 3: Security assurance requirements, Oct. 2005.

* cited by examiner

FIG.6

601 Migration Package Management Table

| Migration PackageID | File Name | SRKType | Cipher Type | KeyLength | Evaluate Level |
|---|---|---|---|---|---|
| 001 | ¥migrationp¥mp001.dat | asymmetric | RSA | 2048 | EAL4 |
| 002 | ¥migrationp¥mp002.dat | asymmetric | ECC | 256 | EAL4 |
| 003 | ¥migrationp¥mp003.dat | symmetric | AES | 128 | EAL1 |

FIG.7

Encryption Strength Table 701

| Strength Level | Secret Key Cryptographic Algorithm Key Length | RSA Algorithm Key Length | ECC Algorithm Key Length |
|---|---|---|---|
| 1 | 80 | 1024 | 160 |
| 2 | 112 | 2048 | 224 |
| 3 | 128 | 3072 | 256 |
| 4 | 192 | 7680 | 384 |
| 5 | 256 | 15360 | 521 |

FIG.8

Authentication Level Judgment Table 801

| Migrate Source Authentication Level | Migrate Destination Authentication Level |
|---|---|
| EAL1 | ANY |
| EAL2 | EAL1 |
| EAL3 | EAL2 |
| EAL4 | EAL3 |
| EAL5 | EAL5 |
| EAL6 | EAL6 |
| EAL7 | EAL7 |
| Others | ANY |

FIG.16

Content Management Table (1601)

| Content ID | File Name |
|---|---|
| 001 | ¥omadrm¥music001.aac |
| .. | .. |
| XXX | ¥omadrm¥musicXXX.aac |

Content Management Table (1602)

| Content ID | File Name |
|---|---|
| 00a | ¥omadrm¥music00a.aac |
| 00b | ¥omadrm¥music00b.aac |

MIGRATION APPARATUS, METHOD AND SYSTEM FOR TRANSFERRING DATA PROTECTED WITHIN A FIRST TERMINAL DEVICE TO A SECOND TERMINAL DEVICE

TECHNICAL FIELD

The present invention relates to migration of secret data between security terminal devices.

BACKGROUND ART

In recent years, technical needs for secure migration of data have been increasing with increased awareness of information security.

In response to such needs, a "Trusted Computing Group" (TCG) has been developing standards. The TCG has released a technology to securely save secret data, by using a security core module called "Trusted Platform Module" (TPM). This technology is called "Protected Storage".

Non-Patent Literature 1, which relates to the TCG standards, discloses a technology that uses the Protected Storage to securely back up data to be kept secret and migrate (i.e. transfer) such data to another terminal device.

The main target of the TPM specifications is PCs. As the latest version, TPM version v1.2 has been formulated and released. Even now, the TCG is carrying on the discussion for supporting up-to-date encryption algorithms and application of them. In the meanwhile, encryption algorithms continue to evolve.

CITATION LIST

[Non-Patent Literature 1]
Interoperability Specification for Backup and Migration Services Version 1.0, Revision 1.0 (TCG Published)

SUMMARY OF INVENTION

Technical Problem

However, the migration technology disclosed in Non-Patent Literature 1 is based on the assumption that both of the communicating devices use the same encryption algorithm, comply with the same standard, and have been authenticated at the same security level. Thus, if the devices are not the same in any of these points, it is impossible to fully support such devices.

Accordingly, even if a new encryption algorithm and a new security authentication method are invented and a device capable of more securely handling data by using them is developed, the migration technology can not realize secure migration of data from an existing device to the new device. Moreover, from the appearance of the destination device of the migration, it is difficult to know the security level of the device. Thus, there is a risk that important data may be migrated to a device with a significantly low level of security. This is unfavorable for users.

The present invention has been achieved in view of the above problems, and an aim thereof is to provide a migration apparatus, a migration system, migration and security terminal devices, each capable of realizing migration of data between devices that use different encryption algorithms or have different security authentication levels.

Solution to Problem

In order to solve the above problems, one aspect of the present invention provides a migration apparatus for transferring data protected within a first terminal device to a second terminal device, comprising: a receiving unit operable to receive secret data from the first terminal device and a download request for the secret data from the second terminal device, the secret data protected by a first encryption algorithm, within a security module in the first terminal device; an identifying unit operable to identify the first encryption algorithm based on a credential received from the first terminal device, and to identify a second encryption algorithm based on a credential received from the second terminal device, the second encryption algorithm to be used within a security module in the second terminal device; a holding unit operable to hold a security policy table associating the first encryption algorithm with the second encryption algorithm; and a control unit operable, on receipt of the download request from the second terminal device, to re-protect the secret data by the second encryption algorithm instead of by the first encryption algorithm, according to the security policy table, and to send the secret data to the second terminal device, wherein before transmitting the secret data to the second terminal device, the control unit (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level.

Advantageous Effects of Invention

With the stated structure, the control unit judges whether or not the second terminal device is appropriate as the destination of the secret data, by using the minimum evaluation level that the destination of the secret data is required to have by the first terminal device.

It can be assumed that the minimum evaluation level is determined in advance by the user of the first terminal device in view of the importance of the secret data. Thus, the present invention achieves an advantageous effect that the secret data is prevented from being unintentionally migrated to a device that does not meet a security level that is as high as intended by the user of the first terminal device.

Moreover, the secret data is re-protected according to the security policy table. Thus, even if the first terminal device and the second terminal device use different encryption algorithms, they are capable of securely transmitting and receiving the secret data by using their respective encryption algorithms.

BRIEF DESCRIPTION OF DRAWINGS

FIG. 6 shows a structure of a Migration Package Management Table 601 pertaining to the first embodiment.

FIG. 7 shows a structure of an Encryption Strength Table 701 pertaining to the first embodiment.

FIG. 8 shows a structure of an Authentication Level Judgment Table 801 pertaining to the first embodiment.

FIG. 16 shows structures of Content Management Tables 1601 and 1602 pertaining to a second embodiment of the present invention.

REFERENCE SIGNS LIST

Figure 1:
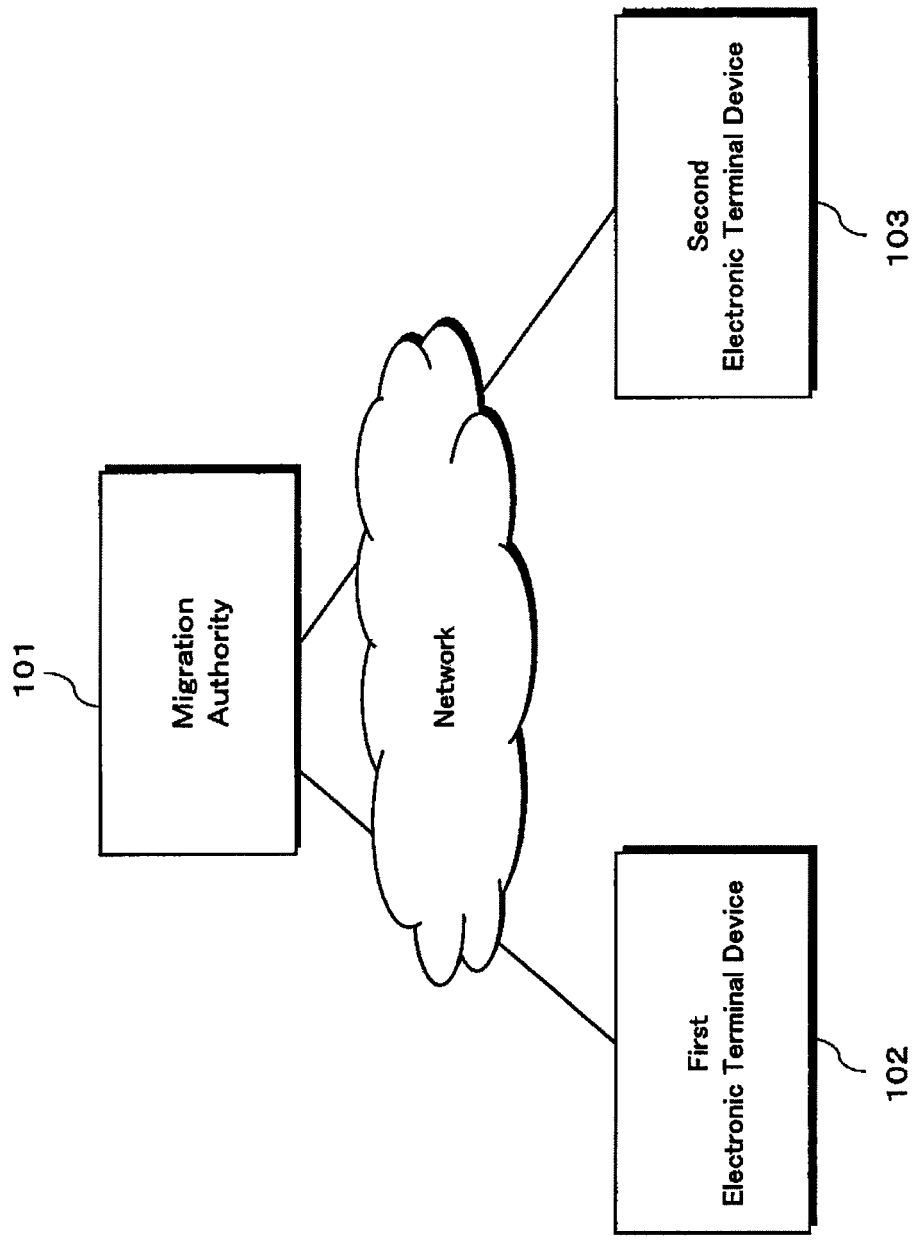
FIG. 1 shows an overall structure of a first embodiment of the present invention.

101 Migration Authority
102 First Electronic Terminal Device
103 Second Electronic Terminal Device
201 Trusted Platform Module
202 TCG Software Stack
203 Local Migration Services
204 Controlling Application
205 Local Application
206 Input/Output Unit
207 Storage Area
210 AIK Credential
211 Information Management Certificate
212 Conformance Certificate
215 Secret Data
500 Data Receiving Unit
501 Attestation Processing Unit
502 Certificate Analyzing Unit
503 Migration Package Registration Unit
504 Migrate Permission Judging Unit
505 Migration Package Regeneration Unit
506 Data Transmitting Unit
507 Storage Area
601 Migration Package Management Table
701 Encryption Strength Table
801 Authentication Level Judgment Table
1201 Encryption Parameters
1301 Regeneration Example
1302 Encryption Parameters
1401 Regeneration Example
1402 Encryption Parameters
1501 Regeneration Example
1502 Encryption Parameters
1601 Content Management Table
1602 Content Management Table
1701 Rights Management Table
1702 Rights Protection Key Table
1703 Time-varying Key
1704 Rights Management Table
1705 Rights Protection Key Table
1706 Time-varying Key
1801 Migration Key
1802 Migration Rights Protection Key Table
2001 Migration Authority
2002 Third Electronic Terminal Device
2004 First Storage Device
2101 Storage Application
2103 Storage Certificate
2200 Trusted Peripheral
2202 Admin SP
2204 Crypto SP
2206 Storage Area
2501 Migration Authority
2502 Fourth Electronic Terminal Device
2503 Fifth Electronic Terminal Device
2602 Hypervisor
2603 Management Unit
2604 Virtual Machine
2605 Virtual Machine
2610 AIK Credential
2611 Information Management Certificate 2612 Conformance Certificate
2615 Secret Data
2701 Machine Migrate Control Unit
2703 Platform Credential

DESCRIPTION OF EMBODIMENTS

A migration apparatus according to a first aspect of the present invention is a migration apparatus for transferring data protected within a first terminal device to a second terminal device, comprising: a receiving unit operable to receive secret data from the first terminal device and a download request for the secret data from the second terminal device, the secret data protected by a first encryption algorithm, within a security module in the first terminal device; an identifying unit operable to identify the first encryption algorithm based on a credential received from the first terminal device, and to identify a second encryption algorithm based on a credential received from the second terminal device, the second encryption algorithm to be used within a security module in the second terminal device; a holding unit operable to hold a security policy table associating the first encryption algorithm with the second encryption algorithm; and a control unit operable, on receipt of the download request from the second terminal device, to re-protect the secret data by the second encryption algorithm instead of by the first encryption algorithm, according to the security policy table, and to send the secret data to the second terminal device, wherein before transmitting the secret data to the second terminal device, the control unit (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level.

In the migration apparatus according to a second aspect of the present invention, the first terminal device includes: an execution unit operable to perform processing with the secret data, within an execution environment established by a virtual machine; and a transferring unit operable to remove the secret data from the virtual machine, and send the virtual machine not containing the secret data to the second terminal device via a route different from a route for the secret data.

The virtual machine mentioned above corresponds to a Virtual Machine 2604 and a Virtual Machine 2605. Specifically, a virtual machine is a set of programs for virtualizing physical resources of a computer, such as a CPU and a memory, to realize an environment where a plurality of platforms virtually coexist, or to realize a platform which enables programs that can not run in the computer under normal circumstances to run.

In the case of transferring the whole virtual machine including the secret data, the total size can be considerably large. Meanwhile, some technologies relating to virtual machines are well known, and a large part of the set of programs is not highly confidential. Thus, if no secret data is contained in the virtual machine, it may be transferred by another high-speed method without the use of the migration apparatus.

With the stated structure, the control unit removes the secret data from the virtual machine, and transfers the virtual machine not containing the secret data to the second terminal device via a route that is different from the route for the secret data. Thus, the migration apparatus is capable of securely transferring the secret data, which is highly confidential, from the first terminal device to the second terminal device, while quickly transferring the virtual machine not containing the secret data from the first terminal device to the second terminal device.

In the migration apparatus according to a third aspect of the present invention, the security policy table associates an encryption strength level of the first encryption algorithm with an encryption strength level of the second encryption algorithm, the encryption strength level of the second encryption algorithm lower than the encryption strength level of the first encryption algorithm in some cases.

In the migration apparatus according to a fourth aspect of the present invention, the holding unit further holds a second security policy table associating a first security authentication level of the first terminal device with a second security authentication level of the second terminal device, and even if the second encryption algorithm is a counterpart to the first encryption algorithm, the control unit re-protects the secret data only if the second security policy table shows that a difference between the first security authentication level and the second security authentication level is less than a given value.

In the migration apparatus according to a fifth aspect of the present invention, the holding unit further holds a second security policy table associating a first security authentication level of the first terminal device with a second security authentication level of the second terminal device, and even if the second encryption algorithm is a counterpart to the first encryption algorithm, the control unit re-protects and sends the secret data only if the second security policy table shows that a difference between the first security authentication level and the second security authentication level is less than a given value.

In the migration apparatus according to a sixth aspect of the present invention, the encryption strength level of the first encryption algorithm is represented as a key length used in the first encryption algorithm, and the encryption strength level of the second encryption algorithm is represented as a key length used in the second encryption algorithm.

In the migration apparatus according to a seventh aspect of the present invention, the identifying unit identifies a type and a key length of the first encryption algorithm and a type of the second encryption algorithm, the security policy table shows a key length corresponding to the type of the second encryption algorithm and satisfying the same encryption strength level as an encryption strength level corresponding to the type and the key length of the first encryption algorithm, and when re-protecting the secret data, the control unit uses the key length of the second encryption algorithm corresponding to the key length of the first encryption algorithm.

In the migration apparatus according to an eighth aspect of the present invention, the identifying unit identifies a type and a key length of the first encryption algorithm and a type of the second encryption algorithm, the security policy table associates key lengths of a plurality of encryption algorithms satisfying the same encryption strength level, and when re-protecting the secret data, the control unit searches the key lengths for a key length corresponding to the type of the second encryption algorithm and satisfying the same encryption strength level as an encryption strength level corresponding to the type and the key length of the first encryption algorithm, and uses the key length found by the search.

In the migration apparatus according to a ninth aspect of the present invention, the migration apparatus receives the security policy table from the first terminal device.

In the migration apparatus according to a tenth aspect of the present invention, the receiving unit further receives, from the second terminal device, a parent key, information indicating an encryption algorithm to be used with the parent key, and information showing a scope of encryption with the parent key, and the control unit protects only a top data piece in a hierarchy of the secret data, by using the parent key and the encryption algorithm to be used with the parent key, based on the scope of the encryption with the parent key.

In the migration apparatus according to an eleventh aspect of the present invention, the receiving unit receives, from the second terminal device, a parent key and information indicating an encryption algorithm to be used with the parent key, and the control unit generates a second key different from the parent key, and protects the secret data by using the second key and the encryption algorithm to be used with the parent key.

In the migration apparatus according to a twelfth aspect of the present invention, the control unit generates the second key at a level lower than the parent key in a hierarchy of the secret data.

In the migration apparatus according to a thirteenth aspect of the present invention, the receiving unit receives, from the second terminal device, a public key and information indicating an encryption algorithm to be used with the public key, and the control unit protects the secret data by using the public key and the encryption algorithm to be used with the public key.

In the migration apparatus according to a fourteenth aspect of the present invention, the receiving unit receives, from the second terminal device, a secret key and information indicating an encryption algorithm to be used with the secret key, and the control unit protects the secret data by using the secret key and the encryption algorithm to be used with the secret key.

In the migration apparatus according to a fifteenth aspect of the present invention, the receiving unit receives a parent key from the second terminal device, and the control unit protects the whole secret data at an encryption strength level of the parent key.

In the migration apparatus according to a sixteenth aspect of the present invention, the receiving unit receives, from the second terminal device, information indicating an encryption strength level, and the control unit protects the secret data at the encryption strength level indicated by the information.

In the migration apparatus according to a seventeenth aspect of the present invention, the receiving unit receives, from the second terminal device, a request for protection of the secret data at the same encryption strength level as an encryption strength level of protection by the first terminal device, and the control unit protects the secret data at the encryption strength level as the encryption strength level of the protection by the first terminal device.

In the migration apparatus according to an eighteenth aspect of the present invention, the migration apparatus includes a migration server In the migration apparatus according to a nineteenth aspect of the present invention, the migration apparatus is included within the first terminal device.

A migration system according to a twentieth aspect of the present invention is a migration system for transferring data protected within a first terminal device to a second terminal device via a migration apparatus, the first terminal device comprising: a first execution unit operable to perform processing with the secret data, within an execution environment established by a virtual machine; a transmitting unit operable to securely transmit the secret data to the migration apparatus; and a transferring unit operable to remove the secret data from the virtual machine, and send the virtual machine not containing the secret data to the second terminal device via a route different from a route for the secret data, the virtual machine comprising: a receiving unit operable to securely receive the secret data from the first terminal device; a judging unit operable to judge whether a evaluation level relating to security of the second terminal device is no lower than a minimum evaluation level of a destination of the secret data; a transmitting unit operable to securely transmit the secret data to the second terminal device in a manner suitable for the second terminal device, only if the evaluation level is no lower than the minimum evaluation level; and a permission unit operable to permit the first terminal device to perform the transfer of the secret data to the second terminal device only if the evaluation level is no lower than the minimum evaluation level, and the second terminal device comprising: a receiving unit operable to securely receive the secret data; and a second execution unit operable to acquire the virtual machine from the first terminal device and, by using the acquired virtual machine, establish an execution environment within which processing with the secret data is to be performed.

First Embodiment

The following describes the first embodiment of the present invention, with reference to the drawings.

FIG. 1 shows an overall structure of a system pertaining to the first embodiment of the present invention.

In FIG. 1, a Migration Authority 101 communicates with electronic terminal devices via a network, and provides them with a service for migration of secret data. The Migration Authority 101 is a server for controlling migration of secret data between the electronic terminal devices.

The First Electronic Terminal Device 102 is a computer system including a CPU, a RAM, and so on. Generally, the First Electronic Terminal Device 102 is structured from a PC, a mobile phone, a PDA, or the like. The First Electronic Terminal Device 102 is provided with a secure platform mainly including a security module called Trusted Platform Module (TPM), which is prescribed by the TCG. The TPM supports a technology for securely saving secret data. This technology is called "Protected Storage". The Protected Storage uses a tree structure to manage data. A data piece allocated to a leaf in the tree structure is protected by being hierarchically encrypted with keys assigned to the root and the nodes arranged from the root to the leaf. The key assigned to the root of the tree structure is a key for a public key cryptosystem (i.e. root key). This key is called "asymmetric SRK (Storage Root Key)".

The Second Electronic Terminal Device 103 is a computer system including a CPU, a RAM, and so on. Generally, the Second Electronic Terminal Device 103 is structured from a PC, a mobile phone, a PDA or the like. In the similar manner as the First Electronic Terminal Device 102 is, the Second Electronic Terminal Device 103 is provided with a secure platform mainly including a security module called Trusted Platform Module (TPM), which is prescribed by the TCG. In the similar manner as the First Electronic Terminal Device 102 does, the Second Electronic Terminal Device 103 supports the Protected Storage technology, which uses a tree structure to manage data. However, its root key is not a key for a public key cryptosystem, but a key for a secret key cryptosystem. This key is called "symmetric SRK".

The following describes the details of the structures of the First Electronic Terminal Device 102 and the Second Electronic Terminal Device 103.

Figure 2:
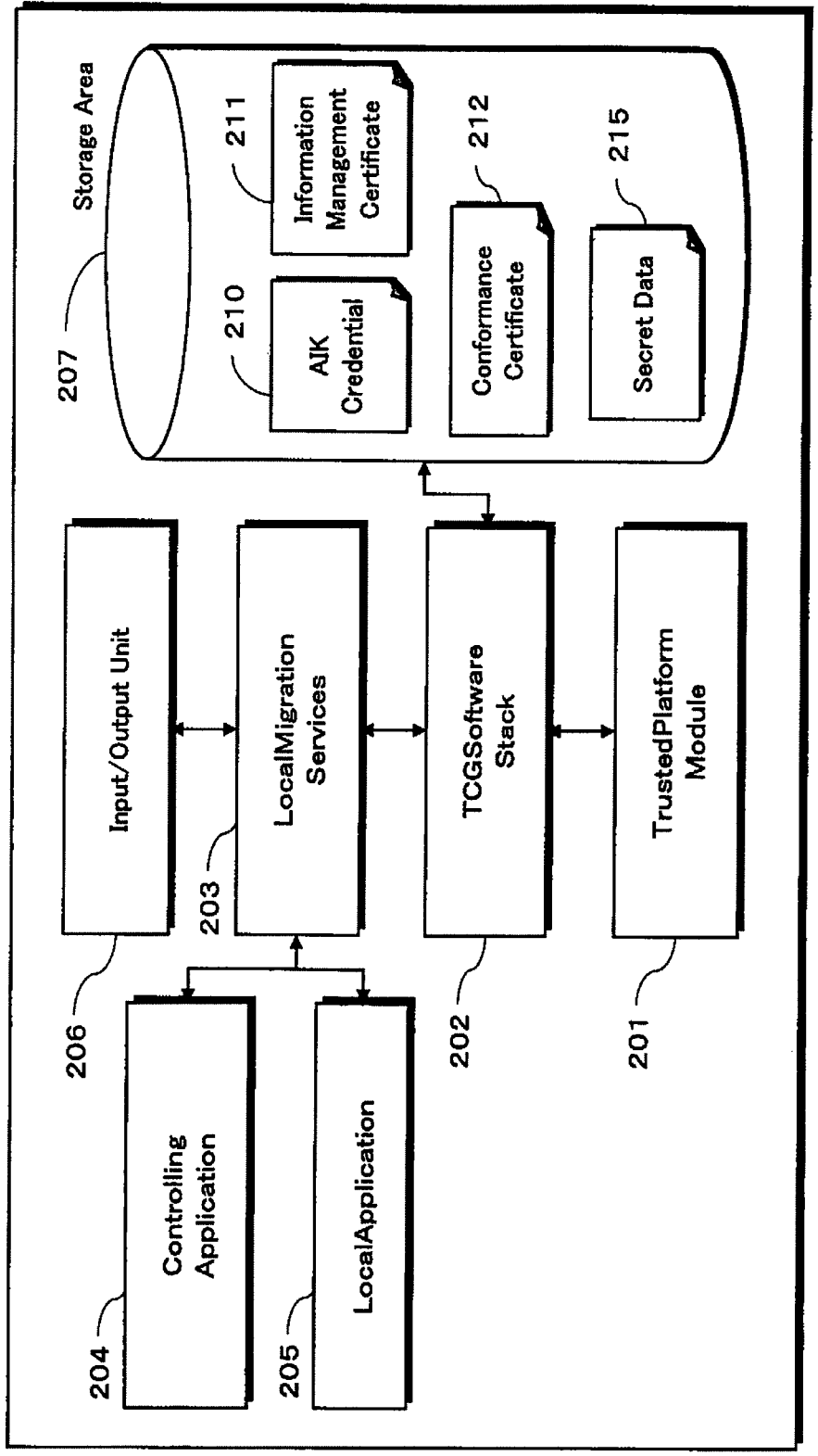
FIG. 2 shows a structure of a First Electronic Terminal Device pertaining to the first embodiment.

FIG. 2 shows the structure of the First Electronic Terminal Device 102 and the Second Electronic Terminal Device 103. The Trusted Platform Module 201 is a security module prescribed by the TCG, and includes a cryptographic engine, a non-volatile memory, and so on. The Trusted Platform Module 201 is not described further here because it is described in detail in "TPM Main Part 1, 2, 3 Design Principles".

Each security module provided in the first electric terminal device 102 and the Second Electronic Terminal Device 103 is referred to as "Trusted Platform Module (TPM)" here. However, it may be called differently. For example, according to the TCG Mobile Phone WG, a security module equivalent to the TPM is called "Mobile Trusted Module". The security module is generally implemented as hardware by using a semiconductor. However, it may be realized as software.

The TCG Software Stack 202 is software libraries for providing services to several applications on a secure platform that includes the Trusted Platform Module 201. The TCG Software Stack 202 is not described further here because it is described in detail in "TCG Software Stack (TSS) Specification Version 1.2 Level 1 Errata A".

The Local Migration Services 203 amount to a module used in a client, for the purpose of realizing a data migration service. The Local Migration Services 203 are not described further here because they are described in detail in Non-Patent Literature 1.

The Controlling Application 204 is a module used in a client, for the purpose of controlling migration processing performed in the client. The Controlling Application 204 is not described further here because it is described in detail in Non-Patent Literature 1.

The Local Application 205 is a general application using the data migration service. The Local Application 205 may be a Digital Rights Management (DRM) application, which is for managing rights of digital contents such as music and video, an address book application, a credit-card transaction application, or the like. However, these are only examples, and the Local Application 205 is not limited to them.

The Input/Output Unit 206 exchanges data with the Migration Authority 101.

The Storage Area 207 stores an AIK Credential 210, an Information Management Certificate 211, and so on. Generally, the Storage Area 207 is realized in a HDD, a flash memory, or the like. However, the Storage Area 207 may be realized in anything as long as it has a function to store information.

The AIK Credential 210 is an Attestation Identity Key Credential. In regard to this embodiment, it is assumed that the AIK Credential 210 has been issued by the Migration Authority 101. The AIK Credential 210 is used for checking whether the TPM has an AIK (Attestation Identity Key), for example. The AIK Credential 210 is not described further here because it is described in detail in "TCG Specification Architecture Overview".

The Information Management Certificate 211 is used for checking the method adopted for the management of the Secret Data 215. In regard to this embodiment, it is assumed that the Information Management Certificate 211 has been issued by the Migration Authority 101. The Information Management Certificate 211 is not described further here because it is described in detail in "TCG Specification Architecture Overview".

The Conformance Certificate 212 is an attribute certificate certifying the conformity with the TCG evaluation standard. Generally, the Conformance Certificate 212 is issued by an organization that performs the evaluation. In regard to this embodiment, it is assumed that the Conformance Certificate 212 has been issued by the Migration Authority 101.

Although the AIK Credential 210 and the Conformance Certificate 212 are explained above as separate certificates, they may be combined together into a single certificate.

The Secret Data 215 is a collection of secret data pieces that are managed by using an SRK (Storage Root Key). The Secret Data 215 includes the AIK. The secret data pieces protected with the SRK prescribed by the TCG are generally managed in a tree structure. The Secret Data 215 is not described further here because it is described in "TCG Specification Architecture Overview".

As explained above, the Secret Data 215 includes a key. In addition, the Secret Data 215 may include parameters indicating a time of generation of the key and the lifetime of the key, for example.

The following describes the details of the Information Management Certificate 211.

Figure 3:
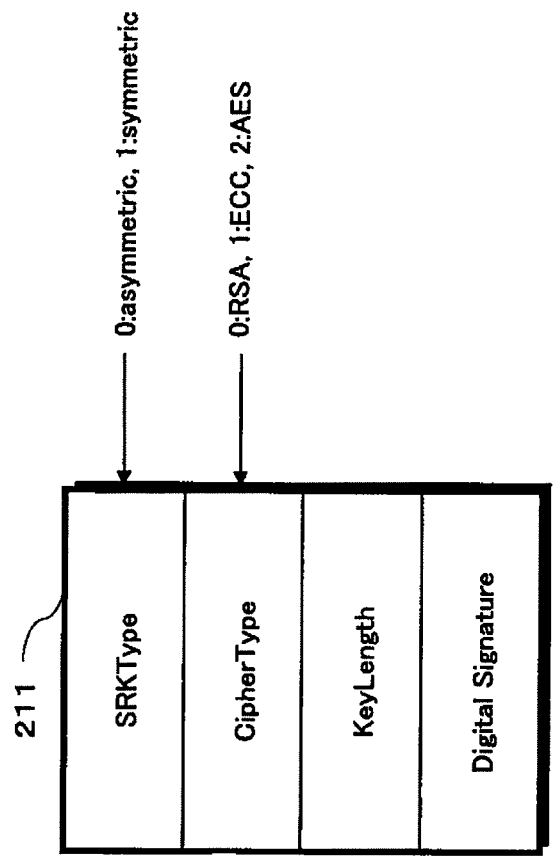
FIG. 3 shows a structure of an Information Management Certificate 211 pertaining to the first embodiment.

FIG. 3 shows the structure of the Information Management Certificate 211 pertaining to the first embodiment. The Information Management Certificate 211 includes four data pieces. The first data piece is a SRK Type. The SRK type shows whether the method adopted for the management of the Secret Data uses a public key cryptosystem or a secret key cryptosystem.

The second data piece is a Cipher Type. The Cipher Type shows the encryption algorithm used in the method adopted for the management of the Secret Data. The encryption algorithm may be RSA (Rivest Shamir Adleman), ECC (Elliptic Curve Cryptosystem), AES (Advanced Encryption Standard), or the like. However, these are only examples, and the encryption algorithm is not limited to them.

The third data piece is a Key Length. The Key Length shows the key length of the cryptographic key used in the method adopted for the management of the Secret Data.

The fourth data piece is a Digital Signature. The Digital Signature is generated by encrypting the digest values of the first to third data pieces with a secret key of the Migration Authority 101.

Note that the Information Management Certificate 211 may further contain a data piece showing whether a key update function is provided or not.

The following explains the details of the Conformance Certificate 212.

Figure 4:
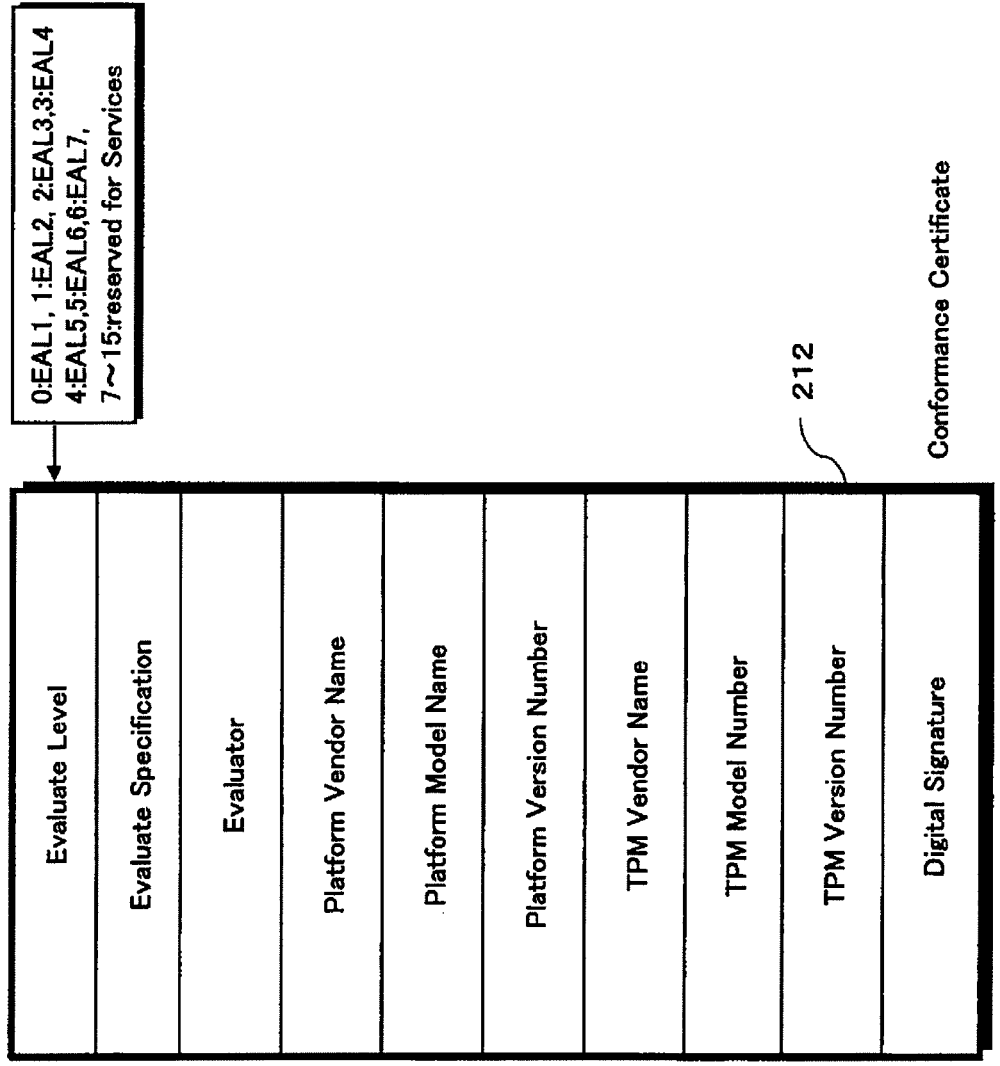
FIG. 4 shows a structure of a Conformance Certificate 211 pertaining to the first embodiment.

FIG. 4 shows the structure of the Conformance Certificate 212. The Conformance Certificate 212 includes nine data pieces. The first data piece shows an Evaluate Level. The Evaluate Level is, for example, a level certified based on the evaluation criteria defined in ISO/IEC 15408. "EAL" stands for "Evaluation Assurance Level". The number following "EAL" shows the security level, and a larger number shows that the requirements for a higher security level are satisfied. Note that levels such as "EAL4+" are also defined in ISO/IEC 15408. Thus, new definitions of the security levels adapting to the changes of the times may be added to this data. Furthermore, note that this data piece is not exclusively used for indicating levels that are certified based on the ISO/IES 15408. A carrier or the like that serves as the Migration Authority 101 may use the data piece for freely defining the levels.

The second data piece is used for identifying the version of the security evaluation criteria based on which the Evaluate Levels are defined. The ISO/IEC 15408 has several versions, such as "ISO/IEC 15408: 1999" defined in 1999 and "ISO/IEC 15408: 2005" defined in 2005. Thus, this data piece is referred to for identifying the version of the security evaluation criteria.

The third data piece and the subsequent data pieces are described in the "TCG Specification Architecture Overview". Thus their explanations are omitted here.

The following explains the details of the Migration Authority 101.

Figure 5:
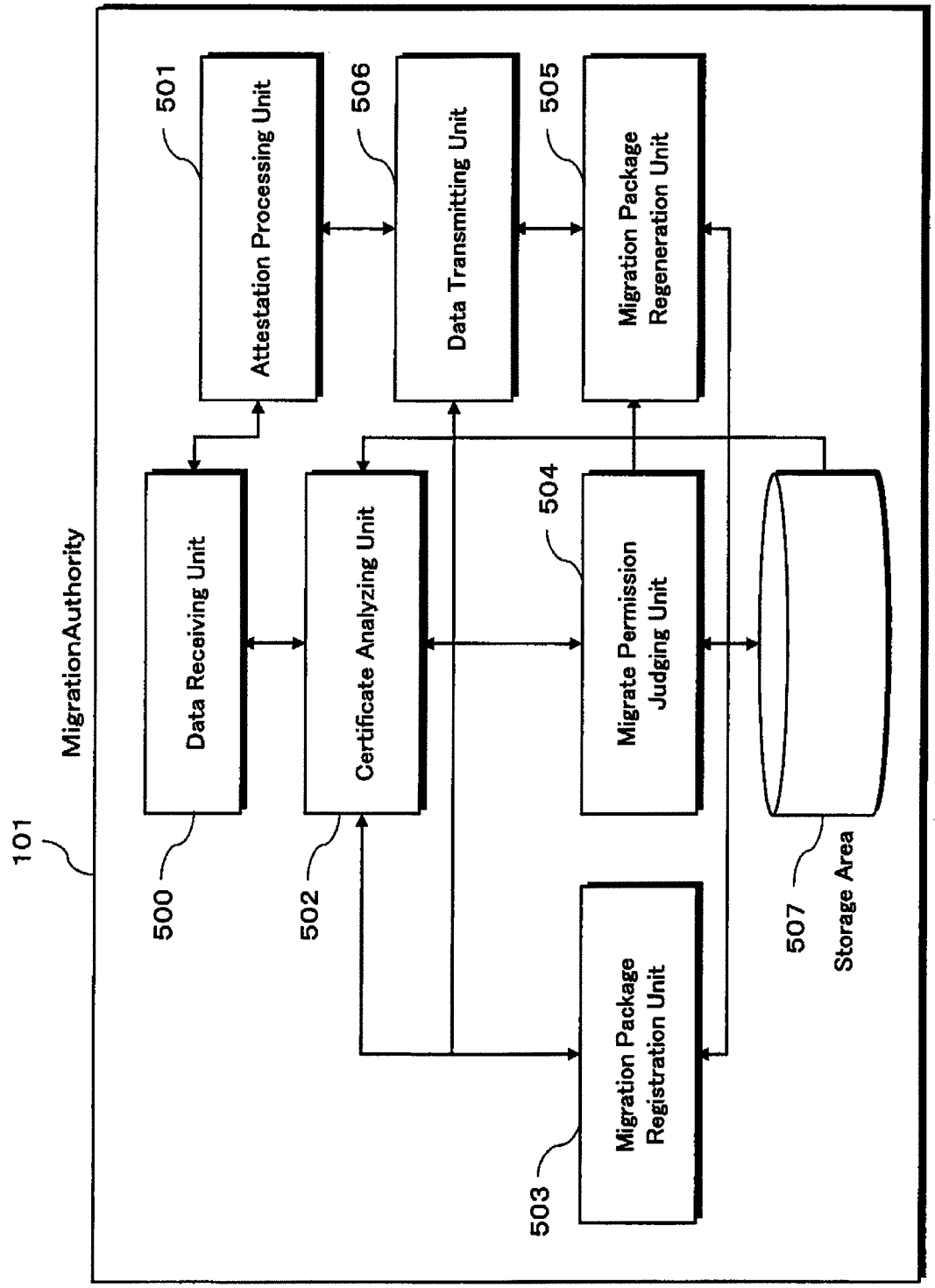
FIG. 5 shows a structure of a Migration Authority 101 pertaining to the first embodiment.

FIG. 5 shows the structure of the Migration Authority 101.

A Data Receiving Unit 500 receives requests for uploading and downloading of a Migration Package from the First Electronic Terminal Device 102 and the Second Electronic Terminal Device 103. The Data Receiving Unit 500 also receives data pieces required for processing procedures.

An Attestation Processing Unit 501 performs attestation processing when the Migration Authority 101 is accessed from an electronic terminal device. Any improprieties of the electronic terminal device will be found through the attestation processing. The attestation processing is described in the "TCG Specification Architecture Overview". Thus its explanations are omitted here. The result of the attestation processing is sent to the electronic terminal device via a Data Transmitting Unit 506.

A Certificate Analyzing Unit 502 analyzes certificates received from an electronic terminal device as a migration source or an electronic terminal device as a migration destination, to judge whether the certificates are valid or not. Here, it is assumed that the Certificate Analyzing Unit 502 has an RSA cryptographic processing function, and stores a pair of a public key and a private key used in the RSA processing, and also has an SHA (Secure Hash Algorithm) processing function.

It is assumed here that a verification method with use of a public key cryptosystem defined by a Public Key Infrastructure (PKI) is used for the verification of the validity of the certificates. The verification with use of the PKI is not explained here, because it is a well-known technology. Note that any method may be used for the verification as long as it can be used for verifying the validity of the certificate. Although some certificates may be issued by other than the Migration Authority 101, it is assumed in the present embodiment that all the certificates have been issued by the Migration Authority 101. Thus, the explanations of the cases where certificates have been issued by other than the Migration Authority 101 are omitted here.

The result of the verification of the validity of the certificate is transmitted to an electronic terminal device via the Data Transmitting Unit 506.

A Migration Package Registration Unit 503 registers a Migration Package into a Migration Package Management Table 601, which will be described later, and stores the table in a Storage Area 507. A Migration Package contains secret data pieces that the Migration Package Registration Unit 503 receives from the Electronic Terminal Device 102 or the Electronic Terminal Device 103.

A Migrate Permission Judging Unit 504 judges whether the migration is to be permitted or not based on a Migration Package ID, an encrypted parent key, Encryption Parameters 1201, a Conformance Certificate 212 and an Information Management Certificate 211, in response to a Migration Package transmission request. The Migration Package ID, the encrypted parent key and the Encryption Parameters 1201 will be explained later. For the judgment, the Migrate Permission Judging Unit 504 uses an Encryption Strength Table 701, an Authentication Level Judgment Table 801, and a Migration Package Management Table 601, which will be explained later. When judging that the migration is to be permitted, the Migrate Permission Judging Unit 504 sends a Migration Package regeneration request to a Migration Package Regeneration Unit 505.

Note that although it is described above that the Migrate Permission Judging Unit 504 makes the judgment based on the Migration Package Management Table 601, the Migrate Permission Judging Unit 504 may directly access the certificate to make the judgment.

The Migration Package Regeneration Unit 505 receives, from the Migrate Permission Judging Unit 504, the Migration Package regeneration request as well as the Migration Package ID, the encrypted parent key, the Encryption Parameters, the Conformance Certificate 212, and the Information Management Certificate 211. The Migration Package Regeneration Unit 505 then performs cryptographic conversion on the Migration Package to regenerate it. The details of the processing procedures for the regeneration will be described later. The Migration Package Regeneration Unit 505 sends the regenerated Migration Package to the Data Transmitting Unit 506.

On receipt of the Migration Package from the Migrate Permission Judging Unit 504, the Data Transmitting Unit 506 extracts the Migration Package from the Storage Area 507, and sends it to the Electronic Terminal Device 102 and the Electronic Terminal Device 103.

The following explains the details of the Migration Package Management Table 601.

FIG. 6 shows the structure of the Migration Package Management Table 601. The table contains a Migration Package ID, a file name of the Migration Package, and so on. The Migration Package ID identifies the Migration Package in the Migration Authority 101. The file name contains the full path to the Storage Area 507 where the Migration Package is stored. The other parameters are the same as the parameters of the Information Management Certificate 211 and the Evaluate Level of the Conformance Certificate 212. Thus, their explanations are omitted here.

The following explains the details of the Encryption Strength Table 701.

FIG. 7 shows the structure of the Encryption Strength Table 701. The table contains parameters such as a Strength Level, a Secret Key Cryptographic Algorithm Key Length, an RSA Algorithm Key Length and an ECC Algorithm Key Length. For example, FIG. 7 shows that the Strength Level 1 is satisfied when the key length in the case of using the secret key cryptographic algorithm is 80 bits, the key length in the case of using the RSA algorithm is 1024 bits, and the key length in the case of using the ECC algorithm is 160 bits.

Note that the Encryption Strength Table 701 is based on the assumption that no vulnerability has been found in the encryption algorithms. If vulnerability is found in an encryption algorithm, its key length is required to be longer. Thus, the Encryption Strength Table 701 may change according to the changes of the times. According to the needs, the Encryption Strength Table 701 may be updated by a third-party organization such as a certificate authority. The updating enables the Encryption Strength Table 701 to support the evaluation of the strength of up-to-date cryptosystems and encryption algorithms.

The Migrate Permission Judging Unit 504 uses the Encryption Strength Table 701 to make the judgment according to a judgement algorithm showing that the Migrate Permission Judging Unit 504 is to permit the migration when the Strength Level of the migration destination electronic terminal device is not lower than the migration source. This is for preventing the Strength Level from being lowered due to the migration.

For example, the judgment algorithm permits the migration when the authentication level of the migration destination is not lower than the level that is one-level lower than the authentication level of the migration source. Alternatively, the judgment algorithm may not permit the migration unless the authentication level of the migration destination is lower than the level that is one-level higher than the authentication level of the migration destination.

Also, the judgment algorithm to be used by the Migrate Permission Judging Unit 504 may be designated by the migration source. Furthermore, the migration source may transmit the Encryption Strength Table 701 and the Authentication Level Judgment Table 801 to be used for the judgment to the Migration Authority 101, to enable the Migration Authority 101 to designate a judgment algorithm.

The following explains the details of the Authentication Level Judgment Table 801.

FIG. 8 shows the structure of the Authentication Level Judgment Table 801. The Authentication Level Judgment Table 801 shows a security policy showing variations of the Migration Authority level for permitting the migration. The table contains parameters such as a Migrate Source Authentication Level, a Migrate Destination Authentication Level. For example, according to the Authentication Level Judgment Table 801, when the Migrate Source Authentication Level is EAL1, any Migrate Destination Authentication Levels are acceptable (ANY). When the Migrate Source Authentication Level is EAL2, the Migrate Destination Authentication Level is required to be no lower than EAL1. When the Migrate Source Authentication Level is EAL3, the Migrate Destination Authentication Level is required to be no lower than EAL2. When the Migrate Source Authentication Level is EAL4, the Migrate Destination Authentication Level is required to be no lower than EAL3. When the Migrate Source Authentication Level is EAL5 or higher, the Migrate Destination Authentication Level is required to be the same as the Migrate Source Authentication Level. When the Migrate Source Authentication Level is other than EAL1 to EAL7, any Migrate Destination Authentication Levels are acceptable.

According to the example above, when the Migrate Source Authentication Level is in the range from EAL2 to EAL4, the Migrate Destination Authentication Level that is one-level lower than the Migrate Source Authentication Level is acceptable. However, the Migrate Destination Authentication Level may be required to be the same as or higher than the Migrate Source Authentication Level.

The following explains the operations of uploading secret data pertaining to the present embodiment.

Figure 9:
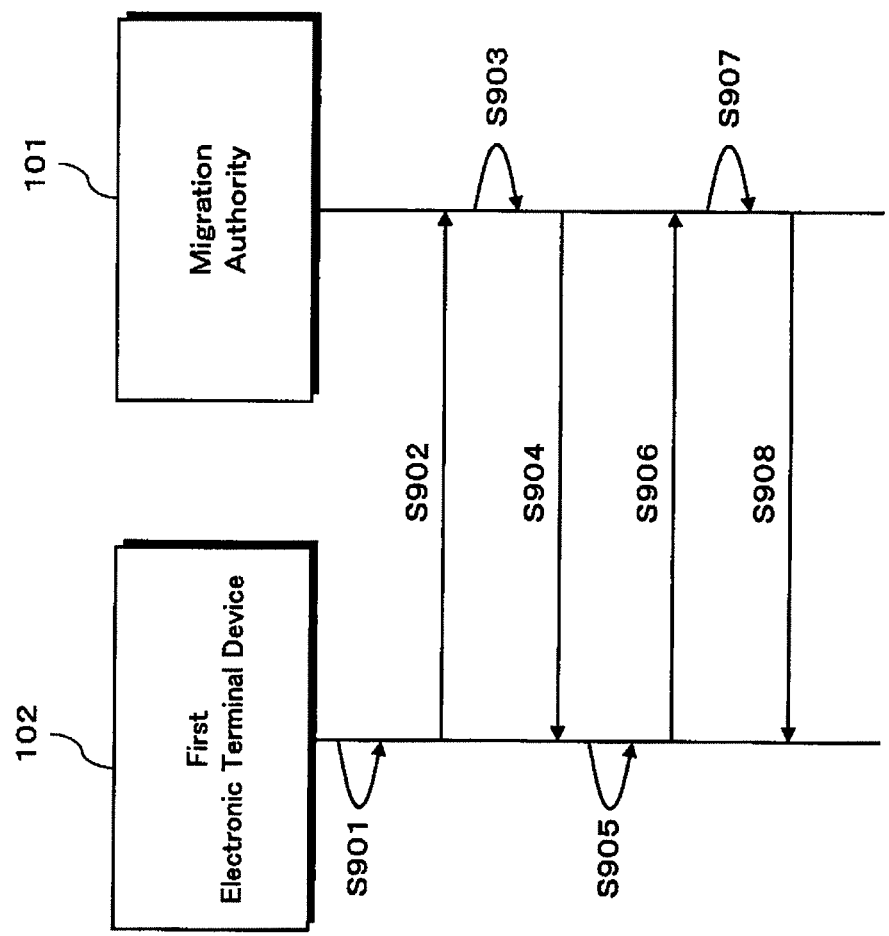
FIG. 9 is a flowchart showing processing procedures by which a First Electronic Terminal Device 102 pertaining to the first embodiment uploads Secret Data to the Migration Authority 101.

FIG. 9 shows processing procedures through which the First Electronic Terminal Device 102 uploads the Secret Data to the Migration Authority 101. The following explains the processing procedures.

S901: The First Electronic Terminal Device 102 prepares for uploading the Secret Data. The First Electronic Terminal Device 102 generates collective data called "Migration Package" by aggregating the one or more pieces of Secret Data to be uploaded. The Migration Package is described in detail in Non-Patent Literature 1. Thus, its explanation is omitted here.

The First Electronic Terminal Device 102 has a function called "Integrity Measurement" defined in the TCG. The First Electronic Terminal Device 102 uses this function to retrieve a digest value from registers called "Platform Configuration Registers (PCR) contained in the Trusted Platform Module 201. The digest value is calculated based on part or all of the software pieces as the components of the First Electronic Terminal Device 102, such as a boot loader, an OS, a device driver and an application. Within the Trusted Platform Module 201, the First Electronic Terminal Device 102 applies a digital signature to the digest value by using the AIK contained in the Secret Data 215.

The Integrity Measurement is not described further here because it is described in "TCG Specification Architecture Overview".

S902: The First Electronic Terminal Device 102 makes a request (upload request) for uploading the Migration Package to the Migration Authority 101. The First Electronic Terminal Device 102 sends the digest value, the digital signature and the AIK Credential 210 together with the request, to the Migration Authority 101.

The sending of the digest value and the digital signature is called "Integrity Reporting". The Integrity Reporting is not described further here because it is described in "TCG Specification Architecture Overview".

S903: The Migration Authority 101 receives the upload request for uploading the Migration Package, from the First Electronic Terminal Device 102. The Migration Authority 101 sends the digest value, the digital signature and the AIK Credential 201, which the Migration Authority 101 receives together with the request, to the Attestation Processing Unit 501. The Attestation Processing Unit 501 verifies whether the First Electronic Terminal Device 102 is an illegitimate terminal device or not by executing attestation processing. The term "illegitimate device" means a device that has been tampered with by a malicious user or a virus and operates in an unexpected manner.

S904: The Migration Authority 101 performs the following operations according to the result of Step S903.

i) If the First Electronic Terminal Device 102 is found legitimate, the Migration Authority 101 sends the attestation result "OK" and a public key (MApubKey) of the Migration Authority 101 to the First Electronic Terminal Device 102.

ii) If the First Electronic Terminal Device 102 is found illegitimate, the Migration Authority 101 sends the attestation result "NG" to the First Electronic Terminal Device 102.

S905: The First Electronic Terminal Device 102 performs the following operations according to the information received from the Migration Authority 101.

i) If the information received from the Migration Authority 101 is "OK", the First Electronic Terminal Device 102 encrypts the Migration Package generated in Step S901, by using the MApubKey received together with the information "OK".

ii) If the information received from the Migration Authority 101 is "NG", the First Electronic Terminal Device 102 ends the processing.

According to the explanation above, the Migration Package is encrypted by using the MApubKey, for secure management of the Migration Package. However, any method may be used as long as it realizes secure management of the Migration Package. For example, the First Electronic Terminal Device 102 and the Migration Authority 101 may perform mutual authentication, and use a temporal shared key called "session key" to perform cryptographic communication.

S906: The First Electronic Terminal Device 102 sends the Migration Package encrypted in Step S905, the Conformance Certificate 212, and the Information Management Certificate 211 to the Migration Authority 101.

In this description, the Migration Package, the Conformance Certificate 212, and the Information Management Certificate 211 are regarded as separate data pieces. However, the certificates may be contained in the Migration Package.

S907: The Migration Authority 101 receives the Migration Package, the Conformance Certificate 212, and the Information Management Certificate 211. On receipt of these data pieces, the Data Receiving Unit 500 sends them to the Certificate Analyzing Unit 502.

The Certificate Analyzing Unit 502 verifies the validity of the certificates, and performs the following operations according to the result of the verification.

i) If all the certificates are found valid, the Certificate Analyzing Unit 502 sends them to the Migration Package Registration Unit 503.

ii) If any of the certificates is found invalid, the Certificate Analyzing Unit 502 returns "NG" via the Data Transmitting Unit 506.

On receipt of the Migration Package, the Conformance Certificate 212 and the Information Management Certificate 211 from the Certificate Analyzing Unit 502, the Migration Package Registration Unit 503 generates a Migration Package ID which uniquely identifies the Migration Package of the Migration Authority 101, and stores the Migration Package into the Storage Area 507. Also, the Migration Package Registration Unit 503 extracts data pieces from the storage location and from the certificates, and registers them into the Migration Package Management Table.

S908: On completion of the registration in Step S907, the Migration Authority 101 sends the result "OK" and the Migration Package ID to the First Electronic Terminal Device 102 via the Data Transmitting Unit 506.

The following explains the operations of downloading the Secret Data pertaining to the present embodiment.

Figure 10:
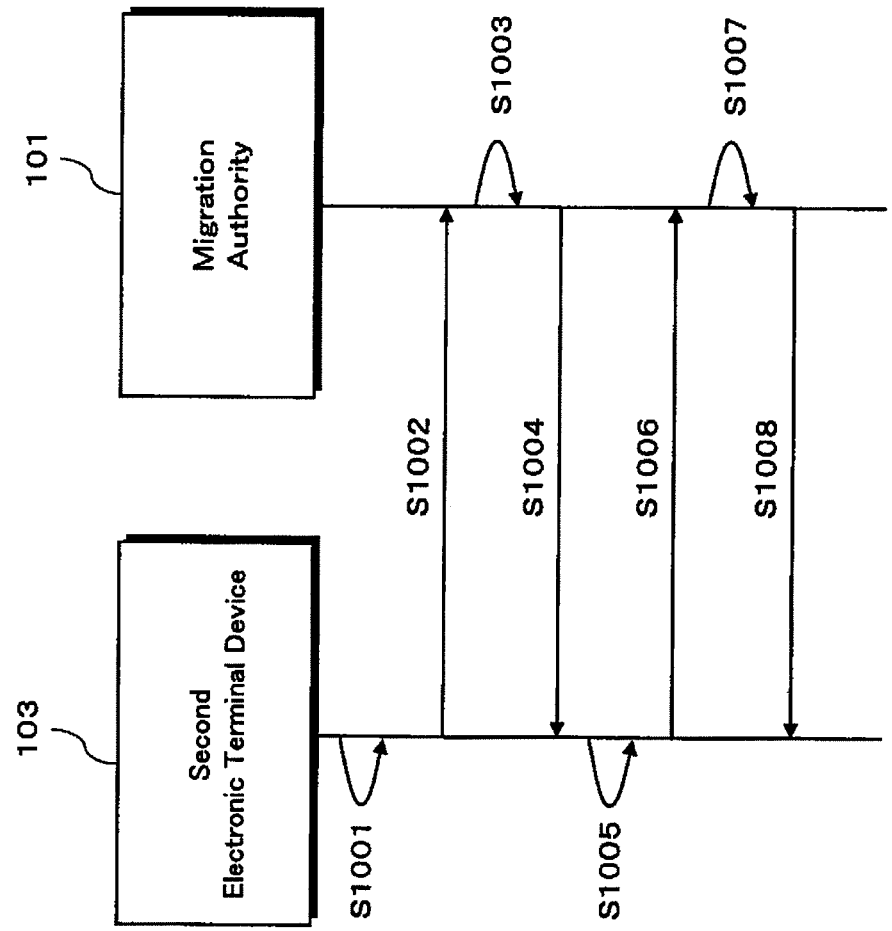
FIG. 10 is a flowchart showing processing procedures by which a Second Electronic Terminal Device 103 pertaining to the first embodiment downloads Secret Data from the Migration Authority 101.

FIG. 10 shows processing procedures through which the Second Electronic Terminal Device 103 downloads the Secret Data from the Migration Authority 101. The following explains the processing procedures.

S1001: The Second Electronic Terminal Device 103 prepares for downloading the Secret Data. Specifically, the Second Electronic Terminal Device 103 has a function called "Integrity Measurement" defined in the TCG, and uses this function to retrieve a digest value from registers called "Platform Configuration Registers (PCR) contained in the Trusted Platform Module 201. The digest value is calculated based on part or all of the software pieces as the components of the Second Electronic Terminal Device 103, such as a boot loader, an OS, a device driver and an application. Within the Trusted Platform Module 201, the Second Electronic Terminal Device 103 applies a digital signature to the digest value by using the AIK contained in the Secret Data 215.

S1002: The Second Electronic Terminal Device 103 makes a request (a download request) for downloading the Migration Package from the Migration Authority 101. The Second Electronic Terminal Device 103 sends the digest value, the digital signature and the AIK Credential 210 together with the request, to the Migration Authority 101.

S1003: The Migration Authority 101 receives the request for downloading the Migration Package, from the Second Electronic Terminal Device 103. The Migration Authority 101 sends the digest value, the digital signature and the AIK Credential, which the Migration Authority 101 receives together with the request, to the Attestation Processing Unit 501. The Attestation Processing Unit 501 verifies whether the Second Electronic Terminal Device 103 is an illegitimate terminal device or not by executing the attestation processing.

S1004: The Migration Authority 101 performs the following operations according to the result of Step S1003.

i) If the Second Electronic Terminal Device 103 is found legitimate, the Migration Authority 101 sends the attestation result "OK" and a public key (MApubKey) of the Migration Authority 101 to the Second Electronic Terminal Device 103.

ii) If the Second Electronic Terminal Device 103 is found illegitimate, the Migration Authority 101 sends the attestation result "NG" to the Second Electronic Terminal Device 103.

S1005: The Second Electronic Terminal Device 103 performs the following operations according to the information received from the Migration Authority 101.

i) If the information received from the Migration Authority 101 is "OK", the Second Electronic Terminal Device 103 encrypts a parent key by using the MApubKey received together with the information "OK". The parent key is a key to be used for encrypting the secret data piece at the top of the tree structure of the expanded Migration Package.

ii) If the information received from the Migration Authority 101 is "NG", the Second Electronic Terminal Device 103 ends the processing.

According to the explanation above, the parent key is encrypted by using the MApubKey, for secure management of the parent key. However, any method may be used as long as it realizes secure management of the parent key. For example, the Second Electronic Terminal Device 103 and the Migration Authority 101 may perform mutual authentication, and use a temporal shared key called "session key" to perform cryptographic communication.

S1006: The Second Electronic Terminal Device 103 sends the Migration Package ID of the Migration Package to be downloaded, the parent key encrypted in Step S1005, the Encryption Parameters used for regeneration of the Migration Package, the Conformance Certificate 212, and the Information Management Certificate 211 to the Migration Authority 101.

S1007: The Migration Authority 101 receives the Migration Package ID, the encrypted parent key, the Encryption Parameters, the Conformance Certificate 212, and the Information Management Certificate 211. On receipt of these data pieces, the Data Receiving Unit 500 sends them to the Certificate Analyzing Unit 502.

The Certificate Analyzing Unit 502 verifies the validity of the certificates, and performs the following operations according to the result of the verification.

i) If all the certificates are found valid, the Certificate Analyzing Unit 502 sends the Migration Package ID, the encrypted parent key, the Encryption Parameters, the Conformance Certificate 212 and the Information Management Certificate 211 to the Migrate Permission Judging Unit 504.

ii) If any of the certificates is found invalid, the Certificate Analyzing Unit 502 returns "NG" via the Data Transmitting Unit 506.

The Migrate Permission Judging Unit 504 receives the Migration Package ID, the encrypted parent key, the Encryption Parameters, the Conformance Certificate 212 and the Information Management Certificate 211 from the Certificate Analyzing Unit 502. The operations for the judgment by the Migrate Permission Judging Unit 504 will be explained later with reference to FIG. 11. According to the result of the judgment, the Migrate Permission Judging Unit 504 performs the following operations.

i) If the result is "OK", the Migrate Permission Judging Unit 504 sends, to the Migration Package Regeneration Unit 505, a request for regenerating the Migration Package, together with the Migration Package ID, the encrypted parent key, the Encryption Parameters, the Conformance Certificate 212 and the Information Management Certificate 211.

ii) If the result is "NG", the Migrate Permission Judging Unit 504 returns "NG" via the Data Transmitting Unit 506.

On receipt of the Migration Package ID, the encrypted parent key, the Encryption Parameters, the Conformance Certificate 212 and the Information Management Certificate 211 together with the request for regenerating the Migration Package, the Migration Package Regeneration Unit 505 regenerates the Migration Package indicated by the Migration Package ID. The operations for the regeneration will be explained later with reference to FIG. 13.

S1008: On completion of the operations in Step S1007, the Migration Authority 101 sends the result "OK" and the Migration Package to the Second Electronic Terminal Device 103 via the Data Transmitting Unit 506.

Note that on receipt of the Migration Package, the Second Electronic Terminal Device 103 may decrypt the Migration Package within the Trusted Platform Module 201, and judge whether the data is valid or not by using the certificates. In this case, if the data is invalid, the Second Terminal Device 103 may request the Migration Authority 101 to resend the Migration Package.

The following explains the operations for judging whether the migration of the Secret Data pertaining to the present embodiment is to be permitted or not.

Figure 11:
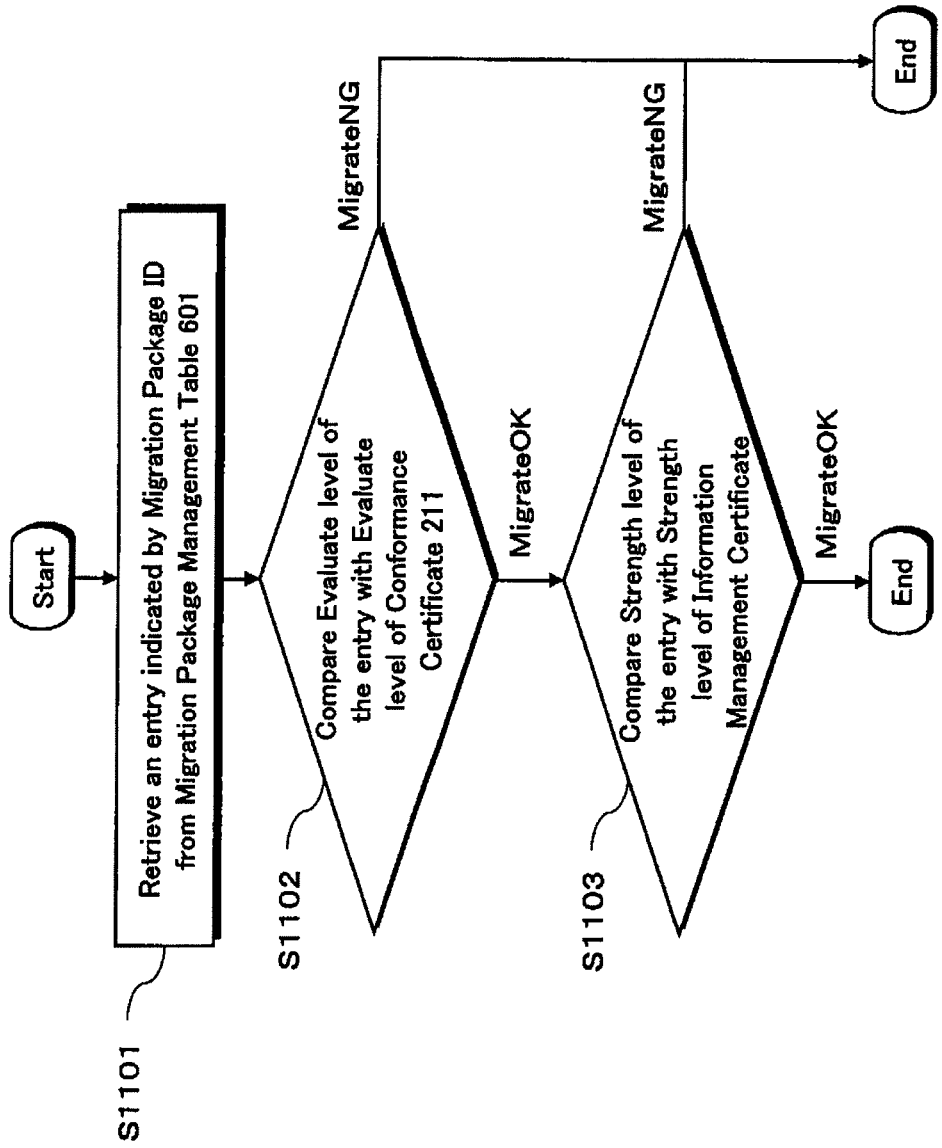
FIG. 11 is a flowchart showing processing procedures by which a Migrate Permission Judging Unit 504 in the Migration Authority 101 pertaining to the first embodiment judges whether migration is to be permitted or not.

FIG. 11 shows the operations of the Migrate Permission Judging Unit 504 in the Migration Authority 101.

In the following explanation, it is assumed that the designated Migration Package ID is "001", the Evaluate Level of the Conformance Certificate 212 is "EAL4", the SRK Type of the Information Management Certificate 211 is "symmetric", the Cipher Type is "AES", and the Key Length is "128".

S1101: The Migrate Permission Judging Unit 504 retrieves the entry indicated by the received Migration Package ID from the Migration Package Management Table 601.

S1102: The Migrate Permission Judging Unit 504 firstly performs comparison and judgment with respect to the Evaluate Levels. For the judgment, the Migrate Permission Judging Unit 504 uses the Authentication Level Judgment Table 801.

According to the present embodiment, the Evaluate Level of the Conformance Certificate 212 is "EAL4". The Evaluate Level designated by the Migration ID "001" is "EAL4". Thus, their Evaluate Levels are the same. According to the Authentication Level Judgment Table 801, the migration is to be permitted when the level is no lower than "EAL3". Thus, the Migrate Permission Judging Unit 504 judges affirmatively.

S1103: The Migrate Permission Judging Unit 504 performs comparison and judgment with respect to the encryption strength.

According to the Information Management Certificate 211 pertaining to the present embodiment, the SRK Type is "symmetric", the Cipher Type is "AES", and the Key Length is "128". In the entry designated with the Migration ID "001", the SRK Type is "asymmetric", the Cipher Type is "RSA", and the Key Length is "2048". Since their SRK Types and the Cipher Types are different, it is impossible to judge the Strength Level only by comparing the Key Lengths. Thus, the Encryption Strength Table 701 is to be used for the judgement of the Strength Level.

As shown in the Encryption Strength Table 701, the encryption Strength Level designated with the Migration Package ID "001" is "Strength Level 2". On the other hand, as also shown in the Encryption Strength Table 701, the encryption strength level designated in the Information Management Certificate 211 is "Strength Level 3". The judgment algorithm of the Migrate Permission Judging Unit 504 permits the migration when the Strength Level of the migration destination is no lower than the Strength Level of the migration source. Thus, the Migrate Permission Judging Unit 504 judges affirmatively.

The following explains the details of the structure of the Encryption Parameters 1201.

Figure 12:
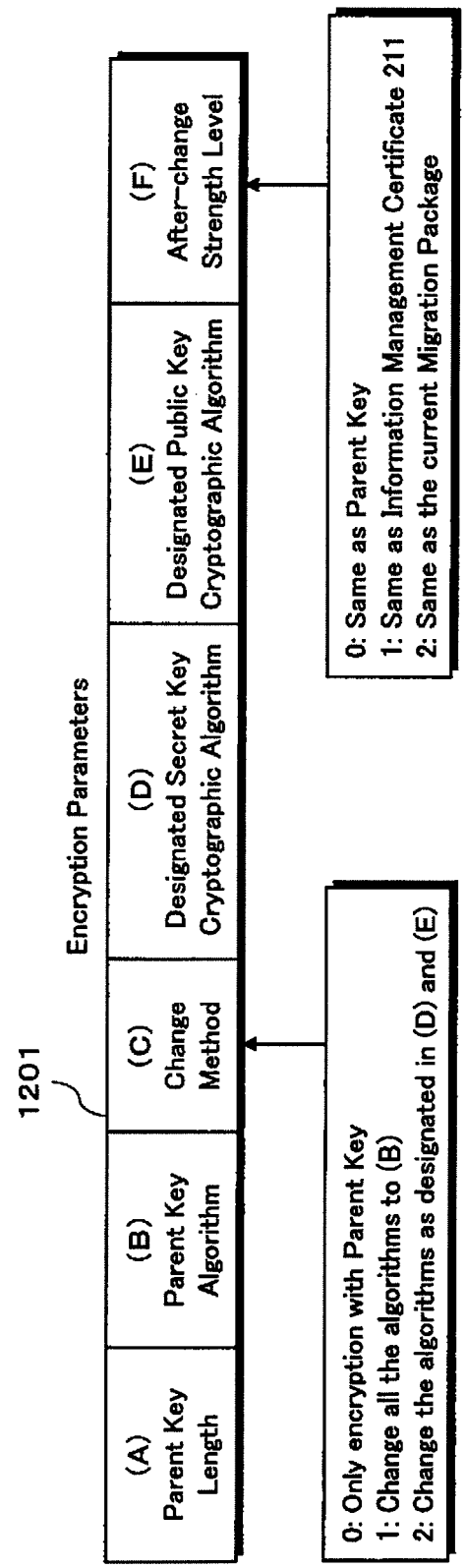
FIG. 12 shows a structure of Encryption Parameters 1201 pertaining to the first embodiment, which are transmitted by an electronic terminal device when a Migration Package is downloaded.

FIG. 12 shows the structure of the Encryption Parameters 1201, which are transmitted by an electronic terminal device when a Migration Package is downloaded. The Encryption Parameters 1201 contain six parameters.

The first one is (A) Parent Key Length. This parameter shows the key length of the parent key sent in Step S1006.

The second one is (B) Parent Key Algorithm. This parameter shows an encryption algorithm to be applied when the parent key transmitted in step S1006 is used. For example, RSA, ECC or AES is designated here.

The third one is (C) Change Method. This parameter shows how the Migration Package Regeneration Unit 505 generates the Migration Package. One of the following three methods can be designated here.

(1) Parameter "0": Encrypt only the data just below the parent key in the hierarchy by using the parent key.

(2) Parameter "1": Change all the encryption algorithms for the Secret Data contained in the Migration Package to the algorithm designated by (B) Parent Key Algorithm.

(3) Parameter "2": Among the encryption algorithms for the Secret Data contained in the Migration Package, change the secret key cryoptographic algorithms to the algorithm designated in (D) Designated Secret Key Cryptographic Algorithm. Also, change the public key cryptosystem algorithms to the algorithm designated in (E) Designated Public Key Algorithm.

The fourth one is (D) Designated Secret Key Cryptographic Algorithm, in which a secret key cryptographic algorithm is designated. This parameter is referred to when the parameter "2" is designated in (C) Change Method.

The fifth one is (E) Designated Public Key Cryptographic Algorithm, in which a public key cryptographic algorithm is designated. This parameter is referred to when the parameter "2" is designated in (C) Change Method.

The sixth one is (F) After-change Strength Level. This parameter is referred to when the parameter "1" or the parameter "2" is designated in (C) Change Method. One of the following three methods can be designated here.

(1) Parameter "0": Regenerate the Migration Package at the same Strength Level as the parent key.

(2) Parameter "1": Regenerate the Migration Package at the same Strength Level as the Information Management Certificate 211.

(3) Parameter "2": Regenerate the Migration Package at the same Strength Level as the current Migration Package.

The following explains the operations for the regeneration to be performed when the Migration Package Regeneration Unit 505 is given a set of Encryption Parameters.

Figure 13:
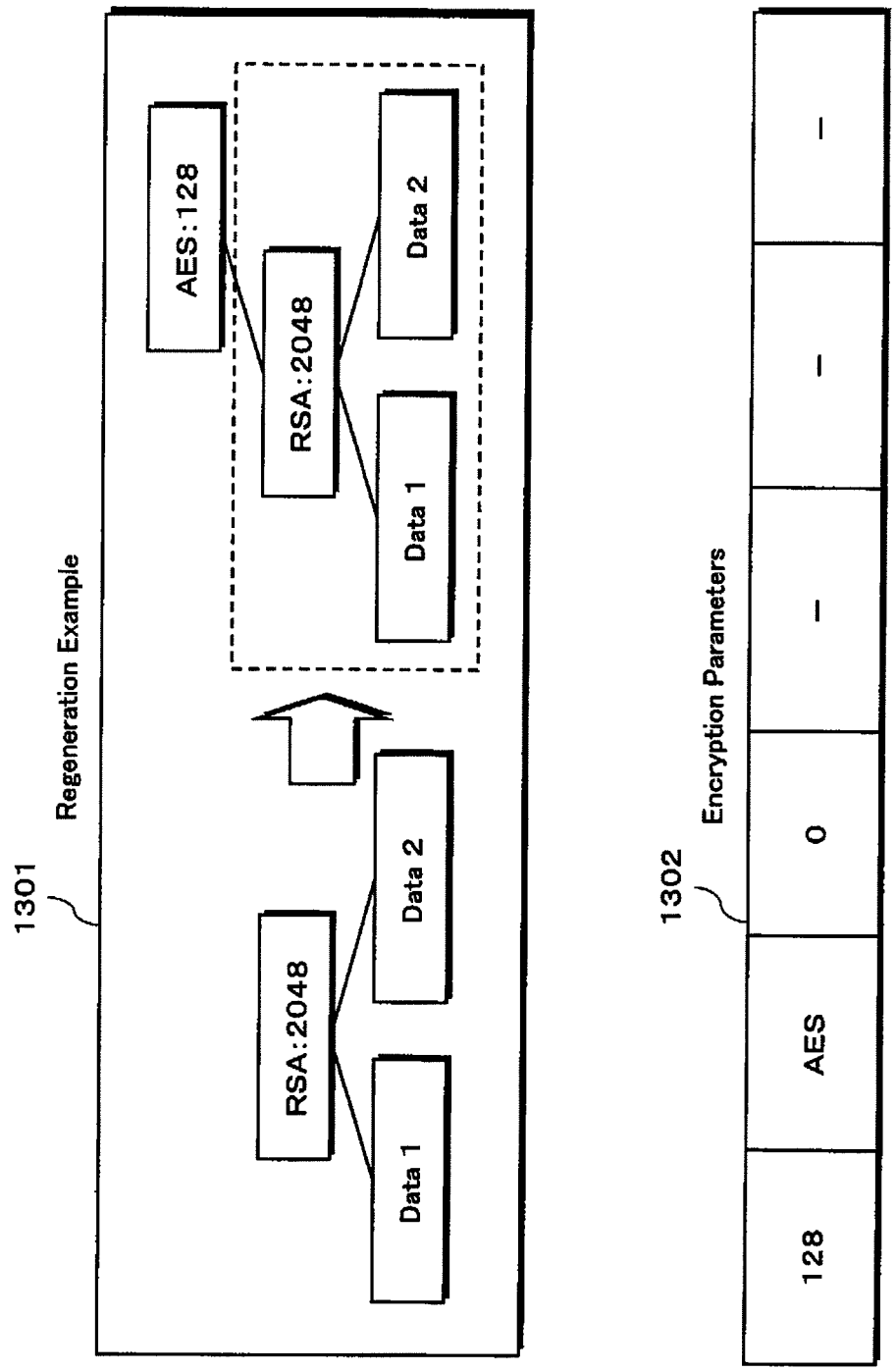
FIG. 13 shows a result of regeneration of Migration Package pertaining to the first embodiment when Encryption Parameters 1302 are provided.
Figure 14:
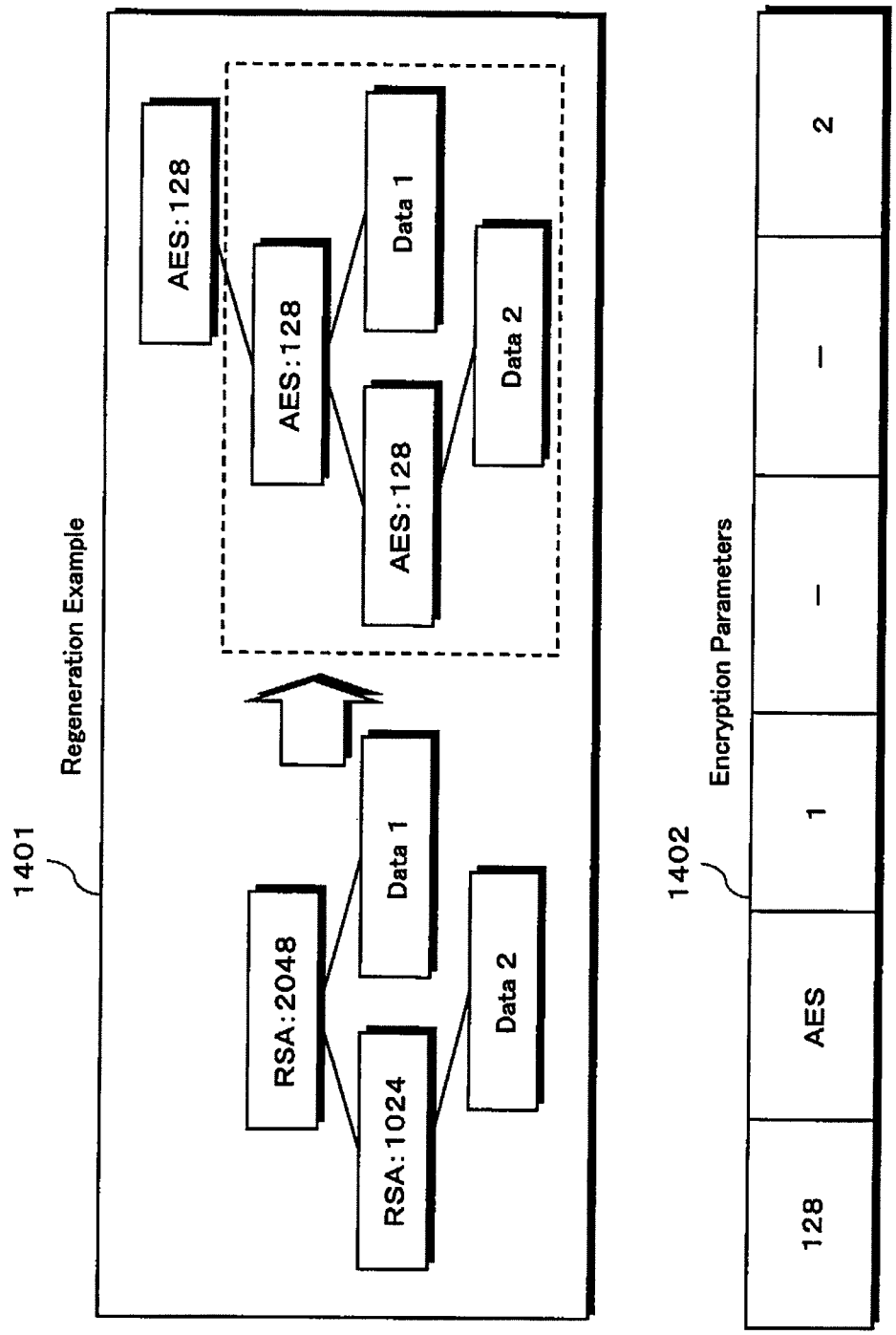
FIG. 14 shows a result of regeneration of a Migration Package pertaining to the first embodiment when Encryption Parameters 1402 are provided.
Figure 15:
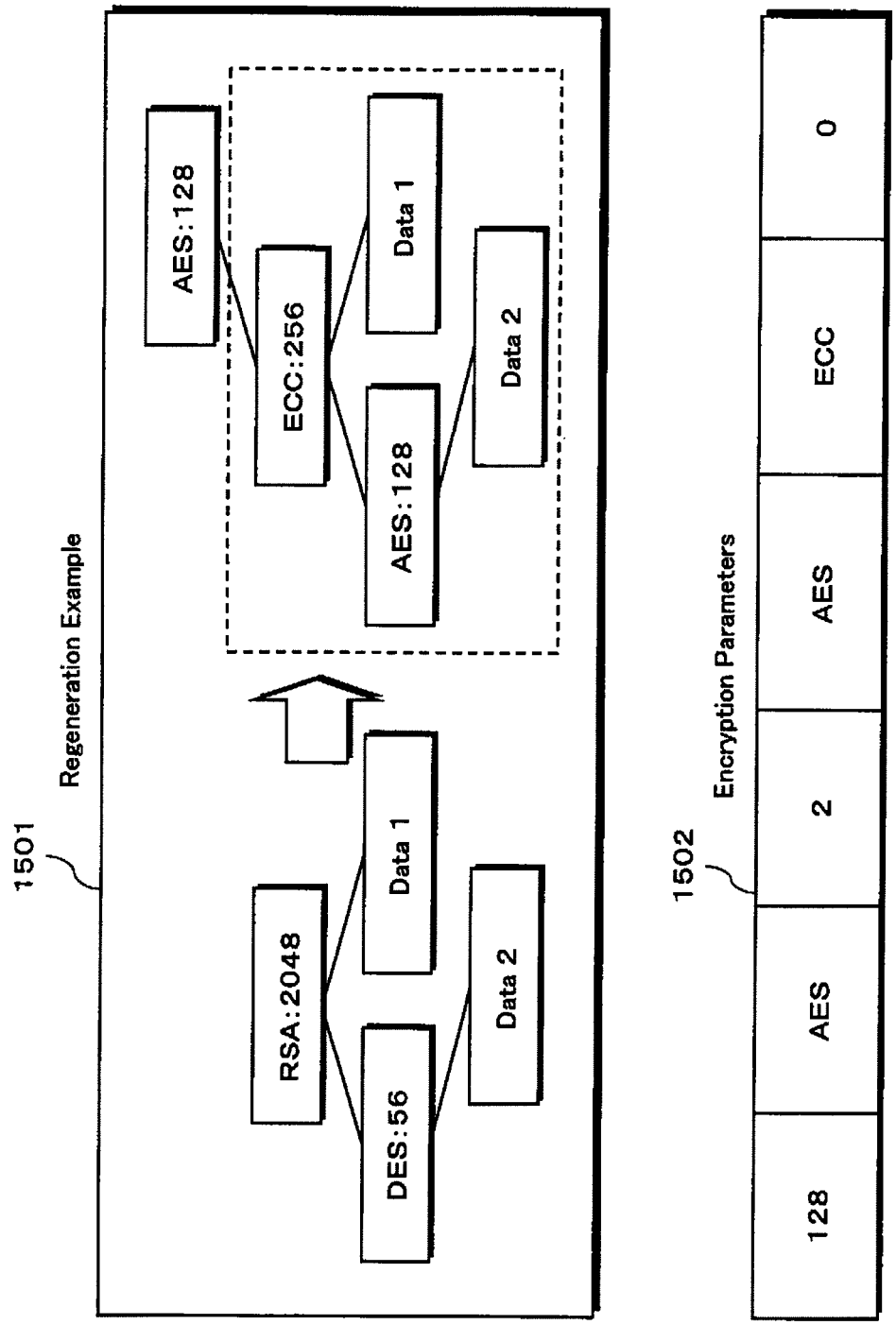
FIG. 15 shows a result of regeneration of a Migration Package pertaining to the first embodiment when Encryption Parameters 1502 are provided.

FIG. 13 to FIG. 15 show examples of the regeneration performed when the Migration Package Regeneration Unit 505 of the Migration Authority 101 is given a set of Encryption Parameters.

FIG. 13 shows the result of the regeneration in the case where a Migration Package has the tree structure shown on the left in the Regeneration Example 1301 and the Migration Package Regeneration Unit 505 is provided with Encryption Parameters 1302.

In this example, "0" is designated in (C) Change Method of the Encryption Parameters 1402. Thus, the Migration Package Regeneration Unit 505 only performs encryption with use of the parent key.

In the expanded Migration Package, the top data is a pair of a 2048-bit public key and a 2048-bit private key for the RSA algorithm. The Migration Package Regeneration Unit 505 decrypts them by using a private key corresponding to the MApubKey of the Migration Authority 101. Then, the Migration Package Regeneration Unit 505 encrypts them by using the AES designated in (B) Parent Key Algorithm and a 128-bit parent key whose length is designated in (A) Parent Key Length. In the tree structure shown on the right in the Regeneration Example 1301, the part surrounded by the broken line, excluding the parent key, is regenerated as a Migration Package.

FIG. 14 shows the result of the regeneration in the case where a Migration Package has the tree structure shown on the left in the Regeneration Example 1401 and the Migration Package Regeneration Unit 505 is provided with Encryption Parameters 1402.

In this example, "1" is designated in (C) Change Method of the Encryption Parameters 1302. Thus, the Migration Package Regeneration Unit 505 changes all the encryption algorithms.

The following explains the procedures for the change, step by step.

Step 1:

The top data in the expanded Migration Package is a pair of a 2048-bit public key and a 2048-bit private key for the RSA algorithm. Thus, the Migration Package Regeneration Unit 505 decrypts them by using a private key corresponding to the MApubKey of the Migration Authority 101. Then, the Migration Package Regeneration Unit 505 decrypts the 1024-bit RSA key pair and the data 1 by using the 2048-bit RSA private key. After that, the Migration Package Regeneration Unit 505 decrypts the data 2 by using the 1024-bit RSA private key.

Step 2:

Since "2" is designated in (F) After-change Strength Level, the Migration Package Regeneration Unit 505 performs the regeneration at the same Strength Level as the current Migration Package. According to the Encryption Strength Table 701, the key length of the secret key cryptographic algorithm corresponding to the 1024-bit RSA is 80 bits.

However, the shortest key length of the AES algorithm is 128 bits. Thus, the Migration Package Regeneration Unit 505 generates a 128-bit key, and encrypts the data 2 by using the AES algorithm. Besides, according to the Encryption Strength Table 701, the key length of the secret key cryptographic algorithm corresponding to the 2048-bit RSA is 112 bits. However, the shortest key length of the AES algorithm is 128 bits. Thus, the Migration Package Regeneration Unit 505 generates a 128-bit key, and encrypts the 128-bit AES key and the data 1 by using the AES algorithm. Finally, the Migration Package Regeneration Unit 505 encrypts the Migration Package by the AES, which is designated in (B) Parent Key Algorithm, by using a 128-bit parent key, whose length is designated in (C) Parent Key Length. As a result, in the tree structure shown on the right in the Regeneration Example 1301, the part surrounded by the broken line, excluding the parent key, is regenerated as a Migration Package.

FIG. 15 shows the result of the regeneration in the case where a Migration Package has the tree structure shown on the left in the Regeneration Example 1501 and the Migration Package Regeneration Unit 505 is provided with Encryption Parameters 1502.

In this example, "2" is designated in (C) Change Method, "AES" is designated in (D) Designated Secret Key Cryptographic Algorithm, and "ECC" is designated in (E) Designated Public Key Cryptographic Algorithm. Thus, the Migration Package Regeneration Unit 505 changes all the secret key cryptographic algorithms and the public key cryptographic algorithms.

The following explains the procedures for the change, step by step.

Step S1:

The top data in the expanded Migration Package is a pair of a 2048-bit public and a 2048-bit private key for the RSA algorithm. Thus, the Migration Package Regeneration Unit 505 firstly decrypts them by using a private key corresponding to the MApubKey of the Migration Authority 101. Then, the Migration Package Regeneration Unit 505 decrypts the 56-bit DES (Data Encryption Standard) key and the data 1 by using the 2048-bit RSA private key. After that, the Migration Package Regeneration Unit 505 decrypts the data 2 by using the 56-bit DES secret key.

Step S2:

Since "0" is designated in (F) After-change Strength Level, the Migration Package Regeneration Unit 505 performs the regeneration at the same Strength Level as the current Migration Package. Since DES is a secret key cryptosystem, it is to be changed to 128-bit AES as designated in (D) Designated Secret Key Cryptographic Algorithm. Thus, the Migration Package Regeneration Unit 505 generates a 128-bit key and encrypts the data 2 by using the AES algorithm. Since RSA is a public key cryptosystem, it is to be changed to ECC as designated in (E) Designated Public Key Cryptographic Algorithm. According to the Encryption Strength Table 701, the ECC Algorithm Key Length corresponding to the 128-bit parent key of AES is 256 bits. Thus, the Migration Package Regeneration Unit 505 generates a 256-bit key and encrypts the 128-bit AES key and the data 1 by using the ECC algorithm. Finally, the Migration Package Regeneration Unit 505 encrypts the Migration Package by the AES, which is designated in (B) Parent Key Algorithm, by using a 128-bit parent key, whose length is designated in (C) Parent Key Length. As a result, in the tree structure shown on the right in the Regeneration Example 1501, the part surrounded by the broken line, excluding the parent key, is regenerated as a Migration Package.

In the description above, the parent key is sent to the Migration Authority 101 by the Second Electronic Terminal Device which downloads the Migration Package. However, the parent key may be generated by the Migration Authority 101.

This concludes the explanation of the first embodiment of the present invention.

Second Embodiment

The following describes the second embodiment of the present invention, with reference to the drawings.

The second embodiment is an example where the secret data migration method pertaining to the first embodiment is applied to a DRM (Digital Rights Management) application.

Suppose that the Local Application 205 is a DRM application. A DRM application is an application for managing digital contents, such as music and video, and protecting their copyrights. A DRM application limits the use of digital contents in various aspects, such as the number of use, an available period, and an available time.

FIG. 16 shows the structures of Content Management Tables 1601 and 1602 pertaining to the second embodiment of the present invention. The Content Management Table 1601 is used for managing the saving locations of the contents handled by the DRM application. There are two tables because it is assumed here that the number of contents is greater than the number that the DRM application can manage with a single Content Management Table.

The Content Management Table 1601 is a list of Content IDs of the contents and their respective file names. The Content IDs identify the contents respectively, and the file names are represented as full paths of the contents, which identify their respective saving locations. With the Content IDs shown in the Content Management Table 1601, it is possible to specify the saving locations of the contents in the Storage Area 207. The Content Management Table 1602 has the same structure as the Content Management Table 1601.

Figure 17:
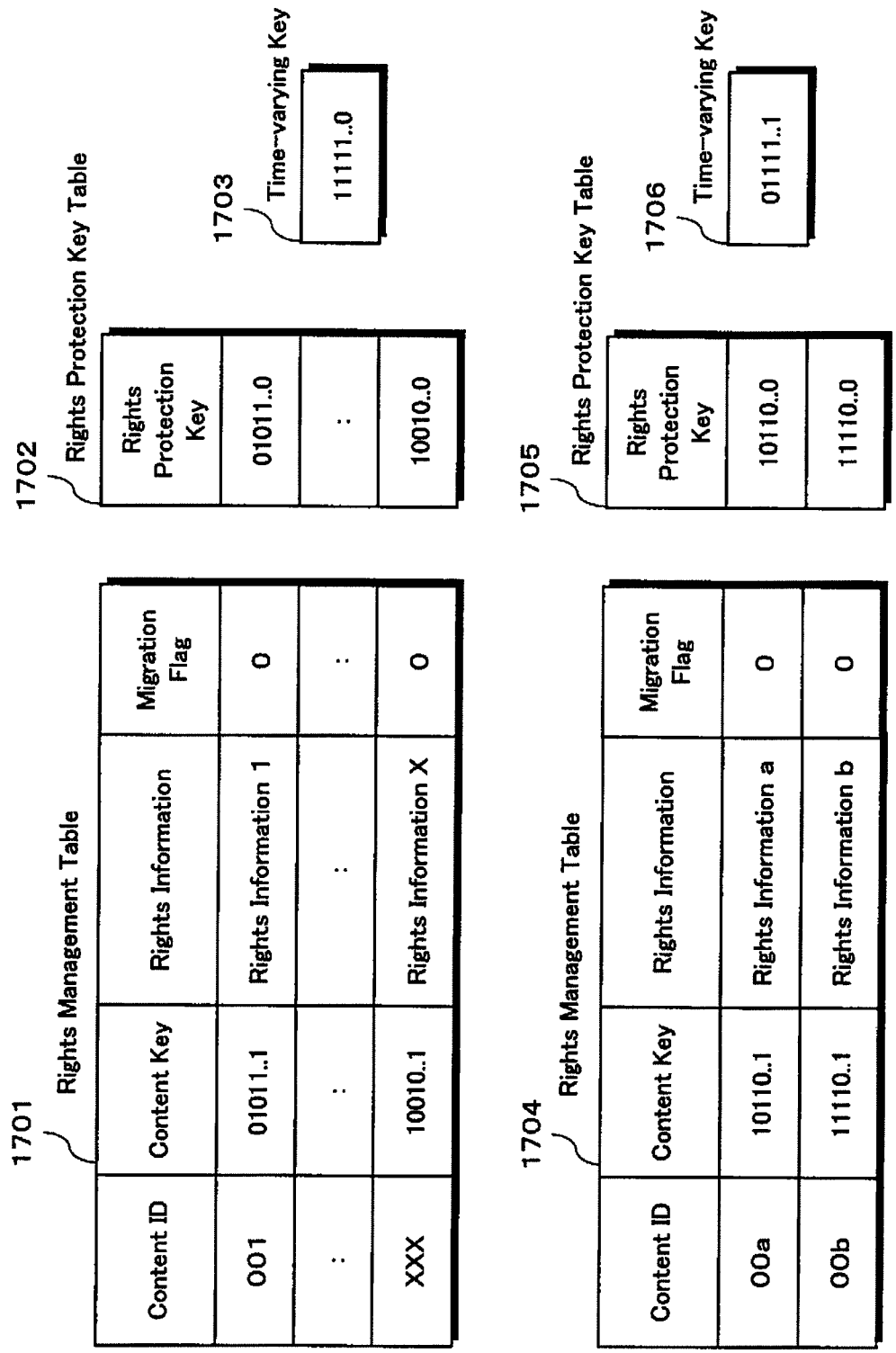
FIG. 17 shows a structure with which a DRM application pertaining to the second embodiment realizes copyright protection and rights management.

FIG. 17 shows a structure with which the DRM application realizes copyright protection and rights management.

The Rights Management Table 1701 is a table used for managing rights of contents to be handled by the DRM application. Each entry of the table includes a Content ID, a Content Key, Rights Information, and so on. Each entry is registered in the Rights Management Table on receipt of content rights information or at a timing determined in advance by an electronic terminal device. Explanations of the procedures for the registration are omitted here.

The Content ID is an identifier for identifying a content. The Rights Management Table 1701 contains ID numbers that match the Content IDs to be transmitted from the Decryption Request Transmitting Unit 112. Thus, it is possible to searches the entries by using the Content ID as a key.

The Content Key is a decryption key for an encrypted content indicated by a Content ID. In the case a content is encrypted by AES, the key length is 128 bits or 192 bits, for example. In this embodiment, however, the key length is not limited to them.

The Rights Information is information showing the rights to be protected of the content indicated by the Content ID. The details of the Rights Information are omitted here.

The Migration Flag shows whether or not the content has been uploaded to the Migration Authority 101. "0" shows that it has not been uploaded, and "1" shows it has been uploaded. When the Migration Flag indicates "1", the user can not play or move the content.

The Rights Management Table 1704 has the same structure as the Rights Management Table 1701.

The Rights Protection Key Table 1702 is a table for managing rights protection keys used for encrypting the entries in the Rights Management Table 1701. In each entry, all the data pieces other than the Content ID are encrypted and protected with the rights protection keys.

The Rights Protection Key Table 1705 has the same structure as the Rights Protection Key Table 1702.

The Time-varying Key 1703 is a key for encrypting the Rights Protection Key Table 1702. This key is characterized in that its value varies over time. In the rights management by the DRM application, such a key is used for protection against "backup restore attack". With this attack, a malicious user backs up the rights before using them, and restores them after the use. This might enable the malicious user to use the contents endlessly, and thus the DRM application prevents this attack by using the Time-varying Key.

The Time-varying Key is generated based on, for example, time information or a counter, which can not be tampered with by a user. The details of the generation method are omitted here.

The Time-varying Key 1706 has the same structure as the Time-varying Key 1703, and corresponds to the Rights Protection Key Table 1705.

Figure 18:
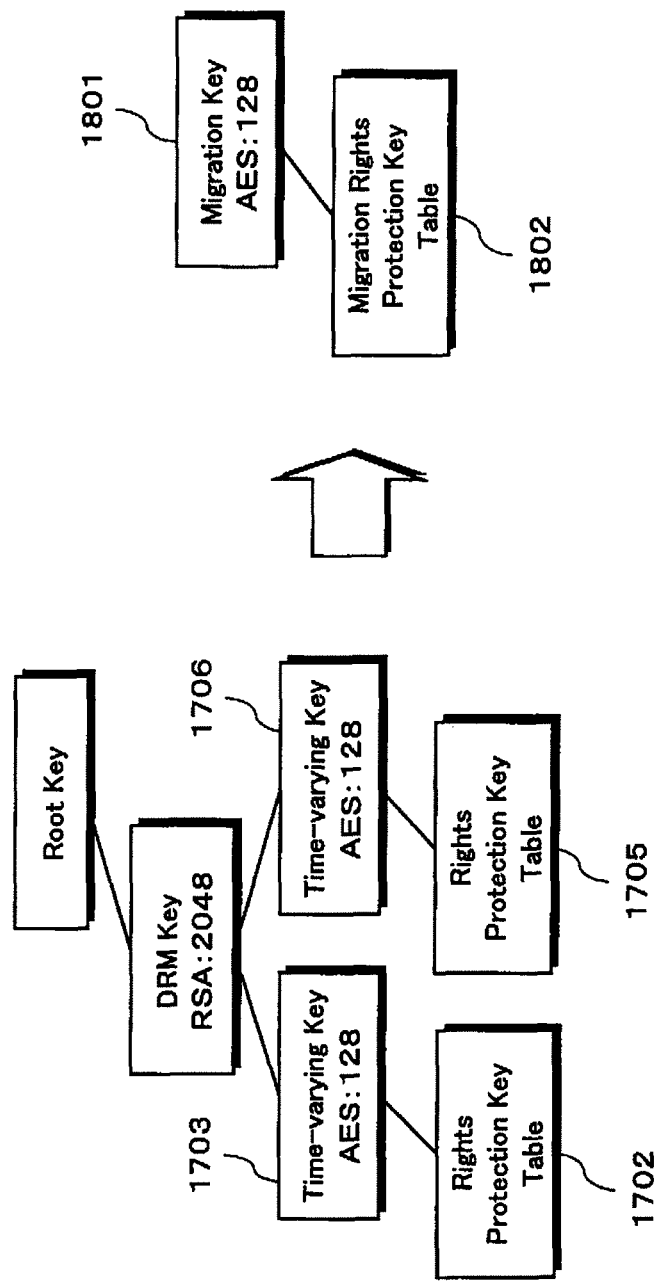
FIG. 18 shows a result of generation of a Migration Package performed when a DRM application pertaining to the second embodiment uploads a content.

FIG. 18 shows, on the left, the Time-varying Keys 1703 and 1706 and the Rights Protection Key Tables 1702 and 1705 in a tree structure managed by the DRM application. On the right, it shows a tree structure of a Migration Package generated in response to a content upload request from a user.

The tree structure on the left shows that the Rights Protection Key Table 1702 has been encrypted with the Time-varying Key 1703, and the Rights Protection Key Table 1705 has been encrypted with the Time-varying Key 1706. The encryption algorithm applied here is AES, and the key length of each Time-varying Key is 128 bits. Furthermore, the Time-varying Key 1703 and the Time-varying Key 1706 have been encrypted with a DRM key corresponding to the DRM application. The applied encryption algorithm is RSA, and the key length of the DRM key is 2048 bits.

The tree structure on the right shows the result of the generation of the Migration Package. The DRM application extracts a rights protection key used for encryption of the entries of the Rights Management Table 1701 or 1704 that corresponds to the Content ID of the content designated by the user, and generates the Migration Rights Protection Key Table 1802. Then, the DRM application generates a 128-bit Migration Key 1801, and encrypts the Migration Rights Protection Key Table 1802 by using the Migration Key 1801. The encryption algorithm applied here is AES.

Figure 19:
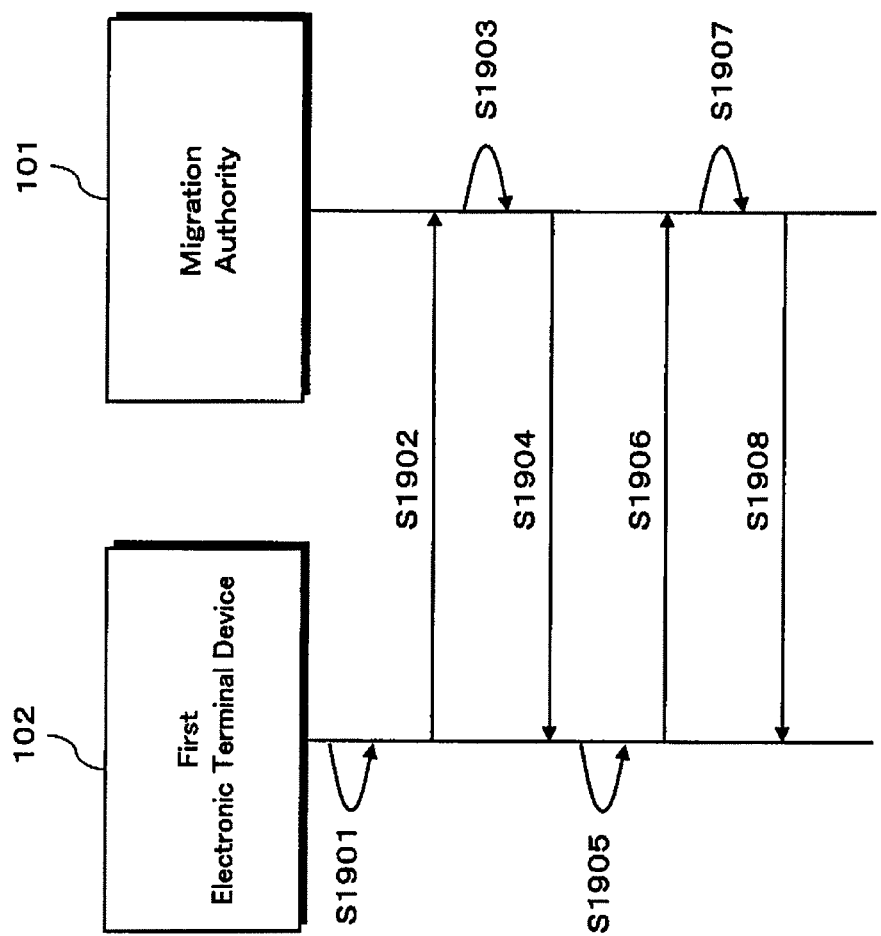
FIG. 19 shows processing procedures by which a DRM application of the First Electronic Terminal Device 102 pertaining to the second embodiment uploads Secret Data to the Migration Authority 101.

FIG. 19 shows processing procedures by which the DRM application of the First Electronic Terminal Device 102 uploads the Secret Data to the Migration Authority 101.

S1901: The First Electronic Terminal Device 102 prepares for uploading the Secret Data when the user designates the Content ID "001" in the Content Management Table 1601 and the Content ID "00a" in the Content Management Table 1602, managed by the DRM application.

(a) Upon receipt of the upload designation from the user, the DRM application extracts the entry corresponding to the Content ID of the designated content, from the Rights Management Table 1701 or the Rights Management Table 1704.

(b) The DRM application generates a Migration Rights Management Table from the entry extracted in (a).

(c) The DRM application sends the encrypted data of the content and the Migration Rights Management Table generated in (b) directly to the Second Electronic Terminal Device 103 as the migration destination.

Note that the content data and the Migration Rights Management Table may be sent to the Second Electronic Terminal Device 103 via a recording medium or via a server as the Migration Authority 101.

(d) The DRM application decrypts, within the Trusted Platform Module 201, the Rights Protection Key Table 1702 and the Rights Protection Key Table 1705, by using the Time-varying Key 1703 and the Time-varying Key 1706. The DRM application also extracts the rights protection key corresponding to the Content ID of the designated content, and generates the Migration Rights Protection Key Table 1802.

(e) The DRM application generates, within the Trusted Platform Module 201, a 128-bit Migration Key 1801, and encrypts the Migration Rights Protection Key Table 1802. The encryption algorithm applied here is AES.

(f) The DRM application generates a Migration Package based on the Migration Key 1801 and the encrypted Migration Rights Protection Key Table 1802. The details of the Migration Package are not explained here, because they are disclosed in Non-Patent Literature 1.

The procedures for the generation of the Migration Package are the same as Step S901. Thus, their explanation is omitted here.

S1902: This step is the same as Step S902. Thus, the explanation is omitted here.

S1903: This step is the same as Step S903. Thus, the explanation is omitted here.

S1904: This step is the same as Step S904. Thus, the explanation is omitted here.

S1905: This step is the same as Step S905. Thus, the explanation is omitted here.

S1906: In the First Electronic Terminal Device 102, (a) The DRM application decrypts, within the Trusted Platform Module 201, the Rights Protection Key Table 1702 and the Rights Protection Key Table 1705, by using the Time-varying Key 1703 and the Time-varying Key 1706. The DRM application also extracts the rights protection key corresponding to the Content ID of the designated content.

(b) By using the rights protection key extracted in (a), the DRM application decrypts the entry of the Rights Management Table 1701 corresponding to the Content ID "001" designated by the user and the entry of the Content Management Table 1602 corresponding to the Content ID "00a" designated by the user.

(c) The DRM application sets "1" to the Migration Flags of the entries decrypted in (b).

(d) By using the rights protection key extracted in (a), the DRM application encrypts again the entry of the Rights Management Table 1701 corresponding to the Content ID "001" designated by the user and the entry of the Content Management Table 1602 corresponding to the Content ID "00a" designated by the user.

(e) The DRM application updates the Time-varying Key 1703 and the Time-varying Key 1706, and encrypts again the Rights Protection Key Table 1702 and the Rights Protection Key Table 1705.

The subsequent step is the same as Step S906. Thus, the explanation is omitted here.

S1907: This step is the same as Step S907. Thus, the explanation is omitted here.

S1908: This step is the same as Step S908. Thus, the explanation is omitted here.

This concludes the explanation of the processing procedures by which the DRM application of the First Electronic Terminal Device 102 uploads the Secret Data to the Migration Authority 101.

Each of the entries and the contents whose Migration Flag is set to be "1" in Step S1906 in FIG. 19 is handled according to either one of the following.

(i) After the Second Electronic Terminal Device 103 completes the downloading of the Migration Package uploaded in FIG. 19, the First Electronic Terminal Device 102 is notified of the completion, and all the information relating to the contents are deleted.

(ii) If the Second Electronic Terminal Device 103 does not download the Migration Package uploaded in FIG. 19, the Migration Flag is changed back to "0" so that the First Electronic Terminal Device 102 can play it. An example of the case where the Second Electronic Terminal Device 103 does not download the Migration Package is when the management term of the Migration Package under control of the Migration Authority 101 expires, and the First Electronic Terminal Device 102 is notified of it.

After the Second Electronic Terminal Device 103 completes the downloading of the Migration Package, a digest value showing that the contents have been deleted may be generated through the Extend Processing defined by the TCG and the attestation processing may be performed, in order to notify the Migration Authority 101 of that all information relating to the contents are deleted by the First Electronic Terminal Device 102. After the completion of the download by the Second Electronic Terminal Device 103, the Migration Authority 101 prevents access from the First Electronic Terminal Device 102 until the attestation processing has been performed.

An idea of "domain" is adopted in some DRM methods. Domain is an idea for regarding plural devices as a group. This idea is used in the case of sharing digital contents such as music and video. The migration of the Secret Data may be limited within a domain. If this is the case, the Migration Authority 101 judges whether the First Electronic Terminal Device 102 and the Second Electronic Terminal Device 103 are in the same domain or not.

This concludes the explanation of the second embodiment pertaining to the present invention.

Third Embodiment

The following describes the third embodiment of the present invention, with reference to the drawings.

Figure 20:
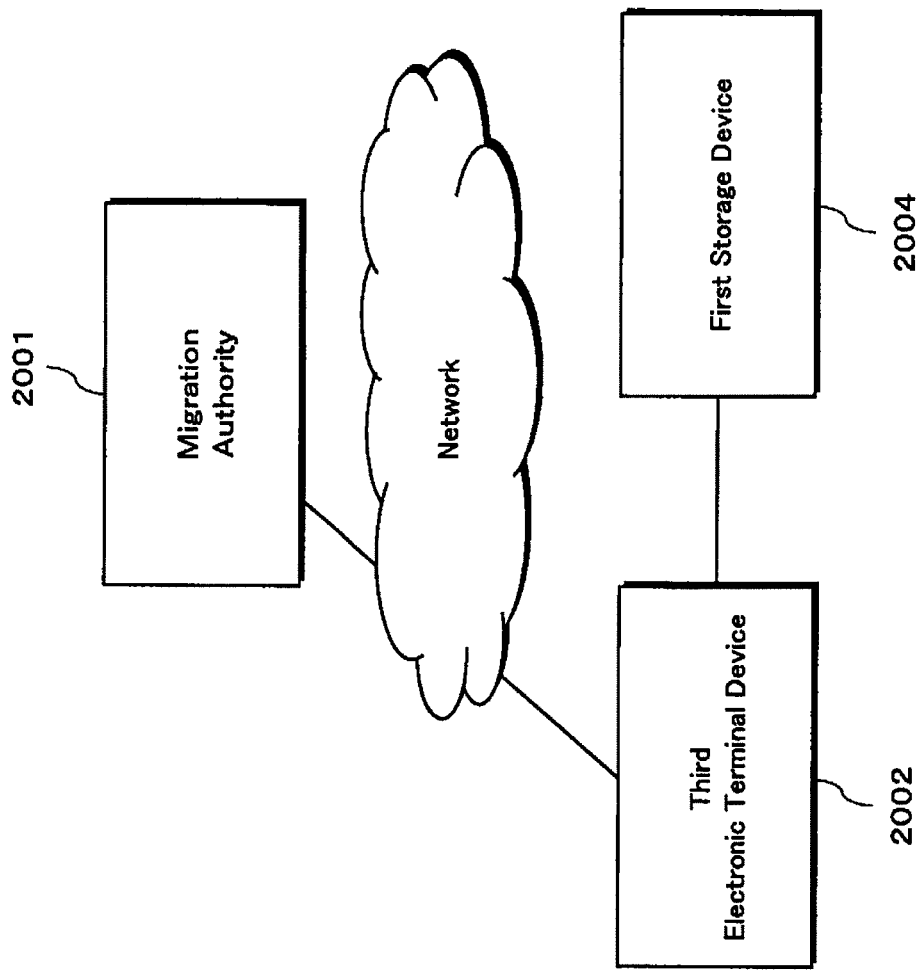
FIG. 20 shows an overall structure of a third embodiment of the present invention.

FIG. 20 shows an overall structure of the system pertaining to the third embodiment of the present invention.

In FIG. 20, the Migration Authority 2001 communicates with the Third Electronic Terminal Device, and provides a service for migration of secret data. The structure is the same as the Migration Authority 101. Thus the explanation is omitted here.

The basic structure of the Third Electronic Terminal Device 2002 is the same as the First Electronic Terminal Device 102 and the Second Electronic Terminal Device 103. The Third Electronic Terminal Device 2002 manages data in a tree structure. A data piece allocated to a leaf in the tree structure is protected by being hierarchically encrypted with keys assigned to the root and the nodes arranged from the root to the leaf. The Third Electronic Terminal Device 2002 is different from the First Electronic Terminal Device 102 and the Second Electronic Terminal Device 103 in that the Third Electronic Terminal Device 2002 is connected to a First Storage Device 2004.

The following explains the details of the structure of the Third Electronic Terminal Device 2002.

Figure 21:
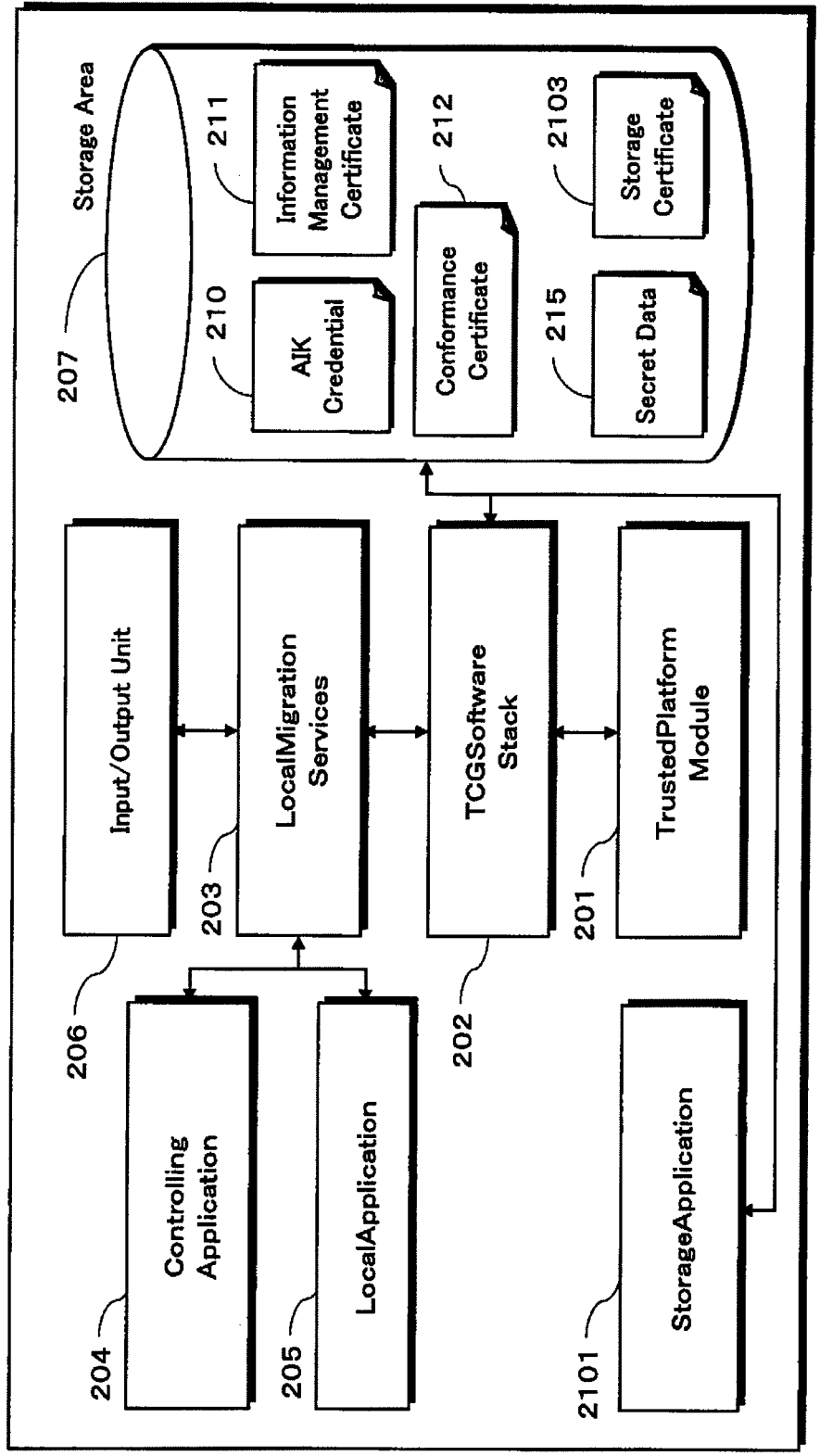
FIG. 21 shows a structure of a Third Electronic Terminal Device pertaining to the third embodiment.

FIG. 21 shows the structure of the Third Electronic Terminal Device 2002. The components other than the Storage Application 2101 and the Storage Certificate 2103 are the same as the First Electronic Terminal Device 102 and the Second Electronic Terminal Device 103. Thus their explanations are omitted here.

The Storage Application 2101 is a piece of software for controlling the First Storage Device 2004 and communicating with the Migration Authority 2001. In this embodiment, the Storage Application 2101 complies with "TCG Architecture Core Specification" and "Host Application Specification" defined in "TCG Storage Workgroup Security Subsystem Class: Optical". These specifications define protocols for data communication between a host and a storage device. The Storage Application 2101 realizes migration of the Secret Data 215, which is under control with an SRK, to the First Storage Device 2004.

The Storage Certificate 2013 is an ORG certificate issued by a certificate authority. In this embodiment, it is issued by the Migration Authority 101. This ORG certificate contains a Template which shows characteristic functions of the First Storage Device 2004. This Template shows encryption algorithms supported by the First Storage Device 2004. Thus, the present embodiment uses this Template as information showing encryption strengths supported by the First Storage Device 2004. The First Storage Device 2004 includes a piece of software called "Service Provider". This software has a Storage Area, and provides functions called "Methods" to the outside. The functions of the Service Provider are determined based on the Template.

The ORG certificate also contains, for example, information of the issuing organization, the version number of the specification supported, the algorithm used for signature, and the signature. The details of these pieces of information are disclosed in "TCG Storage Workgroup Storage Certificate Profiles 1.0". Thus their explanations are omitted here. Also, the Template is disclosed in "TCG Storage Architecture Core Specification" and "TCG Storage Workgroup Security Subsystem Class Optical". Thus, its explanation is omitted here.

It is assumed here that the Storage Certificate 2103 further contains the Evaluate Level and the data for identifying the specification of the security evaluation criteria, which are described above in the explanation of the Conformance Certificate 212. The Storage Certificate 2103 is used as information showing the certified evaluation level of the First Storage Device 2004. Similar to the Evaluate Level of the Conformance Certificate 212, the evaluation level is represented as a level certified based on the evaluation criteria defined in ISO/IEC 15408, for example.

In the explanation above, it is assumed that the Storage Certificate 2103 is an ORG certificate. However, the Storage Certificate 2103 may be any data as long as it shows information equivalent to the encryption strengths, the Evaluate Level, and so on.

The following explains the structure of the First Storage Device 2004.

Figure 22:
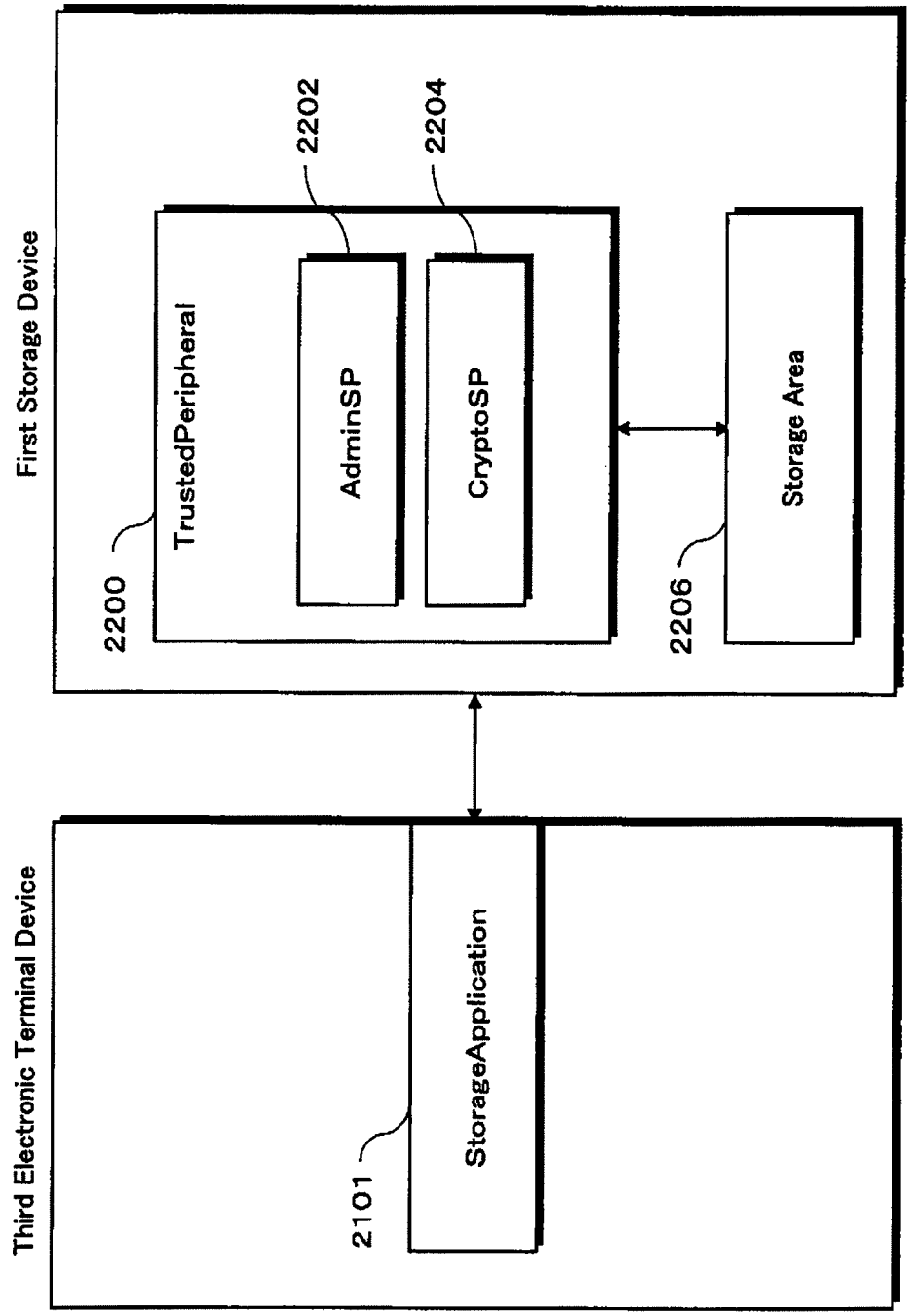
FIG. 22 shows structures of the Third Electronic Terminal Device and a First Storage Device pertaining to the third embodiment.

FIG. 22 shows the structure of the First Storage Device 2004 and its relationship with the Third Electronic Terminal Device.

The Trusted Peripheral 2200 manages the functions of the First Storage Device 2004 and the structure of the data stored in the Storage Area 2206. The Trusted Peripheral 2200 establishes a secure communication path with the Storage Application 2102 of the Third Electronic Terminal Device 2002, and realizes data access control. The details are disclosed in "TCG Architecture Core Specification" and "TCG Storage Workgroup Security Subsystem Class: Optical". Thus their descriptions are omitted here.

The Admin SP 2202 is a security provider that necessarily exists in the Trusted Peripheral 2200. The Admin SP 2202 provides methods, and the Storage Application 2102 calls the methods. The details are disclosed in "TCG Architecture Core Specification" and "TCG Storage Workgroup Security Subsystem Class: Optical". Thus their descriptions are omitted here.

The Crypto SP 2204 is a security provider that provides methods for encrypting data to be stored in the Storage Area 2206. The details are disclosed in "TCG Architecture Core Specification" and "TCG Storage Workgroup Security Subsystem Class Optical". Thus their descriptions are omitted here.

The Storage Area 2206 stores data via the Admin SP 2202 and the Crypto SP 2204 of the Trusted Peripheral 2200. Generally, the Storage Area 2206 is realized as an HDD, a Flash memory, or an optical disc such as a BD, a DVD and a CD. However, the Storage Area 2206 may be realized as any other thing as along as it has a function to store information.

The following explains operations for migration of the Secret Data protected by the Trusted Platform Module 201 pertaining to the present embodiment. Note that explanation of the uploading to the Migration Authority 2001 is omitted here, because it is described above in the explanation of the first embodiment.

The following explains the procedures through which the Secret Data is downloaded from the Migration Authority 2001 pertaining to the present embodiment and is stored into the First Storage Device 2004.

Figure 23:
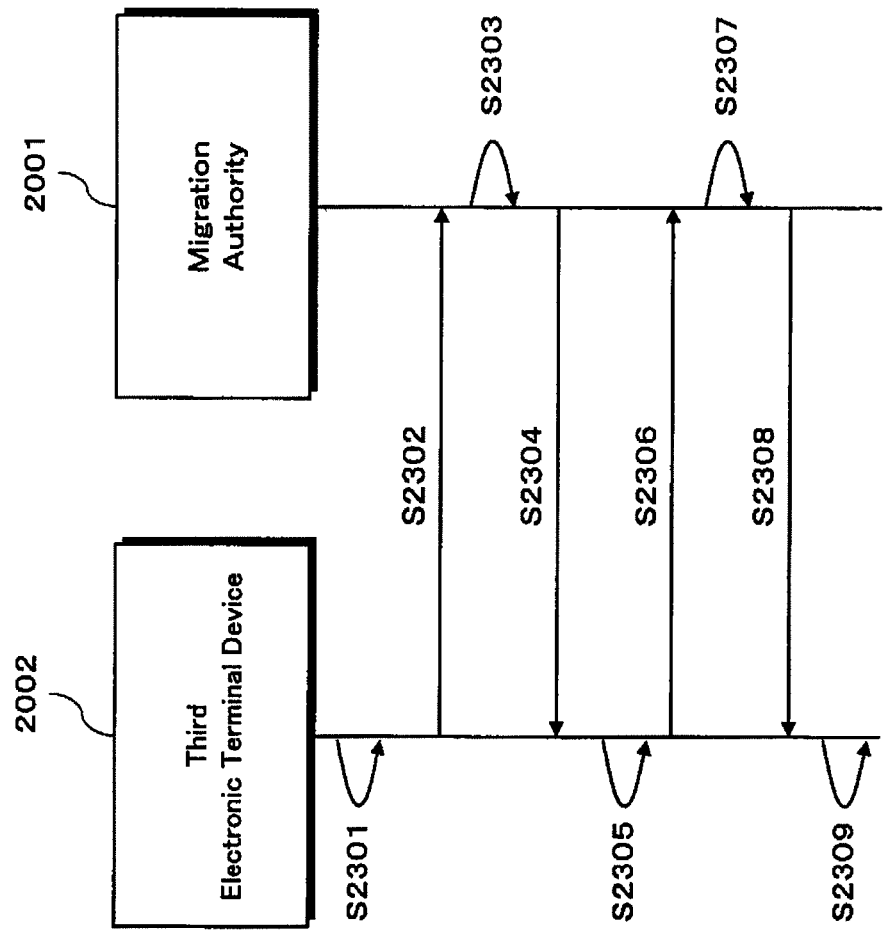
FIG. 23 is a flowchart showing processing procedures by which a Third Electronic Terminal Device 2002 pertaining to the third embodiment downloads Secret Data from a Migration Authority 2001.

FIG. 23 is a flowchart showing the processing procedures by which a Third Electronic Terminal Device 2002 downloads the Secret Data from the Migration Authority 2001. The following explains the procedures.

S2301: The Third Electronic Terminal Device 2002 prepares for uploading the Secret Data. The Third Electronic Terminal Device 2002 has a function called "Integrity Measurement" defined in the TCG. The Third Electronic Terminal Device 2002 uses this function to retrieve a digest value from registers called "Platform Configuration Registers (PCR)" contained in the Trusted Platform Module 201. The digest value is calculated based on part or all of the software pieces as components of the Third Electronic Terminal Device 2002, such as a boot loader, an OS, a device driver and an application. Within the Trusted Platform Module 201, the Third Electronic Terminal Device 2002 applies a digital signature to the digest value by using the AIK contained in the Secret Data 215.

S2302: The Third Electronic Terminal Device 2002 makes a request (a download request) for downloading the Migration Package to the Migration Authority 2001. The Third Electronic Terminal Device 2002 sends the digest value, the digital signature and the AIK Credential 210 together with the request, to the Migration Authority 2001.

S2303: The Migration Authority 2001 receives the download request for downloading the Migration Package, from the Third Electronic Terminal Device 103. The Migration Authority 2001 sends the digest value, the digital signature and the AIK Credential, which the Migration Authority 2001 receives together with the request, to the Attestation Processing Unit 501. The Attestation Processing Unit 501 verifies whether the Third Electronic Terminal Device 2002 is an illegitimate terminal device or not by executing attestation processing.

S2304: The Migration Authority 2001 performs the following operations according to the result of Step S2303.

i) If the Third Electronic Terminal Device 2002 is found legitimate, the Migration Authority 2001 sends the attestation result "OK" and a public key (MApubKey) of the Migration Authority 2001 to the Third Electronic Terminal Device 2002.

ii) If the Third Electronic Terminal Device 2002 is found illegitimate, the Migration Authority 2001 sends the attestation result "NG" to the Third Electronic Terminal Device 2002.

S2305: The Third Electronic Terminal Device 2002 performs the following operations according to the information received from the Migration Authority 2001.

i) If the information received from the Migration Authority 2001 is "OK", the Third Electronic Terminal Device 2002 encrypts the parent key by using the MApubKey received together with the information "OK". The parent key is a key to be used for encrypting the secret data piece at the top of the tree structure of the expanded Migration Package.

ii) If the information received from the Migration Authority 2001 is "NG", the Third Electronic Terminal Device 2002 ends the processing.

According to the explanation above, the parent key is encrypted by using the MApubKey, for secure management of the parent key. However, any method may be used as long as it realizes secure management of the parent key. For example, the Third Electronic Terminal Device 2002 and the Migration Authority 2001 may perform mutual authentication, and use a temporal shared key called "session key" to perform cryptographic communication.

S2306: The Third Electronic Terminal Device 2002 sends the Migration Package ID of the Migration Package to be downloaded, the parent key encrypted in Step S2305, the Encryption Parameters used for regeneration of the Migration Package, and the Storage Certificate 2103 to the Migration Authority 2001.

S2307: The Migration Authority 2001 receives the Migration Package ID, the parent key, the Encryption Parameters, and the Storage Certificate 2103. On receipt of these data pieces, the Data Receiving Unit 500 sends them to the Certificate Analyzing Unit 502.

The Certificate Analyzing Unit 502 verifies the validity of the Storage Certificate 2103, and performs the following operations according to the result of the verification.

i) If the Storage Certificate 2103 is found valid, the Certificate Analyzing Unit 502 sends the Migration Package ID, the encrypted parent key, the Encryption Parameters and the Storage Certificate 2103 to the Migrate Permission Judging Unit 504.

ii) If the Storage Certificate 2103 is found invalid, the Certificate Analyzing Unit 502 returns "NG" via the Data Transmitting Unit 506, and ends the processing.

In the case of i), where the Storage Certificate 2103 is found valid, the Migrate Permission Judging Unit 504 receives the Migration Package ID, the parent key, the Encryption Parameters, and the Storage Certificate 2103 from the Certificate Analyzing Unit 502.

The operations for the judgment performed by the Migrate Permission Judging Unit 504 will be explained later, with reference to FIG. 24.

The Migrate Permission Judging Unit 504 performs the following operations according to the result of the judgment.

i) If the result is "OK", the Migrate Permission Judging Unit 504 sends, to the Migration Package Regeneration Unit 505, a Migration Package regeneration request as well as the Migration Package ID, the encrypted parent key, the Encryption Parameters, and the Storage Certificate 2103.

ii) If the result is "NG", the Migrate Permission Judging Unit 504 returns "NG" via the Data Transmitting Unit 506, and ends the processing.

In the case of i), where the result of the judgment by the Migrate Permission Judging Unit 504 is "OK", the Migration Package Regeneration Unit 505 receives the Migration Package regeneration request as well as the Migration Package ID, the encrypted parent key, the encryption parameter and the Storage Certificate 2103, and then regenerates the Migration Package designated with the Migration Package ID.

S2308: On completion of Step S2307, the Migration Authority 2001 sends the result "OK" and the Migration Package to the Third Electronic Terminal Device 2002 via the Data Transmitting Unit 506. The Third Electronic Terminal Device 2002 records the Migration Package into the First Storage Device 2004 by a predetermined method.

On receipt of the Migration Package, the Third Electronic Terminal Device 2002 may decrypt the Migration Package within the Trusted Platform Module 201, and verify the validity by using a certificate. In the case, if the Migration Package is invalid, the Third Electronic Terminal Device 2002 may request the Migration Authority 2001 to retransmit the Migration Package.

The following explains the operations for judging whether the migration of the Secret Data pertaining to the present embodiment is to be permitted or not.

Figure 24:
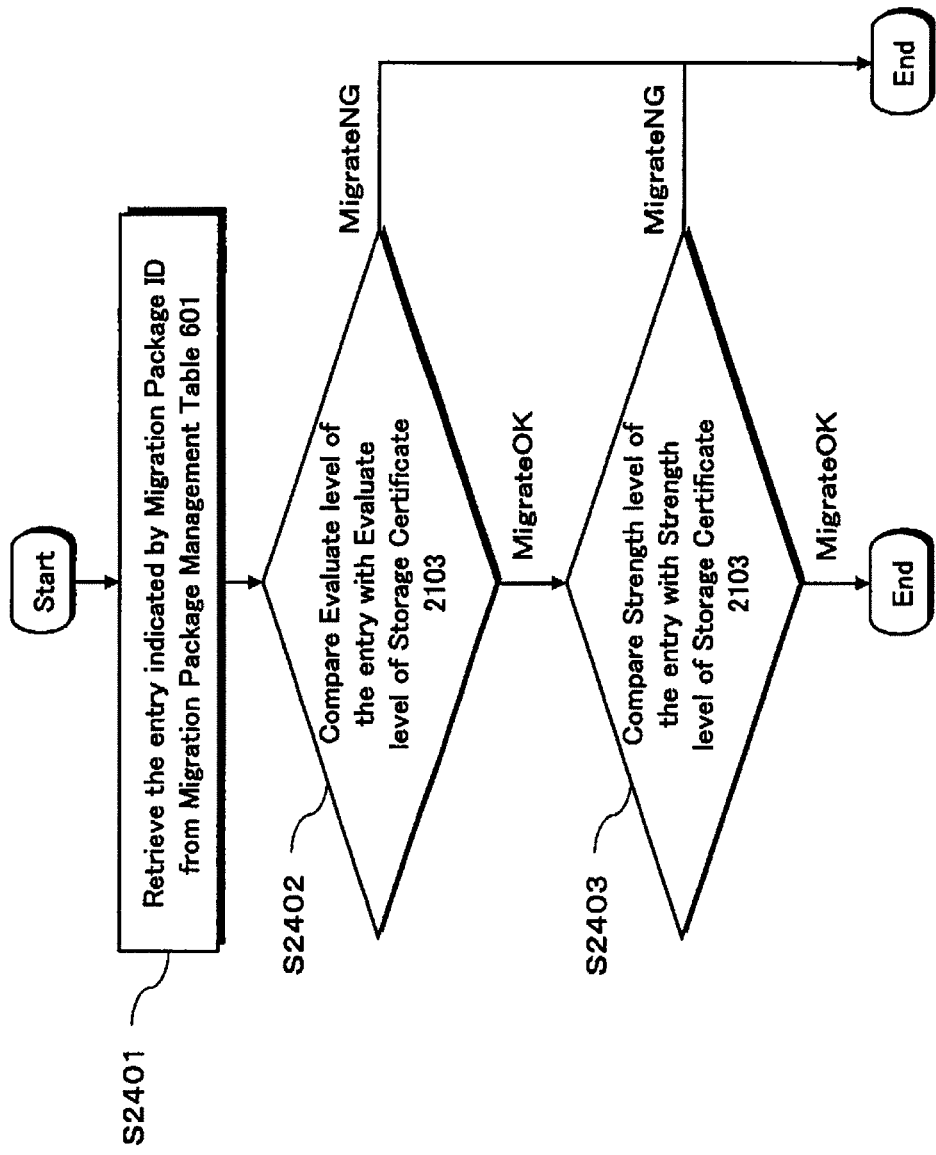
FIG. 24 is a flowchart showing processing procedures by which a Migrate Permission Judging Unit 504 in the Migration Authority 2001 pertaining to the third embodiment judges whether migration is to be permitted or not.

FIG. 24 shows the operations of the Migrate Permission Judging Unit 504 in the Migration Authority 2001.

In the following explanation, it is assumed that the designated Migration Package ID is "001", the Evaluate Level of the Storage Certificate 2103 is "EAL4", the Cipher Type is "AES", and the Key Length is "128".

S2401: The Migrate Permission Judging Unit 504 retrieves the entry indicated by the received Migration Package ID from the Migration Package Management Table 601.

S2402: The Migrate Permission Judging Unit 504 firstly performs comparison and judgment with respect to the Evaluate Levels. For the judgment, the Migrate Permission Judging Unit 504 uses the Authentication Level Judgment Table 801.

According to the present embodiment, the Evaluate Level of the Storage Certificate 2103 is "EAL4". The Evaluate Level designated by the Migration ID 001 is "EAL4". Thus, their Evaluate Levels are the same. According to the Authentication Level Judgment Table 801, the migration is to be permitted when the level is no lower than "EAL3". Thus, the Migrate Permission Judging Unit 504 judges affirmatively.

S2403: The Migrate Permission Judging Unit 504 performs comparison and judgment with respect to the encryption strength.

In the Storage Certificate 2103, it is assumed that the SRK Type is "symmetric", the Cipher Type is "AES", and the Key Length is "128". In the entry designated with the Migration ID "001", the SRK Type is "asymmetric", the Cipher Type is "RSA", and the Key Length is "2048". Since their SRK Types and the Cipher Types are different, it is impossible to judge the Strength Level only by comparing the Key Lengths. Thus, the Encryption Strength Table 701 is to be used for the judgement of the Strength Level.

As shown in the Encryption Strength Table 701, the encryption Strength Level designated with the Migration Package ID "001" is "Strength Level 2". On the other hand, as also shown in the Encryption Strength Table 701, the encryption Strength Level designated in the Storage Certificate 2103 is "Strength Level 3". The judgment algorithm of the Migrate Permission Judging Unit 504 permits the migration when the Strength Level of the migration destination is no lower than the Strength Level of the migration source. Thus, the Migrate Permission Judging Unit 504 judges affirmatively.

In the explanation above, the Storage Application 2101 is described as a host application installed in the Third Electronic Terminal Device 2002 and managing the First Storage Device 2004. However, the Storage Application 2101 may be installed in an electronic terminal device different from the Third Electronic Terminal Device 2002, and the data migration may be performed via the Migration Authority 2001.

Also, the Migration Authority 2001 is not necessarily a separate device from the third terminal device 2002. The Migration Authority 2001 may be installed as an application in the Third Electronic Terminal Device 2002 and perform the migration while communicating with the Storage Application 2101, within the Third Electronic Terminal Device 2002.

The following explains operations for migration of Secret Data stored in the First Storage Device 2004 pertaining to the present embodiment. Note that explanation of the downloading from the Migration Authority 2001 is omitted here, because it is described above in the explanation of the first embodiment.

The following explains the procedures through which Secret Data is uploaded to the Migration Authority 2001 pertaining to the present embodiment.

Figure 29:
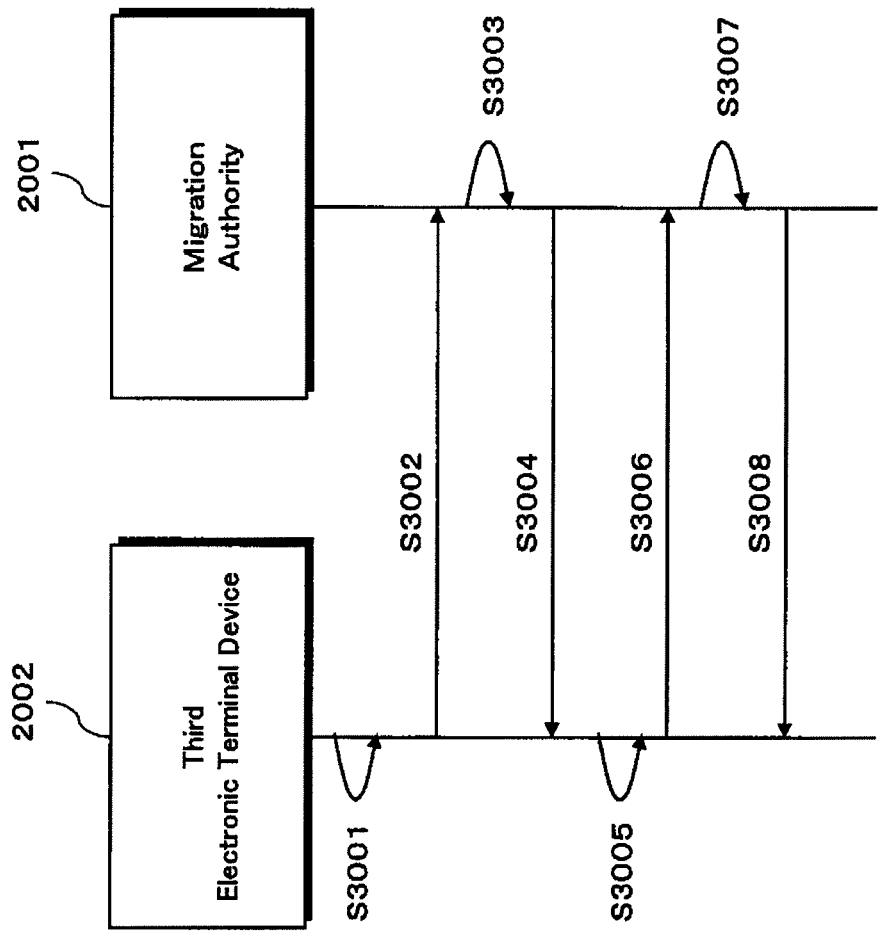
FIG. 29 is a flowchart showing processing procedures by which the Third Electronic Terminal Device 2002 pertaining to the third embodiment uploads Secret Data from a secure storage to the Migration Authority 2001.

FIG. 29 is a flowchart showing the processing procedures by which the Third Electronic Terminal Device 2002 uploads Secret Data to the Migration Authority 2001. The following explains the procedures.

S3001: The Third Electronic Terminal Device 2002 prepares for uploading the Migration Package of the data stored in the First Storage Device 2004. The Third Electronic Terminal Device 2002 generates collective data called "Migration Package" by aggregating one or more pieces of Secret Data to be uploaded.

The Third Electronic Terminal Device 2002 has a function called "Integrity Measurement" defined in the TCG. The Third Electronic Terminal Device 2002 uses this function to retrieve a digest value from registers called "Platform Configuration Registers (PCR) contained in the Trusted Platform Module 201. The digest value is calculated based on part or all of the software pieces as the components of the Third Electronic Terminal Device 2002, such as a boot loader, an OS, a device driver and an application. Within the Trusted Platform Module 201, the Third Electronic Terminal Device 2002 applies a digital signature to the digest value by using the AIK contained in the Secret Data 215.

S3002: The Third Electronic Terminal Device 2002 makes a request (upload request) for uploading the Migration Package to the Migration Authority 2001. The Third Electronic Terminal Device 2002 sends the digest value, the digital signature and the AIK Credential 210 together with the request, to the Migration Authority 2001.

S3003: The Migration Authority 2001 receives the upload request for uploading the Migration Package, from the Third Electronic Terminal Device 2002. The Migration Authority 2001 sends the digest value, the digital signature and the AIK Credential 210, which the Migration Authority 2001 receives together with the request, to the Attestation Processing Unit 501. The Attestation Processing Unit 501 verifies whether the Third Electronic Terminal Device 2002 is an illegitimate terminal device or not by executing attestation processing.

S3004: The Migration Authority 2001 performs the following operations according to the result of Step S3003.

i) If the Third Electronic Terminal Device 2002 is found legitimate, the Migration Authority 2001 sends the attestation result "OK" and a public key (MApubKey) of the Migration Authority 101 to the Third Electronic Terminal Device 2002.

ii) If the Third Electronic Terminal Device 2002 is found illegitimate, the Migration Authority 2001 sends the attestation result "NG" to the Third Electronic Terminal Device 2002.

S3005: The Third Electronic Terminal Device 2002 performs the following operations according to the information received from the Migration Authority 2001.

i) If the information received from the Migration Authority 2001 is "OK", the Third Electronic Terminal Device 2002 encrypts the Migration Package received in Step S3001 by using the MApubKey received together with the information "OK".

ii) If the information received from the Migration Authority 2001 is "NG", the Third Electronic Terminal Device 2002 ends the processing.

According to the explanation above, the Migration Package is encrypted by using the MApubKey, for secure management of the Migration Package. However, any method may be used as long as it realizes secure management of the Migration Package. For example, the Third Electronic Terminal Device 2002 and the Migration Authority 2001 may perform mutual authentication, and use a temporal shared key called "session key" to perform cryptographic communication.

S3006: The Third Electronic Terminal Device 2002 sends the Migration Package encrypted in Step S3005 and the Storage Certificate 2103 to the Migration Authority 2001.

In this description, the Migration Package and the Storage Certificate 2103 are regarded as separate data pieces. However, the certificate may be contained in the Migration Package.

S3007: The Migration Authority 2001 receives the Migration Package and the Storage Certificate 2103. On receipt of these data pieces, the Data Receiving Unit 500 sends them to the Certificate Analyzing Unit 502.

The Certificate Analyzing Unit 502 verifies the validity of the Storage Certificate 2103, and performs the following operations according to the result of the verification.

i) If the Storage Certificate 2103 is found valid, the Certificate Analyzing Unit 502 sends it to the Migration Package Registration Unit 503.

ii) If the Storage Certificate 2103 is found invalid, the Certificate Analyzing Unit 502 returns "NG" via the Data Transmitting Unit 506, and ends the processing.

On receipt of the Migration Package and the Storage Certificate 2103, the Migration Package Registration Unit 503 generates a Migration Package ID which uniquely identifies the Migration Package of the Migration Authority 2001, and stores the Migration Package into the Storage Area 507. Also, the Migration Package Registration Unit 503 extracts data pieces from the storage location and from the certificates, and registers them into the Migration Package Management Table.

S3008: On completion of the registration in Step S3007, the Migration Authority 2001 sends the result "OK" and the Migration Package to the Third Electronic Terminal Device 2002 via the Data Transmitting Unit 506.

This concludes the explanation of the third embodiment.

Fourth Embodiment

The following describes the forth embodiment of the present invention, with reference to the drawings.

Figure 25:
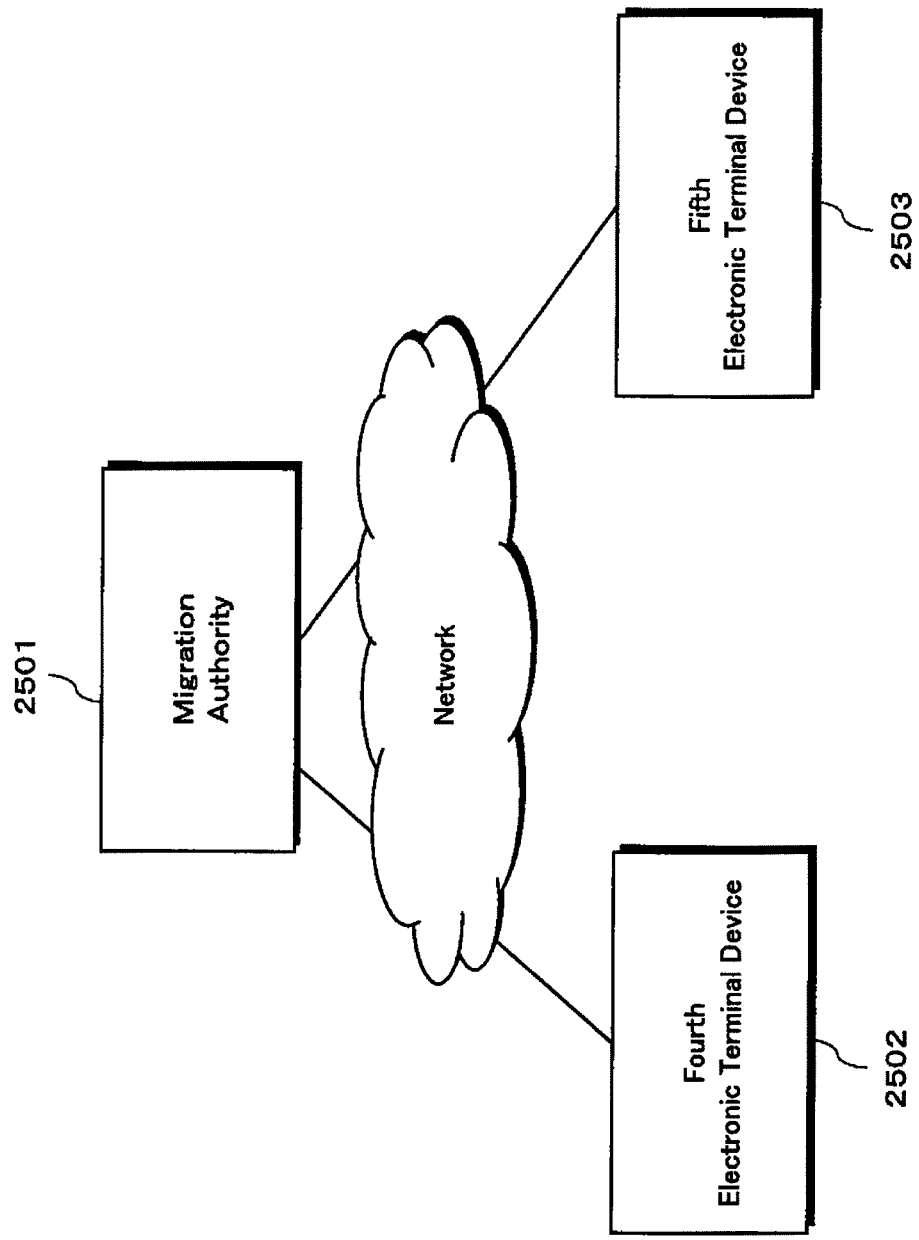
FIG. 25 shows an overall structure of a fourth embodiment of the present invention.

FIG. 25 shows an overall structure of the system pertaining to the fourth embodiment of the present invention.

In FIG. 25, a Migration Authority 2501 communicates with electronic terminal devices via a network, and provides virtual environments for the terminal devices and a service for migration of the Secret Data. The structure is the same as the Migration Authority 101. Thus the explanation is omitted here.

The basic structures of the Fourth Electronic Terminal Device 2502 and the Fifth Electronic Terminal Device 2503 are the same as the First Electronic Terminal Device 102 and the Second Electronic Terminal Device 103. However, a virtualization technology is introduced into them, which allows a plurality of OSs to coexist in each device. The details will be described later with reference to FIG. 26.

Figure 26:
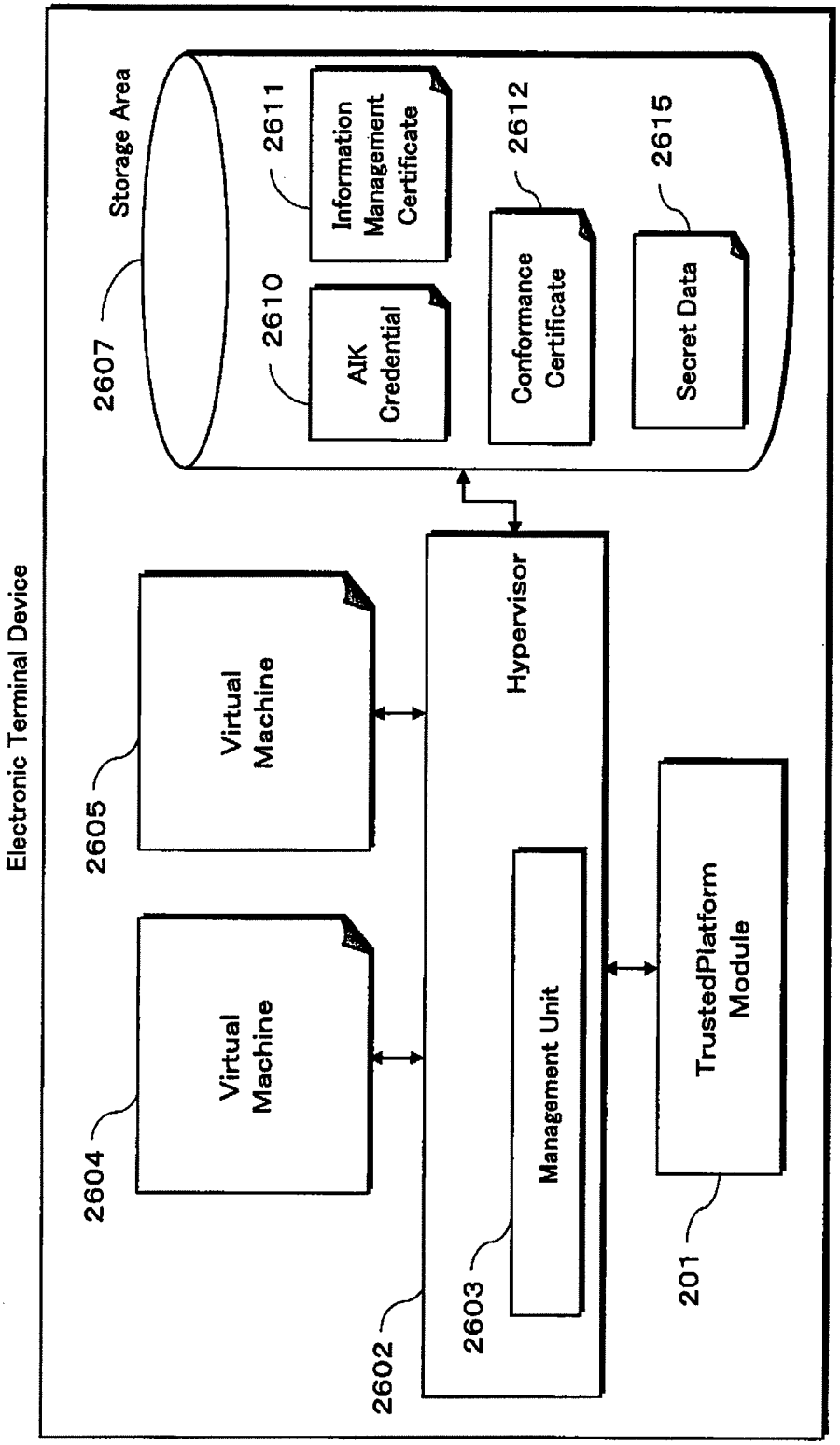
FIG. 26 shows a structure of a Fourth Electronic Terminal Device pertaining to the fourth embodiment.

FIG. 26 shows the structures of the Fourth Electronic Terminal Device 2502 and the Fifth Electronic Terminal Device 2503.

The Hypervisor 2602 is a module realizing a virtualization technology for abstracting the resources of a computer. Representative examples of the Hypervisor 2602 are XEN and VMware, which control a plurality of OSs, and Java™ Virtual Machine, which has the advantage in portability.

The Management Unit 2603 realizes migration of the Virtual Machine by operating in conjunction with other Management Units 2603 of other electronic terminal devices. According to the first to third embodiments, the Secret Data is the target of the migration. On the other hand, in the fourth embodiment, the Virtual Machine is the migration target. Migration of the Virtual Machine is a technology of transferring the whole Virtual Machine, containing the OS and the applications, from an electronic terminal device that uses a virtualization technology to another electronic terminal device, and executing it.

Note that the Virtual Machine 2604 and the Virtual Machine 2605 will be described in detail later, with reference to FIG. 27.

The AIK Credential 2610 is an Attestation Identity Key Credential. In regard to this embodiment, it is assumed that the AIK Credential 2610 has been issued by the Migration Authority 2501. The AIK Credential 2610 is used for checking whether the TPM has an AIK (Attestation Identity Key), for example. The AIK Credential 2610 is not described further here because it is described in detail in "TCG Specification Architecture Overview".

The Information Management Certificate 2611 describes methods for managing the Secret Data 2615, supported by the Fourth Electronic Terminal Device 2502 and the Fifth Electronic Terminal Device 2503. If plural cryptosystems are supported, plural Information Management Certificates 2611 may be recorded in the Storage Area 2607. In regard to this embodiment, it is assumed that the Information Management Certificate 2611 has been issued by the Migration Authority 2501. The Information Management Certificate 2611 is not described further here because it is described in detail in "TCG Specification Architecture Overview".

The Conformance Certificate 2612 is an attribute certificate certifying the conformity with the TCG evaluation standard. Generally, the Conformance Certificate 2612 is issued by an organization that performs the evaluation. In regard to this embodiment, it is assumed that the Conformance Certificate 2612 has been issued by the Migration Authority 2501.

Although the AIK Credential 2610, the Information Management Certificate 2611 and the Conformance Certificate 2612 are explained above as separate certificates, they may be combined together into a single certificate.

The following explains the details of the structures of the Virtual Machine 2604 and the Virtual Machine 2605.

Figure 27:
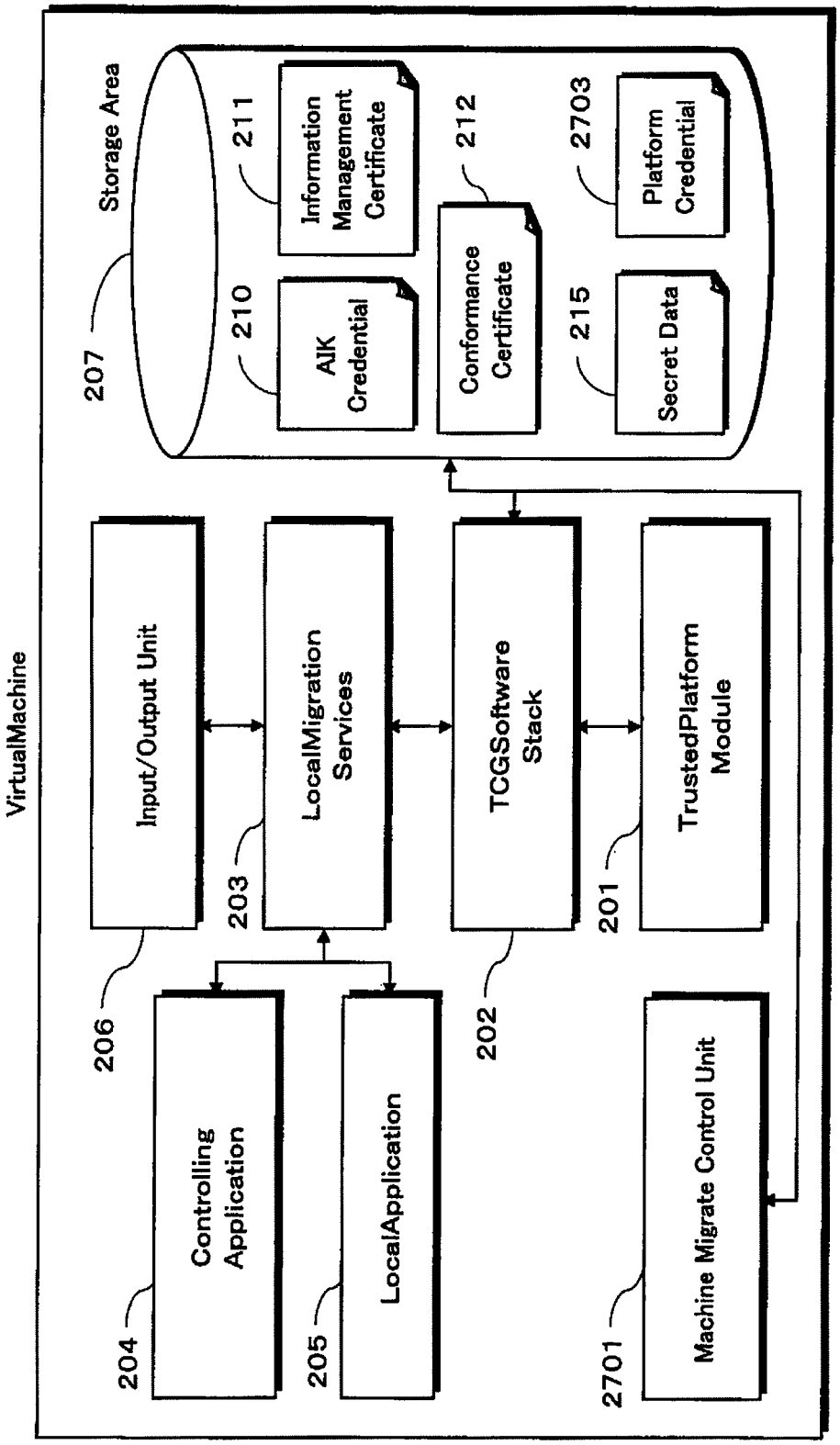
FIG. 27 shows an execution environment of the Fourth Electronic Terminal Device pertaining to the forth embodiment.

FIG. 27 shows the structures of the Virtual Machine 2604 and the Virtual Machine 2605. Each virtual machine virtually realizes a device as a whole. Thus, each Virtual Machine has the same structure as the First Electronic Terminal Device 102 and the Second Electronic Terminal Device 103. The components other than the Machine Migrate Control Unit 2701 and the Platform Credential 2703 are the same as the First Electronic Terminal Device 102 and the Second Electronic Terminal Device 103. Thus their explanations are omitted here.

The Machine Migrate Control Unit 2701 performs migration of the Virtual Machine by operating in conjunction with the Management Unit 2603 and the Migration Authority 2501.

The Platform Credential 2703 is a certificate. In regard to this embodiment, it is assumed that the Platform Credential 2703 has been issued by the Migration Authority 2501. However, the Platform Credential 2703 may be generated with in the Fourth Electronic Terminal Device 2502 and the Fifth Electronic Terminal Device 2503. "TCG Virtualized Platform WG" defines "Minimum Trust Level" in addition to definitions in a conventional platform credential. The Minimum Trust Level describes the lowest trust level required for the migration target Virtual Machine The Minimum Trust Level is defined in the same manner as the Evaluate Level and the Evaluate specification of the Conformance Certificate 212. The Platform Credential 2703 further shows the vendor of the Virtual Machine, the type of the platform of the Virtual Machine The details are disclosed in "TCG Specification Architecture Overview" and "TCG Virtualized Platform WG". Thus its description is omitted here.

The following explains migration of the Virtual Machine pertaining to the present embodiment. Note that explanation of the downloading of the Secret Data, performed after the migration of the Virtual Machine is omitted here, because it is described above.

According to the present embodiment, in the case of migrating the Virtual Machine between terminal devices, the system transfers the Secret Data to be used by the Virtual Machine via the Migration Authority, instead of transferring the Virtual Machine per se. The virtual Machine per se is separately transferred after the Secret Data is removed.

Figure 28:
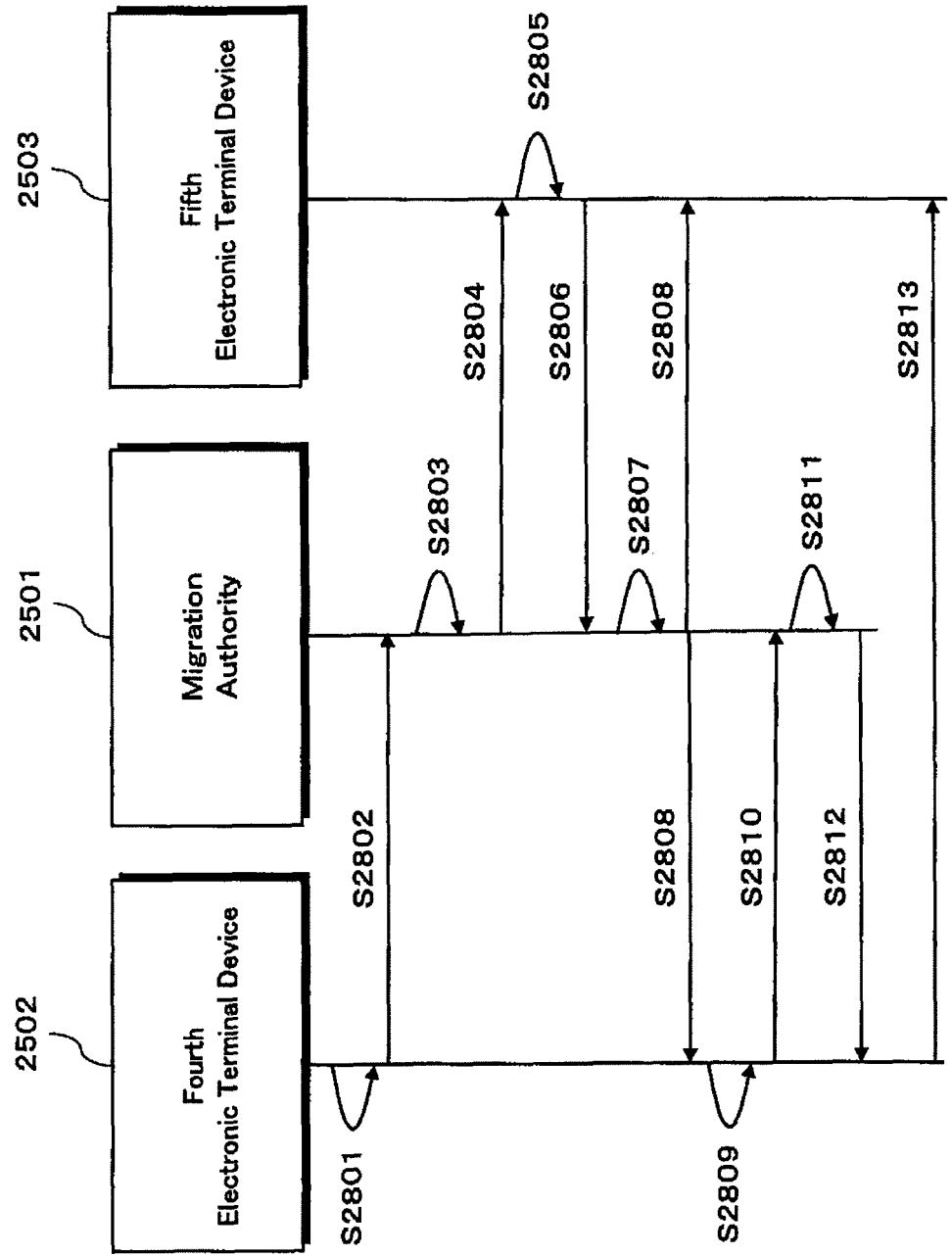
FIG. 28 is a flowchart showing processing procedures by which tie Fourth Electronic Terminal Device 2502 pertaining to the fourth embodiment migrates Secret Data to a Fifth Electronic Terminal Device 2503 via a Migration Authority 2501.

FIG. 28 is a flowchart showing processing procedures by which the Fourth Electronic Terminal Device 2502 uploads the Secret Data to the Migration Authority 2501 when the Fourth Electronic Terminal Device 2502 performs migration of the Secret Data to the Fifth Electronic Terminal Device 2503 via the Migration Authority 2501. Following explains the procedures.

S2801: The Fourth Electronic Terminal Device 2502 prepares for migration of the Virtual Machine. The Fourth Electronic Terminal Device 2502 generates collective data called "Migration Package" by aggregating the one or more pieces of Secret Data to be uploaded to the Migration Authority 2501. The Fourth Electronic Terminal Device 2502 has a function called "Integrity Measurement" defined in the TCG. The Fourth Electronic Terminal Device 2502 uses this function to retrieve a digest value from registers called "Platform Configuration Registers (PCR) contained in the Trusted Platform Module 201. The digest value is calculated based on part or all of the software pieces as the components of the Fourth Electronic Terminal Device 2502, such as a boot loader and the Hypervisor 2602, which are required for running the Virtual Machine Within the Trusted Platform Module 201, the Fourth Electronic Terminal Device 2502 applies a digital signature to the digest value by using the AIK contained in the Secret Data 2615.

The Integrity Measurement is not described further here because it is described in "TCG Specification Architecture Overview".

S2802: The Fourth Electronic Terminal Device 2502 requests the Migration Authority 2501 to migrate the Virtual Machine to the Fifth Electronic Terminal Device 2503. The Fourth Electronic Terminal Device 2502 sends the digest value, the digital signature, the AIK Credential 2610 and the Platform Credential 2703, together with the request, to the Migration Authority 2501.

The sending of the digest value and the digital signature is called "Integrity Reporting". The Integrity Reporting is not described further here because it is described in "TCG Specification Architecture Overview".

S2803: The Migration Authority 2501 receives the request for migration of the Virtual Machine from the Fourth Electronic Terminal Device 2502 to the Fifth Electronic Terminal Device 2501. The Migration Authority 2501 sends the digest value, the digital signature and the AIK Credential 2610, which the Migration Authority 2501 receives together with the request, to the Attestation Processing Unit 501. The Attestation Processing Unit 501 verifies whether the Fourth Electronic Terminal Device 2502 is an illegitimate terminal device or not by executing attestation processing. The term "illegitimate device" means a device that has been tampered with by a malicious user or a virus and operates in an unexpected manner.

If the Fourth Electronic Terminal Device 2502 is found legitimate in Step S2803, the Migration Authority 2501 sends, to the Fifth Electronic Terminal Device 2503, the migration request from the Fourth Electronic Terminal Device 2502.

In response to the request received from the Migration Authority 2501, the Fifth Electronic Terminal Device 2503 prepares for the migration. The Fifth Electronic Terminal Device 2503 has a function called "Integrity Measurement" defined in the TCG. The Fifth Electronic Terminal Device 2503 uses this function to retrieve a digest value from registers called "Platform Configuration Registers (PCR) contained in the Trusted Platform Module 201. The digest value is calculated based on part or all of the software pieces as the components of the Fifth Electronic Terminal Device 2503, such as a boot loader and the Hypervisor 2602, which are required for running the Virtual Machine Within the Trusted Platform Module 201, the Fifth Electronic Terminal Device 2503 applies a digital signature to the digest value by using the AIK contained in the Secret Data 2615.

The Integrity Measurement is not described further here because it is described in "TCG Specification Architecture Overview".

The Fifth Electronic Terminal Device 2503 sends the digest value, the digital signature, the AIK Credential 2610 and the Conformance Certificate 2612, together with the request, to the Migration Authority 2501.

The sending of the digest value and the digital signature is called "Integrity Reporting". The Integrity Reporting is not described further here because it is described in "TCG Specification Architecture Overview".

S2807: The Migration Authority 2501 sends the digest value, the digital signature and the AIK Credential 2610 from the Fifth Electronic Terminal Device 2503 to the Attestation Processing Unit 501. The Attestation Processing Unit 501 verifies whether the Fourth Electronic Terminal Device 2502 is an illegitimate terminal device or not by executing attestation processing. The term "illegitimate device" means a device that has been tampered with by a malicious user or a virus and operates in an unexpected manner.

The Migration Authority 2501 also sends the Platform Credential 2703 and the Conformance Certificate 2612 received in Step S2803 to the Certificate Analyzing Unit 502.

The Certificate Analyzing Unit 502 verifies the validity of the certificates, and performs the following operations according to the result of the verification.

i) If all the certificates are found valid, the Certificate Analyzing Unit 502 sends them to the Migrate Permission Judging Unit 504.

ii) If any of the certificates is found invalid, the Certificate Analyzing Unit 502 returns "NG" as shown in Step S2808, and ends the processing.

In the case of i), where the certificates are found valid, the Migrate Permission Judging Unit 504 receives the Platform Credential 2703 and the Conformance Certificate 2612 from the Certificate Analyzing Unit 502. The Migrate Permission Judging Unit 504 compares the "Minimum Trust Level" of the Platform Credential 2703 with the "Evaluate Level" of the Conformance Certificate 2612, and then performs the following operations.

The Migrate Permission Judging Unit 504 generates:
(i) a judging result "OK", if "Minimum Trust Level"<"Evaluate Level"; and
(ii) a judging result NG, if "Minimum Trust Level">"Evaluate Level".

As explained above, "Minimum Trust Level" indicates the lowest level required for the migration destination. Thus, in Step S2807, the Migrate Permission Judging Unit 504 permits the migration if the Evaluate Level of the Fifth Electronic Terminal Device as the migration destination is no less than the Minimum Trust Level. On the other hand, if the Evaluate Level is less than the Minimum Trust Level, the Migrate Permission Judging Unit 504 judges that the Fifth Electronic Terminal Device does not satisfy the required level, and does not permit the migration.

S2808: According to the result of Step S2507, the Migration Authority 2501 performs the following operations.

i) If the result is "OK", the Migration Authority 2501 sends the result "OK" to the Fifth Electronic Terminal Device 2503. The Migration Authority 2501 also sends the result "OK" and the public key (MApubKey) of the Migration Authority 2501 to the Fourth Electronic Terminal Device 2502.

ii) If the result is "NG", the Migration Authority 2501 returns the result "NG" to the Fourth Electronic Terminal Device 2502, and ends the processing.

S2809: According to the information received from the Migration Authority 2501, the Fourth Electronic Terminal Device 2502 performs the following operations.

i) If the result received from the Migration Authority 2501 is "OK", the Fourth Electronic Terminal Device 2502 encrypts the Migration Package generated in Step S2801, by using the MApubKey received together with the result "OK".

If the result received form the Migration Authority 2501 is "NG", the Fourth Electronic Terminal Device 2502 ends the processing.

According to the explanation above, the Migration Package is encrypted by using the MApubKey, for secure management of the Migration Package. However, any method may be used as long as it realizes secure management of the Migration Package. For example, the Fourth Electronic Terminal Device 2502 and the Migration Authority 2501 may perform mutual authentication, and use a temporal shared key called "session key" to perform cryptographic communication.

S2810: The Fourth Electronic Terminal Device 2502 sends the Migration Package encrypted in Step S2809, the Conformance Certificate 2612 and the Information Management Certificate 2611 to the Migration Authority 2501.

In this description, the Migration Package, the Conformance Certificate 2612 and the Information Management Certificate 2611 are regarded as separate data pieces. However, the certificate may be contained in the Migration Package.

S2811: The Migration Authority 2501 receives the Migration Package, the Conformance Certificate 2612 and the Information Management Certificate 2611. On receipt of these data pieces, the Data Receiving Unit 500 sends them to the Certificate Analyzing Unit 502.

The Certificate Analyzing Unit 502 verifies the validity of the certificates, and performs the following operations according to the result of the verification.

i) If all the certificates are found valid, the Certificate Analyzing Unit 502 sends them to the Migration Package Registration Unit 503.

ii) If any of the certificates is found invalid, the Certificate Analyzing Unit 502 returns "NG" via the Data Transmitting Unit 506.

On receipt of the Migration Package, the Conformance Certificate 2612 and the Information Management Certificate 2611 from the Certificate Analyzing Unit 502, the Migration Package Registration Unit 503 generates a Migration Package ID which uniquely identifies the Migration Package of the Migration Authority 2501, and stores the Migration Package into the Storage Area 507. Also, the Migration Package Registration Unit 503 extracts data pieces from the storage location and from the certificates, and registers them into the Migration Package Management Table.

S2812: On completion of the registration in Step S2811, the Migration Authority 101 sends the result "OK" and the Migration Package ID to the Fourth Electronic Terminal Device 2502 via the Data Transmitting Unit 506.

S2813: On receipt of the upload result "OK" and the Migration Package ID in Step S2812, the Fourth Electronic Terminal Device 2502 performs the migration of the Virtual Machine to the Fifth Electronic Terminal Device 2503. Even after the migration to the Fifth Electronic Terminal Device 2503, the Virtual Machine keeps running, and downloads the Secret Data from the Migration Authority 2501, for example.

The Migration Authority 2501 is not necessarily a separate device from the fourth terminal device 2502. The Migration Authority 2501 may be installed as an application in the Fourth Electronic Terminal Device 2502 and perform the migration while communicating with the Fifth Electronic Terminal Device 2503.

According to the explanation above, the Management Unit 2603 is a component of the Hypervisor 2602. However, the Management Unit 2603 may exist outside the Hypervisor 2602, and achieve the same functions, within the electronic terminal device.

This concludes the explanation of the fourth embodiment of the present invention.

Summary

According to the present invention as explained above, the Migration Authority 101 checks the security authentication levels of the First Electronic Terminal Device 102 as the migration source and the Second Electronic Terminal Device 103 as the migration destination, and judges whether the migration should be permitted or not, according to a given algorithm. Thus, the Migration Authority 101 is capable of preventing the Secret Data from being migrated to a migration destination having a security authentication level that is considerably lower than the migration source. That is, the Migration Authority is capable of securely managing the Secret Data.

Also, the Migration Authority 101 checks the encryption Strength Levels of the First Electronic Terminal Device 102 as the migration source and the Second Electronic Terminal Device 103 as the migration destination, and judges whether the migration should be permitted or not, according to a given algorithm. Thus, the Migration Authority 101 is capable of preventing the Secret Data from being migrated to a migration destination having an encryption Strength Level that is considerably lower than the migration source. That is, the Migration Authority 101 is capable of securely managing the Secret Data.

Also, the Second Electronic Terminal Device 103 is capable of regenerating the structure of the Secret Data to be managed, according to a desired encryption algorithm at a desired encryption Strength Level, when downloading the Secret Data. Thus, the Second Electronic Terminal Device 103 is capable of managing the Secret Data by up-to-date encryption algorithm and the highest encryption Strength Level at the time. Therefore, purchasing the Second Electronic Terminal Device 103 equipped with an up-to-date encryption algorithm allows the user to manage the Secret Data by a high-speed encryption algorithm with a high Strength Level that meets the needs of the times.

Also, the Migration Authority 2001 checks the encryption Strength Level of the Third Electronic Terminal Device 2002 as the migration source and the encryption Strength Level of the information management by the First Storage Device 2004 as the migration destination, and judges whether the migration should be permitted or not, according to a given algorithm. Thus, the Migration Authority 2001 is capable of preventing the Secret Data from being migrated to a migration destination having an encryption Strength Level that is considerably lower than the migration source. That is, the Migration Authority 2001 is capable of securely managing the Secret Data.

Also, the Third Electronic Terminal Device 2002 is capable of regenerating the structure of the Secret Data to be managed, according to a desired encryption algorithm at a desired encryption Strength Level, when downloading the Secret Data and writing the data in the First Storage Device 2004. Thus, the Third Electronic Terminal Device 2002 is capable of managing the Secret Data by up-to-date encryption algorithm and the highest encryption Strength Level at the time. Therefore, purchasing the Third Electronic Terminal Device 2002 equipped with an up-to-date encryption algorithm allows the user to manage the Secret Data by a high-speed encryption algorithm with a high Strength Level that meets the needs of the times.

Also, when the Migration Authority 2501 migrates an execution environment from the Fourth Electronic Terminal Device 2502 to the Fifth Electronic Terminal Device 2503, the Migration Authority 2501 checks the encryption Strength Level of the Fourth Electronic Terminal Device 2502 as the migration source and the encryption Strength Level of the information management by the Fifth Electronic Terminal Device 2503 as the migration destination, and judges whether the migration should be permitted or not, according to a given algorithm. Thus, the Migration Authority 2501 is capable of preventing the Secret Data from being migrated to a migration destination having an encryption Strength Level that is considerably lower than the migration source. That is, the Migration Authority 2501 is capable of securely managing the Secret Data.

Also, the Fifth Electronic Terminal Device 2503 is capable of regenerating the structure of the Secret Data to be managed, according to a desired encryption algorithm at a desired encryption Strength Level, when downloading the Secret Data. Thus, the Fifth Electronic Terminal Device 2503 is capable of managing the Secret Data by an up-to-date encryption algorithm and the highest encryption Strength Level at the time. Therefore, purchasing the Second Electronic Terminal Device 2503 equipped with an up-to-date encryption algorithm allows the user to easily manage the Secret Data by migration of the virtualization technology and by a high-speed encryption algorithm with a high Strength Level that meets the needs of the times.

Other Aspects

The following describes various aspects of the present invention.

One aspect of the present invention is a data migration system including: the first terminal device uploading part or all of secret data protected with a key held in a security module; the second terminal device downloading part or all of the secret data protected with the key held in the security module; and the server holding a security policy table describing a security policy, and when transferring data from the second terminal device to the first terminal device, judging whether the transfer is to be permitted, according to attributes of the first and second terminal devices and the security policy table.

With the stated structure, the Secret Data in the first electronic terminal is migrated to the second terminal device according to the security policy in the data migration system. Thus, the system is capable of prevent the secret data from being migrated to an illegitimate terminal device.

The data migration serve may further include: a receiving unit operable to receive data; transmitting unit operable to transmit data; verifying unit operable to verify an authorization identifier of a terminal device to check whether the terminal device accessed has been tampered with; an analyzing unit operable to analyze a certificate received from the terminal device to check whether the certificate is proper; a package management table used for managing a package of secret data, within the migration server; a package registration unit operable to register the package of the secret data, uploaded from the migration source device, in the package management table; a migration judging unit operable to judge, when receiving a download request of the package from the migration destination device, whether the migration is to be permitted or not, according to the security policy table, based on the certificate, where the attribute received together with the download request being information of the certificate; and a package regeneration unit operable to regenerate the package such that the package is usable by the migration destination device.

With the stated structure, the migration server is capable of preventing the Secret Data from being migrated to the second terminal device that has been tampered with.

Another aspect of the present invention is a migration server including: a package management table used for managing security authentication levels of the package of the secret data and the migration source terminal device; and a package registration unit operable to register a security authentication level of the migration source terminal device and a security level of the secret data uploaded, wherein the security policy table associates the security authentication level of the migration source terminal device and the migration destination terminal device.

With the stated structure, the migration server is capable of preventing the secret data from being migrated to the second terminal device with a security authentication level lower than the security authentication level defined in the security policy table.

The migration server may further include: a package management table used for managing a management method, an encryption algorithm and a key length applied for managing the package of the secret data and the data in the migration source terminal device; and a package registration unit operable to register a management method, an encryption algorithm and a key length applied for managing the package of the secret data and the data in the migration source terminal device, in the package management table, wherein the security policy table shows a key length that realizes a desired encryption strength level in a given encryption algorithm.

With the stated structure, the migration server is capable of the secret data from being migrated to the second terminal device that uses a management method having an encryption strength level lower than the encryption strength level defined by the security policy.

The migration server may further include: a package regeneration unit operable to regenerate a package by performing encryption conversion of the package by using encryption parameters including an encryption algorithm and an encryption strength level, requested by the migration destination terminal device.

With the stated structure, the migration server is capable of migrate the package that has been subject to the encryption conversion, in response to the encryption conversion request from the second terminal device. For example, in the case where the second terminal device is equipped with an up-to-date encryption algorithm the user of the second terminal device can acquire an up-to-date method for managing the secret data.

Another aspect of the present invention is a first terminal device including: a receiving unit operable to receive data; a transmitting unit operable to transmit data; the security module: an authorization identifier generating unit operable to generate a terminal authorization identifier for a module in the first terminal device; a data storage unit operable to store secret data protected with a key held in the security module, a key for applying a signature to a module in the second terminal device, a certificate for the key for applying a signature to the module in the second terminal device, and security characteristics information describing information relating to security in the second terminal device; a package generating unit operable to package part or all of the secret data; and a digital signature generating unit operable to generate a digital signature by using the key for applying the signature to the terminal authorization identifier.

With the stated structure, the first terminal device is capable of requesting, via the migration server, the second terminal device as the migration destination to comply with the protection level for the secret data as defined by the security policy.

The security characteristics information of the first terminal device may be a security authentication level of the first terminal device.

With the stated structure, the first terminal device is capable of preventing the secret data from being migrated to the second terminal device with a security authentication level lower than the security authentication level defined in the security policy table.

The security characteristics information of the first terminal device may be a management method, an encryption algorithm, and a key length applied for managing the secret data of the migration source.

With the stated structure, it is possible to prevent the secret data from being migrated to the second terminal device with a security authentication level lower than the security authentication level defined in the security policy table.

The first terminal device may further include a deletion unit operable to delete the uploaded package, in response to notification from the migration server indicating that the package has been downloaded.

With the stated structure, the first terminal device is capable of deleting the package in the first terminal device as the migration source device, after confirming that the migration of the package has been completed.

Another aspect of the present invention is a second terminal device including: a receiving unit operable to receive data; a transmitting unit operable to transmit data; the security module: a package expanding unit operable to expand the package including the Secret Data, an authorization identifier generating unit operable to generate a terminal authorization identifier for a module in the second terminal device; a data storage unit operable to store secret data protected with a key held in the security module, a key for applying a signature to a module in the second terminal device, a certificate for the key for applying a signature to the module in the second terminal device, and security characteristics information describing information relating to security in the second terminal device; and a digital signature generating unit operable to generate a digital signature by using the secret data protected with the key held in the security module and the key for applying the signature to the terminal authorization identifier, wherein the second terminal device designates a method for regenerating the package to be adopted by the migration server, by sending Encryption Parameters including an encryption algorithm and an encryption strength level to the migration server.

With the stated structure, the second terminal device is capable of downloading the package with designation of desired Encryption Parameters.

The security characteristics information of the second terminal device may be the security authentication level of the first terminal device.

With the stated structure, the second terminal device is capable of preventing the secret data from being migrated to the second terminal device with a security authentication level lower than the security authentication level defined in the security policy table.

The security characteristics information of the second terminal device may be a management method, an encryption algorithm, and a key length applied for managing the secret data of the migration destination.

With the stated structure, it is possible to prevent the secret data from being migrated to the second terminal device with a security authentication level lower than the security authentication level defined in the security policy table.

The second terminal device may include the security module decrypting the package received from the migration server and checking whether the package is proper data by using a certificate.

Another aspect of the present invention is a method for uploading secret data, including: a step in which the first terminal device generates a package from all or part of the secret data; a step in which the first terminal device generates the digital signature from the terminal authorization identifier by using a key for applying the signature; a step in which the first terminal device sends the terminal authorization identifier, the digital signature and a certificate of the key for applying the signature, to the migration server; a step in which the migration server checks whether the first terminal device has been tampered with, based on the terminal authorization identifier, the digital signature and the certificate of the key for applying the signature, received from the first terminal device; a step in which the migration server (i) sends a result "OK" and a public key to the first terminal device when it is found that the first terminal device has not been tampered with and (ii) sends a result "NG" to the first terminal device when it is found that the first terminal device has been tampered with; a step in which the first terminal device (i) encrypts the package with the public key when receiving the result "OK" and (ii) ends processing when receiving the result "NG"; a step in which the first terminal device sends the encrypted package and the security characteristics information to the migration server; a step in which the migration server registers the encrypted package and the security characteristics information, received from the first terminal device, in the package management table; and a step in which the migration server sends a package ID generated at registration of the encrypted package and the result "OK" to the first terminal device.

With the stated structure, the method prevents the secret data from being migrated to the second terminal device with a security authentication level lower than the security authentication level defined in the security policy table.

Another aspect of the present invention is a method for downloading secret data, including: a step in which the second terminal device generates a package from all or part of the secret data; a step in which the second terminal device generates the digital signature from the terminal authorization identifier by using a key for applying the signature; a step in which the second terminal device sends the terminal authorization identifier, the digital signature and a certificate of the key for applying the signature, to the migration server; a step in which the migration server checks whether the first terminal device has been tampered with, based on the terminal authorization identifier, the digital signature and the certificate of the key for applying the signature, received from the first terminal device; a step in which the migration server (i) sends a result "OK" and a public key to the second terminal device when it is found that the second terminal device has not been tampered with and (ii) sends a result "NG" to the second terminal device when it is found that the second terminal device has been tampered with; a step in which the second terminal device (i) encrypts a terminal device key for encrypting the package with the public key when receiving the result "OK" and (ii) ends processing when receiving the result "NG"; a step in which the first terminal device sends the encrypted terminal device key, the encryption parameters for regenerating the package, and the security characteristics information to the migration server; a step in which the migration server judges whether the downloading is permitted or not based on the security characteristics information received from the first terminal device; and a step in which, according to the result of the judgement, the migration server (i) regenerates the package based on the encryption parameters and the security policy table and sends the regenerated package to the second terminal device when the result of the judgment is "OK", and (ii) sends a result "NG" when the result of the judgement is "NG".

Another aspect of the present invention is a data migration apparatus, including: a receiving unit operable to receive data; transmitting unit operable to transmit data; the security module; a verifying unit operable to verify an authorization identifier of a terminal device to check whether the terminal device accessed has been tampered with; an analyzing unit operable to analyze a certificate received from the terminal device to check whether the certificate is proper; a package management table used for managing a package of secret data, within the migration server; a package generating unit operable to package part or all of the secret data; a data storage unit operable to store a key for applying a signature to the terminal authorization identifier of the first terminal device, a certificate for the key for applying the signature to the terminal authorization identifier of the first terminal device, and security characteristics information describing information relating to security; and a migration a migration judging unit operable to judge, when receiving a download request of the package from the migration destination device, whether the migration is to be permitted or not, according to the security policy table, based on the certificate, where the attribute received together with the download request being information of the certificate; and a package regeneration unit operable to regenerate the package such that the package is usable by the migration destination device.

With the stated structure, the data migration apparatus is capable of downloading the package with designation of desired encryption parameters.

The data migration apparatus may further include: a package regeneration unit operable to regenerate a package by performing, within the security module, encryption conversion of the package by using encryption parameters including an encryption algorithm and an encryption strength level, requested by the migration destination terminal device.

With the stated structure, the migration server is capable of migrate the package that has been subject to the encryption conversion, in response to the encryption conversion request from the second terminal device. For example, in the case where the second terminal device is equipped with an up-to-date encryption algorithm the user of the second terminal device can acquire an up-to-date method for managing the secret data.

Another aspect of the present invention is an integrated circuit including: an encryption unit having two or more encryption algorithms used for performing encryption conversion; and a storage unit used in encryption conversion of the package.

With the stated structure, the integrated circuit is capable of performing the encryption conversion in a secure environment protected against unauthorized access.

Another aspect of the present invention is a content managing playback apparatus including: a receiving unit operable to receive data; a transmitting unit operable to transmit data; the security module: a terminal authorization identifier generating unit operable to generate a terminal authorization identifier for a module in the content managing playback apparatus; a content management table for managing a recording destination of content data; a content rights management table for managing rights of a content; the rights protection key management table for managing a rights protection key used for encrypting the rights of the content; a data storage unit operable to store a time varying key varying in synchronization with an incrementing counter and used for encryption of the rights protection key table, secret data protected with a key held in the security module, a key for applying a signature to the terminal authorization identifier of the content managing playback apparatus, a certificate for the key for applying a signature to the terminal authorization identifier of the content managing playback apparatus, and security characteristics information describing information relating to security in the content managing playback apparatus; a package generating unit operable to package part or all of the secret data; a package expanding unit operable to expand the package including the secret data, and a digital signature generation unit operable to generate a digital signature with the key for applying a signature to the terminal authorization key.

With the stated structure, content managing playback apparatuses are capable of performing safe migration of copyright-protected contents via the migration server.

The content managing playback apparatus may further include a deletion unit operable to delete the uploaded package and information relating to secret information contained in the package, in response to notification from the migration server indicating that the package has been downloaded.

With the stated structure, the content managing playback apparatus is capable of preventing duplication of the copyrights at the migration of the copyright-protected contents.

Another aspect of the present invention is a data migration system, wherein the first module uploads part or all of secret data protected with a key held within the security module, the second module downloads part or all of the secret data uploaded by the first module, and the server holds a security policy table describing a security policy and at the data migration from the second module to the first module, the server judges whether the migration is to be permitted or not based on the attributes of the first and second modules and the security policy table.

With the stated structure, the secret data of the first module is migrated to the second module according to the security policy of the data migration system. Thus, the data migration system is capable of prevent the data from being migrated to an illegitimate module.

Another aspect of the present invention is a data migration terminal device connected to a secure storage, including: a receiving unit operable to receive data; a transmitting unit operable to transmit data; the security module; an authorization identifier generating unit operable to generate a terminal authorization identifier for a module in the data migration terminal device; secret data protected with a key held in the security module, a key for applying a signature to the terminal authorization identifier; a certificate for the key for applying a signature to the terminal authorization identifier; a package generating unit operable to package part or all of the secret data; a digital signature generating unit operable to generate a digital signature by using the key for applying the signature to the terminal authorization identifier, the second module operable to writing the protected data received by the data receiving unit into the secure storage; and a storage unit operable to store first security characteristics information describing security of the data migration terminal device and second security characteristics information describing security of the secure storage.

With the stated structure, the data migration terminal device is capable of requesting, via the migration server, the secure storage as the migration destination to comply with the protection level for the secret data as defined by the security policy.

The first security characteristics information of the data migration terminal device may be a security authentication level of the data migration terminal device.

With the stated structure, the data migration terminal device is capable of preventing the secret data from being migrated to a secure storage with a security authentication level lower than the security authentication level defined in the security policy table.

The first security characteristics information of the data migration terminal device may be a management method, an encryption algorithm, and a key length applied for managing the secret data of the migration source.

With the stated structure, it is possible to prevent the secret data from being migrated to a secure storage that uses a management method with a security authentication level lower than the security authentication level defined in the security policy table.

The second security characteristics information of the data migration terminal device may be a security authentication level of the data migration terminal device.

With the stated structure, the data migration terminal device is capable of preventing the secret data from being migrated to a secure storage with a security authentication level lower than the security authentication level defined in the security policy table.

The second security characteristics information of the data migration terminal device may be an encryption algorithm, and a key length.

With the stated structure, it is possible to prevent the secret data from being migrated to a secure storage that uses a management method with a security authentication level lower than the security authentication level defined in the security policy table.

Another aspect of the present invention is a method for downloading secret data, including: a step in which the data migration terminal device generates a package from all or part of the secret data; a step in which the data migration terminal device generates the digital signature from the terminal authorization identifier by using a key for applying the signature; a step in which the data migration terminal device sends the terminal authorization identifier, the digital signature and a certificate of the key for applying the signature, to the migration server; a step in which the migration server checks whether the first terminal device has been tampered with, based on the terminal authorization identifier, the digital signature and the certificate of the key for applying the signature, received from the first terminal device; a step in which the migration server (i) sends a result "OK" and a public key to the data migration terminal device when it is found that the data migration terminal device has not been tampered with and (ii) sends a result "NG" to the data migration terminal device when it is found that the data migration terminal device has been tampered with; a step in which the data migration terminal device (i) encrypts a terminal device key for encrypting the package with the public key when receiving the result "OK" and (ii) ends processing when receiving the result "NG"; a step in which the first terminal device sends the encrypted terminal device key, the encryption parameters for regenerating the package, and the second security characteristics information to the migration server; a step in which the migration server judges whether the downloading is permitted or not based on the second security characteristics information received from the first terminal device; and a step in which, according to the result of the judgement, the migration server (i) regenerates the package based on the encryption parameters and the security policy table and sends the regenerated package to the data migration terminal device when the result of the judgment is "OK", and (ii) sends a result "NG" when the result of the judgement is "NG".

With the stated structure, the method is capable of preventing the secret data from being migrated to the second terminal device that has been tampered with.

The data migration system may be a data migration system for performing migration to the fifth terminal device via the migration server, wherein the server holds a security policy table describing a security policy, and when the data is migrated from the fourth terminal device to the fifth terminal device, the server judges whether the migration is to be permitted or not based on the attributes of the fourth and fifth terminal devices and the security policy table.

Another aspect of the present invention is the fourth terminal device including: the security module; secret data protected with a key held in the security module; a key for applying a signature to a terminal authorization identifier of the fourth terminal device; a certificate for the key for applying a signature to the terminal authorization identifier of the fourth terminal device; terminal security characteristics information describing information relating to the security of the fourth terminal device, wherein an execution environment controlling unit for controlling one or more execution environments includes a migration control unit operable to control the execution of the migration, and the execution environments controlled by the execution environment controlling unit includes: a data receiving unit operable to receive data, a data transmitting unit operable to transmit data; the security module; an authorization identifier generating unit operable to generate a terminal authorization identifier for a module in the execution environment; secret data protected with a key held in the security module, a key for applying a signature to the terminal authorization identifier of the execution environment; a certificate for the key for applying a signature to the terminal authorization identifier of the execution environment; a package generating unit operable to package part or all of the secret data; a digital signature generating unit operable to generate a digital signature by using the key for applying the signature to the terminal authorization identifier, execution environment security characteristics information describing information relating to the security of the execution environment; and security level information describing information relating to the security required by the fifth terminal device as the migration destination.

With the stated structure, the fourth terminal device is capable of requesting, via the migration server, the fifth terminal device as the migration destination to comply with the protection level for the secret data as defined by the security policy.

The execution environment security characteristics information of the fourth terminal device may be a security authentication level of the fourth terminal device.

With the stated structure, the fourth terminal device is capable of preventing the secret data from being migrated to the fifth terminal device with a security authentication level lower than the security authentication level defined in the security policy table.

The execution environment security characteristics information of the fourth terminal device may be a management method, an encryption algorithm, and a key length applied for managing the secret data of the migration source.

With the stated structure, it is possible to prevent the secret data from being migrated to the fifth terminal device that uses a management method with a security authentication level lower than the security authentication level defined in the security policy table.

The execution environment security characteristics information of the fourth terminal device may be the security authentication level of the fourth terminal device.

With the stated structure, the fourth terminal device is capable of preventing the secret data from being migrated to the fifth device with a security authentication level lower than the security authentication level defined in the security policy table.

The terminal security characteristics information of the fourth terminal device may be an encryption algorithm, and a key length.

With the stated structure, it is possible to prevent the secret data from being migrated to the fifth terminal device that uses a management method with a security authentication level lower than the security authentication level defined in the security policy table.

The security level information of the fourth terminal device may be a security authentication level of the fourth terminal device.

Another aspect of the present invention is a method for uploading secret data, including: a step in which the data migration terminal device generates a package from all or part of the secret data; a step in which the data migration terminal device generates the digital signature from the terminal authorization identifier by using a key for applying the signature; a step in which the data migration terminal device sends the terminal authorization identifier, the digital signature, a certificate of the key for applying the signature and the execution environment security information, to the migration server; a step in which the migration server checks whether the data migration terminal device has been tampered with, based on the terminal authorization identifier, the digital signature and the certificate of the key for applying the signature, received from the data migration terminal device; a step in which the migration server (i) sends a migration request from the fourth terminal device to the fifth terminal device when it is found that the data migration terminal device has not been tampered with and (ii) sends a result "NG" to the fourth terminal device when it is found that the data migration terminal device has been tampered with; a step in which the fifth terminal device generates the digital signature from the terminal authentication identifier by using the key for applying the signature; a step in which the fifth terminal device sends the terminal authentication identifier, the digital signature, the certificate for the key for applying the signature and the security level information to the migration server; a step in which the migration server checks whether the fifth terminal device has been tampered with based on the terminal authentication identifier, the digital signature and the certificate for the key for applying the signature, received from the fifth terminal device; a step in which the migration server (i) judges whether the migration is to be permitted based on the execution environment security characteristics information and the security level information received from the fourth terminal device when it is found that the fifth terminal device has not been tampered with and (ii) generates a result "NG" when it is found that the fifth terminal device has been tampered with; a step in which the migration server (i) sends a result "OK" to the fifth terminal device and a result "OK" and the public key to the fourth terminal device when it is found that the data migration terminal device has not been tampered with and the migration is to be permitted and (ii) sends a result "NG" to the fifth terminal device and the fourth terminal device when it is found that the data migration terminal device has been tampered with or the migration is not to be permitted; a step in which the fourth terminal device (i) encrypts the terminal key for encrypting the package with the public key when receiving the result "OK" and (ii) ends the processing when receiving the result "NG"; a step in which the fourth terminal device sends the encrypted package, the execution environment security characteristics information to the migration server; a step in which the migration server registers the encrypted package and the execution environment security characteristics information, received from the fourth terminal device, into the package management table; a step in which the migration server sends a package ID, generated at the registration of the encrypted package, and the result "OK" to the first terminal device; and a step in which the migration server migrates the execution environment from the fourth terminal device to the fifth terminal device.

With the stated structure, it is possible to prevent the secret data from being migrated to the second terminal device with a security authentication level lower than the security authentication level defined in the security policy table.

Other Modification Examples

Although the present invention is explained above based on the embodiments, the present invention is not limited to the embodiments, as a matter of course. The present invention includes the following modifications.

(1) According to the embodiments above, it is assumed that the Migration Authority 101, the first electronic terminal device 102 and the second electronic terminal device 103 are connected together via a network such as the Internet. However, a removable storage medium may be used.

(2) According to the embodiments above, it is assumed that the Migration Authority 101 and the first electronic terminal device 102 have different structures. However, the first electronic terminal device 102 may have the functions of the Migration Authority 101, and receive the request for downloading the Migration Package, from the second electronic terminal device 103.

(3) According to the embodiments above, the first electronic terminal device 102 as the migration source has an asymmetric SRK and the second electronic terminal device 103 as the migration destination has a symmetric SRK. However, the first electronic terminal device 102 may have a symmetric SRK and the second electronic terminal device 103 may have an asymmetric SRK.

(4) According to the embodiments above, the AIK Credential 210, the Information Management Certificate 211 and the Conformance Certificate 212 are issued by the Migration Authority 101. However, they may be issued by a Certificate Authority as a third party. If this is the case, the Migration Authority 101 verifies the AIK Credential 210, the Information Management Certificate 211 and the Conformance Certificate 212 by using the certificate issued by the Certificate Authority.

(5) According to the embodiments above, the whole tree structure of the secret data under control is migrated. However, the user may select a part of the tree structure to migrate it.

(6) According to the embodiments above, the Migration Authority 101 regenerate the whole Migration Package at once. However, in the case where the Migration Package is large in size, the Migration Authority 101 may performs the regeneration in several steps by dividing the Migration Package into several stages, and repeats the transmission to the second electronic terminal device 103.

(7) According to the embodiments above, the Migrate Permission Judging Unit 504 performs the judgment based on the parameters contained in the Encryption Strength Table 701 and the Authentication Level Judgment Table 801. However, the Migrate Permission Judging Unit 504 may perform the judgment based on the key-update function of the first electronic terminal device and the second electronic terminal device, the lifetime of the key, and so on.

(8) The devices of the above embodiments and variations may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions. Note that the devices are not limited to computer systems that include all of the microprocessor, the ROM, the RAM, the hard disk unit, the display unit, the keyboard, the mouse, etc. Each of the computer systems may be structure from part of them.

(9) Part or all of the constituent elements of the devices of the above embodiments and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

Each of the constituent elements of the devices above may be realized as individual chips or as a single chip including part or all of it.

Note that though system LSI is used here, the circuit may be variously described as IC, LSI, super LSI or ultra LSI depending on the level of integration. Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, or the like is considered to be a possibility.

(10) Part or all of the constituent elements of the devices of the above embodiments and variations may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(11) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(12) The present invention may be any combination of the above embodiments and variations.

INDUSTRIAL APPLICABILITY

With the electronic terminal devices and the migration authority pertaining to the present invention, migration of secret data between the electronic terminal devices are performed securely, even if the devices have different security authentication levels and different strength levels. Also, if the user acquires an electronic terminal device with an up-to-date encryption algorithm, the user can realize data management that is quicker and safer than with conventional electronic terminal devices.

The invention claimed is:

1. A migration apparatus for transferring data protected within a first terminal device to a second terminal device, comprising:
   a non-transitory memory device that stores a program; and
   a processing device that executes the program and causes the migration apparatus to operate as:
      a receiving unit operable to receive secret data from the first terminal device and a download request for the secret data from the second terminal device, the secret data protected by a first encryption algorithm, within a security module in the first terminal device;
      an identifying unit operable to identify the first encryption algorithm based on a credential received from the first terminal device, and to identify a second encryption algorithm based on a credential received from the second terminal device, the second encryption algorithm to be used within a security module in the second terminal device;
      a holding unit operable to hold a security policy table associating the first encryption algorithm with the second encryption algorithm; and
      a control unit operable, on receipt of the download request from the second terminal device, to re-protect the secret data by the second encryption algorithm instead of by the first encryption algorithm, according to the security policy table, and to send the secret data to the second terminal device,
   wherein before transmitting the secret data to the second terminal device, the control unit (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level,
   wherein the minimum evaluation level is an Evaluation Assurance Level that is to be fulfilled by the destination of the secret data, and is defined based on Common Criteria according to a requirement by the first terminal device, and
   wherein the evaluation of the second terminal device is an Evaluation Assurance Level that is given to the second terminal device, and is defined based on Common Criteria.

2. The migration apparatus of claim 1,
wherein the processing device that executes the program further causes the migration apparatus to operate as:
   an execution unit operable to perform processing with the secret data, within an execution environment established by a virtual machine; and
   a transferring unit operable to remove the secret data from the virtual machine, and send the virtual machine not containing the secret data to the second terminal device via a route different from a route for the secret data.

3. The migration apparatus of claim 1,
wherein the security policy table associates an encryption strength level of the first encryption algorithm with an encryption strength level of the second encryption algorithm.

4. The migration apparatus of claim 3,
wherein the holding unit further holds a second security policy table associating a first security authentication level of the first terminal device with a second security authentication level of the second terminal device, and
wherein the control unit re-protects the secret data only if the second security policy table shows that a difference between the first security authentication level and the second security authentication level is less than a given value.

5. The migration apparatus of claim 3,
wherein the holding unit further holds a second security policy table associating a first security authentication level of the first terminal device with a second security authentication level of the second terminal device, and
wherein the control unit re-protects and sends the secret data only if the second security policy table shows that a difference between the first security authentication level and the second security authentication level is less than a given value.

6. The migration apparatus of claim 3,
wherein the encryption strength level of the first encryption algorithm is represented as a key length used in the first encryption algorithm, and the encryption strength level of the second encryption algorithm is represented as a key length used in the second encryption algorithm.

7. The migration apparatus of claim 1,
wherein the identifying unit identifies a type and a key length of the first encryption algorithm and a type of the second encryption algorithm,
wherein the security policy table shows a key length corresponding to the type of the second encryption algorithm and satisfying the same encryption strength level as an encryption strength level corresponding to the type and the key length of the first encryption algorithm, and
wherein when re-protecting the secret data, the control unit uses the key length of the second encryption algorithm corresponding to the key length of the first encryption algorithm.

8. The migration apparatus of claim 1,
wherein the identifying unit identifies a type and a key length of the first encryption algorithm and a type of the second encryption algorithm,
wherein the security policy table associates key lengths of a plurality of encryption algorithms satisfying the same encryption strength level, and
wherein when re-protecting the secret data, the control unit searches the key lengths for a key length corresponding to the type of the second encryption algorithm and satisfying the same encryption strength level as an encryption strength level corresponding to the type and the key length of the first encryption algorithm, and uses the key length found by the search.

9. The migration apparatus of claim 3,
wherein the migration apparatus receives the security policy table from the first terminal device.

10. The migration apparatus of claim 3,
wherein the receiving unit further receives, from the second terminal device, a parent key, information indicating an encryption algorithm to be used with the parent key, and information showing a scope of encryption with the parent key, and
wherein the control unit protects only a top data piece in a hierarchy of the secret data, by using the parent key and the encryption algorithm to be used with the parent key, based on the scope of the encryption with the parent key.

11. The migration apparatus of claim 3,
wherein the receiving unit receives, from the second terminal device, a parent key and information indicating an encryption algorithm to be used with the parent key, and
wherein the control unit generates a second key different from the parent key, and protects the secret data by using the second key and the encryption algorithm to be used with the parent key.

12. The migration apparatus of claim 11,
wherein the control unit generates the second key at a level lower than the parent key in a hierarchy of the secret data.

13. The migration apparatus of claim 3,
wherein the receiving unit receives, from the second terminal device, a public key and information indicating an encryption algorithm to be used with the public key, and
wherein the control unit protects the secret data by using the public key and the encryption algorithm to be used with the public key.

14. The migration apparatus of claim 3,
wherein the receiving unit receives, from the second terminal device, a secret key and information indicating an encryption algorithm to be used with the secret key, and
wherein the control unit protects the secret data by using the secret key and the encryption algorithm to be used with the secret key.

15. The migration apparatus of claim 3,
wherein the receiving unit receives a parent key from the second terminal device, and
wherein the control unit protects the whole secret data at an encryption strength level of the parent key.

16. The migration apparatus of claim 3,
wherein the receiving unit receives, from the second terminal device, information indicating an encryption strength level, and
wherein the control unit protects the secret data at the encryption strength level indicated by the information.

17. The migration apparatus of claim 3,
wherein the receiving unit receives, from the second terminal device, a request for protection of the secret data at the same encryption strength level as an encryption strength level of protection by the first terminal device, and
wherein the control unit protects the secret data at the encryption strength level as the encryption strength level of the protection by the first terminal device.

18. The migration apparatus of claim 3,
wherein the migration apparatus includes a migration server.

19. The migration apparatus of claim 3,
wherein the migration apparatus is included within the first terminal device.

20. A migration method for transferring data protected within a first terminal device to a second terminal device, the migration method comprising:
a receiving step, performed using a processor device, of receiving secret data from the first terminal device and a download request for the secret data from the second terminal device, the secret data protected by a first encryption algorithm, within a security module in the first terminal device;
an identifying step, performed using the processor device, of identifying the first encryption algorithm based on a credential received from the first terminal device, and identifying a second encryption algorithm based on a credential received from the second terminal device, the second encryption algorithm to be used within a security module in the second terminal device;
a holding step, performed using a non-transitory memory device, of holding a security policy table associating the first encryption algorithm with the second encryption algorithm; and
a control step, performed using a processor device, of, on receipt of the download request from the second terminal device, re-protecting the secret data by the second encryption algorithm instead of by the first encryption algorithm, according to the security policy table, and sending the secret data to the second terminal device,
wherein before transmitting the secret data to the second terminal device, the control step (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level,
wherein the minimum evaluation level is an Evaluation Assurance Level that is to be fulfilled by the destination of the secret data, and is defined based on Common Criteria according to a requirement by the first terminal device, and wherein the evaluation of the second terminal device is an Evaluation Assurance Level that is given to the second terminal device, and is defined based on Common Criteria.

21. A non-transitory computer readable recording medium on which is recorded a program readable by a migration apparatus for transferring data protected within a first terminal device to a second terminal device, the program causing the migration apparatus to perform a method comprising:

a receiving step, performed using a processor device included in the migration apparatus, of receiving secret data from the first terminal device and a download request for the secret data from the second terminal device, the secret data protected by a first encryption algorithm, within a security module in the first terminal device;

an identifying step, performed using the processor device, of identifying the first encryption algorithm based on a credential received from the first terminal device, and identifying a second encryption algorithm based on a credential received from the second terminal device, the second encryption algorithm to be used within a security module in the second terminal device;

a holding step, performed using a non-transitory memory device included in the migration apparatus, of holding a security policy table associating the first encryption algorithm with the second encryption algorithm; and a control step, performed using the processor device, of, on receipt of the download request from the second terminal device, re-protecting the secret data by the second encryption algorithm instead of by the first encryption algorithm, according to the security policy table, and sending the secret data to the second terminal device, wherein before transmitting the secret data to the second terminal device, the control step (i) receives, from the first terminal device, a minimum evaluation level required of a destination of the secret data by the first terminal device, (ii) receives, from the second terminal device, an evaluation level of the second terminal device, (iii) judges whether the evaluation level of the second terminal device is lower than the minimum evaluation level, and (iv) sends the secret data to the second terminal device only if the evaluation level of the second terminal device is no lower than the minimum evaluation level, wherein the minimum evaluation level is an Evaluation Assurance Level that is to be fulfilled by the destination of the secret data, and is defined based on Common Criteria according to a requirement by the first terminal device, and wherein the evaluation of the second terminal device is an Evaluation Assurance Level that is given to the second terminal device, and is defined based on Common Criteria.

22. A migration system for transferring data protected within a first terminal device to a second terminal device via a migration apparatus, the first terminal device comprising:
a non-transitory memory device that stores a program; and
a processing device that executes the program and causes the first terminal device to operate as:
a first execution unit operable to perform processing with the secret data, within an execution environment established by a virtual machine;
a transmitting unit operable to securely transmit the secret data to the migration apparatus; and
a transferring unit operable to remove the secret data from the virtual machine, and send the virtual machine not containing the secret data to the second terminal device via a route different from a route for the secret data, the virtual machine comprising:
a non-transitory memory device that stores a program; and
a processing device that executes the program and causes the virtual machine to operate as:
a receiving unit operable to securely receive the secret data from the first terminal device;
a judging unit operable to judge whether an evaluation level relating to security of the second terminal device is no lower than a minimum evaluation level of a destination of the secret data;
a transmitting unit operable to securely transmit the secret data to the second terminal device in a manner suitable for the second terminal device, only if the evaluation level is no lower than the minimum evaluation level; and
a permission unit operable to permit the first terminal device to perform the transfer of the secret data to the second terminal device only if the evaluation level is no lower than the minimum evaluation level, and the second terminal device comprising:
a non-transitory memory device that stores a program; and
a processing device that executes the program and causes the second terminal device to operate as:
a receiving unit operable to securely receive the secret data; and
a second execution unit operable to acquire the virtual machine from the first terminal device and, by using the acquired virtual machine, establish an execution environment within which processing with the secret data is to be performed, wherein the minimum evaluation level is an Evaluation Assurance Level that is to be fulfilled by the destination of the secret data, and is defined based on Common Criteria according to a requirement by the first terminal device, and wherein the evaluation of the second terminal device is an Evaluation Assurance Level that is given to the second terminal device, and is defined based on Common Criteria.

* * * * *